United States Patent
Miller et al.

(10) Patent No.: US 8,733,635 B2
(45) Date of Patent: *May 27, 2014

(54) BANKING SYSTEM CONTROLLED RESPONSIVE TO DATA BEARING RECORDS AND USER INPUT OF A PHONE RECEIVED SECURITY CODE

(71) Applicants: Caren R. Blackson, Highland Heights, OH (US) Diebold Self-Service Systems division of Diebold, Incorporated, North Canton, OH (US)

(72) Inventors: Willis Miller, Cuyahoga Falls, OH (US); Matthew R. Zaugg, Munroe Falls, OH (US); James Block, North Lawrence, OH (US); H. Thomas Graef, Bolivar, OH (US); Natarajan Ramachandran, Uniontown, OH (US); Jeffery M. Enright, Akron, OH (US); Mark A. Douglass, North Canton, OH (US); Dale H. Blackson, Highland Heights, OH (US)

(73) Assignee: Diebold Self-Service Systems, division of Diebold Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,809

(22) Filed: Jan. 14, 2013

(65) Prior Publication Data

US 2013/0311365 A1 Nov. 21, 2013

Related U.S. Application Data

(60) Continuation of application No. 13/441,895, filed on Apr. 8, 2012, now Pat. No. 8,353,450, which is acontinuation of application No. 13/134,128, filed on May 31, 2011, now Pat. No. 8,152,055, which is a continuation of application No. 12/800,878, filed on (Continued)

(51) Int. Cl.
*G06K 5/00* (2006.01)

(52) U.S. Cl.
USPC ......................................... 235/379; 235/382

(58) Field of Classification Search
USPC ......................................... 235/379, 380, 382
See application file for complete search history.

(56) References Cited

U.S. PATENT DOCUMENTS 4,743,747 A * 5/1988 Fougere et al. ............... 235/494
5,327,144 A * 7/1994 Stilp et al. ..................... 342/387

(Continued)

*Primary Examiner* — Daniel St. Cyr
(74) *Attorney, Agent, or Firm* — Black, McCuskey, Souers & Arbaugh, LPA

(57) ABSTRACT

A banking system operates to cause financial transfers responsive to card data read from data bearing records by a card reader. The system includes at least one automated banking machine comprising a cash dispenser. The system is operative during a cash dispense transaction request to receive through an automated banking machine, machine user input of data corresponding to a mobile phone number. The system is operative to generate a security code for the requested cash dispense transaction. The system uses the phone number to send the generated security code to the mobile phone. The cash dispense transaction is allowed to proceed only if the system receives machine user input of the sent security code.

20 Claims, 22 Drawing Sheets

Related U.S. Application Data

May 25, 2010, now Pat. No. 7,954,703, which is a continuation of application No. 12/584,491, filed on Sep. 4, 2009, now Pat. No. 7,946,480, and a continuation-in-part of application No. 12/455,602, filed on Jun. 3, 2009, now Pat. No. 7,861,924, which is a continuation of application No. 11/370,513, filed on Mar. 7, 2006, now Pat. No. 7,866,544, and a continuation-in-part of application No. 10/832,960, filed on Apr. 27, 2004, now Pat. No. 7,118,031, and a continuation-in-part of application No. 10/601,813, filed on Jun. 23, 2003, now Pat. No. 7,240,827, said application No. 12/584,491 is a continuation-in-part of application No. 12/315,840, filed on Dec. 5, 2008, now Pat. No. 7,686,213, which is a continuation of application No. 11/895,976, filed on Aug. 27, 2007, now Pat. No. 7,461,779, which is a division of application No. 11/714,615, filed on Mar. 6, 2007, now Pat. No. 7,392,938, which is a division of application No. 11/415,531, filed on May 2, 2006, now Pat. No. 7,201,313, which is a division of application No. 10/795,926, filed on Mar. 8, 2004, now Pat. No. 7,040,533, which is a continuation-in-part of application No. 09/826,675, filed on Apr. 5, 2001, now Pat. No. 6,702,181, which is a division of application No. 09/076,051, filed on May 11, 1998, now Pat. No. 6,315,195, said application No. 12/584,491 is a continuation-in-part of application No. 11/975,907, filed on Oct. 22, 2007, now Pat. No. 7,946,477, and a continuation-in-part of application No. 11/093,741, filed on Mar. 29, 2005, now Pat. No. 7,284,692, said application No. 12/584,491 is a continuation-in-part of application No. 11/361,327, filed on Mar. 23, 2006, now Pat. No. 7,584,885, which is a division of application No. 10/814,100, filed on Mar. 31, 2004, now Pat. No. 7,004,385.

(60) Provisional application No. 61/270,359, filed on Jul. 6, 2009, provisional application No. 60/660,070, filed on Mar. 9, 2005, provisional application No. 60/560,674, filed on Apr. 7, 2004, provisional application No. 60/429,478, filed on Nov. 26, 2002, provisional application No. 60/082,299, filed on Apr. 17, 1998, provisional application No. 60/918,453, filed on Mar. 16, 2007, provisional application No. 60/918,455, filed on Mar. 16, 2007, provisional application No. 60/918,458, filed on Mar. 16, 2007, provisional application No. 60/557,937, filed on Mar. 31, 2004, provisional application No. 60/459,791, filed on Apr. 1, 2003.

(56) References Cited

U.S. PATENT DOCUMENTS

| | | | |
|---|---|---|---|
| 5,790,429 A * | 8/1998 | Baker et al. | 700/304 |
| 5,883,810 A * | 3/1999 | Franklin et al. | 700/232 |
| 6,612,488 B2 * | 9/2003 | Suzuki | 235/380 |
| 7,954,703 B2 * | 6/2011 | Miller et al. | 235/379 |
| 8,152,055 B2 * | 4/2012 | Miller et al. | 235/379 |
| 8,353,450 B2 * | 1/2013 | Miller et al. | 235/379 |

* cited by examiner

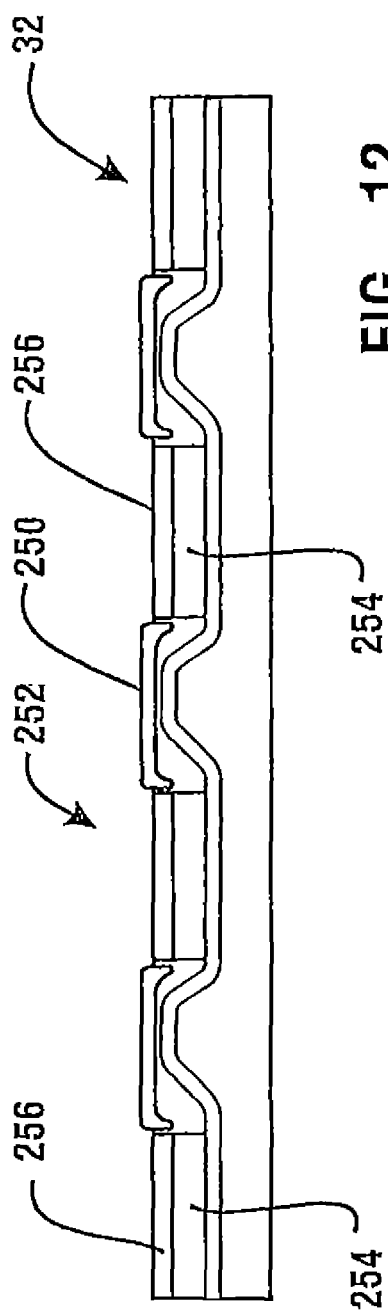
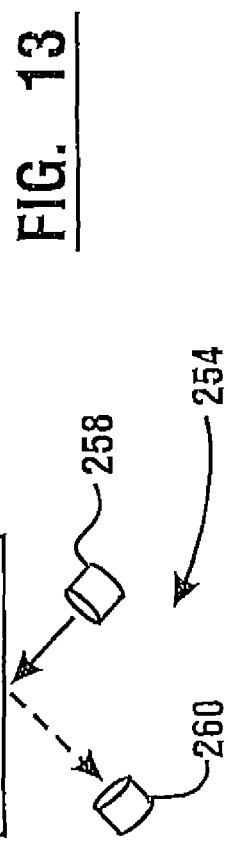
FIG. 12
FIG. 13

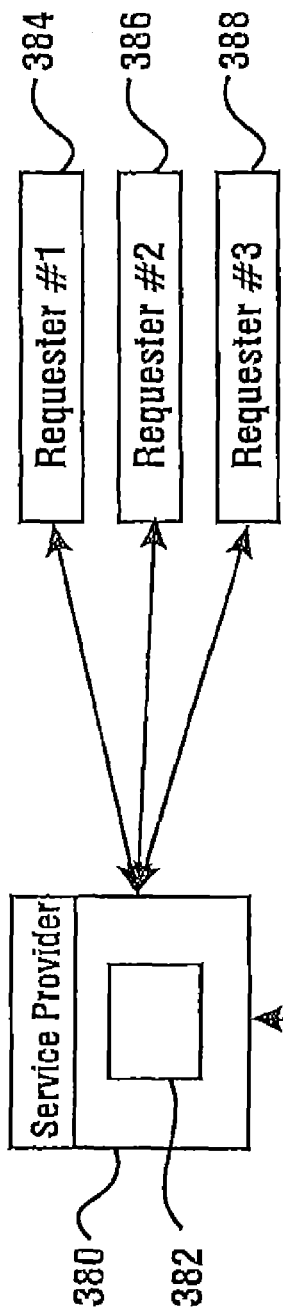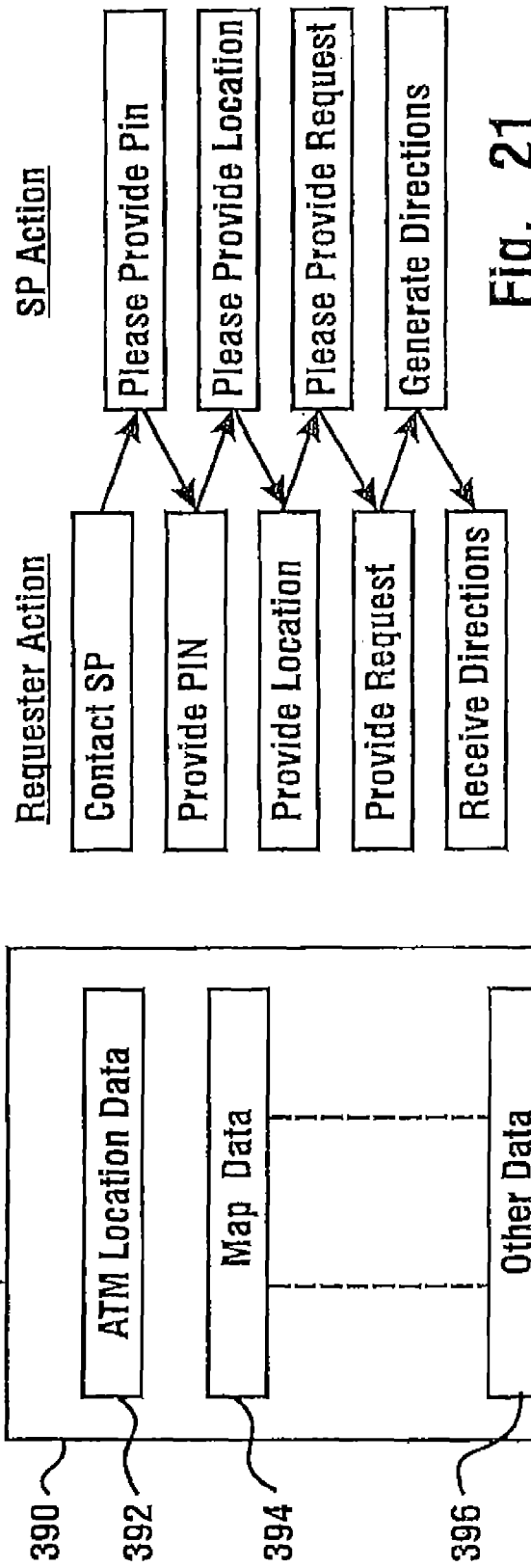

BANKING SYSTEM CONTROLLED RESPONSIVE TO DATA BEARING RECORDS AND USER INPUT OF A PHONE RECEIVED SECURITY CODE

CROSS REFERENCE TO RELATED APPLICATIONS

This application is a continuation of U.S. application Ser. No. 13/441,895 filed Apr. 8, 2012, now U.S. Pat. No. 8,353,450, which is a continuation of U.S. application Ser. No. 13/134,128 filed May 31, 2011, now U.S. Pat. No. 8,152,055, which is a continuation of U.S. application Ser. No. 12/800,878 filed May 25, 2010, now U.S. Pat. No. 7,954,703, which is a continuation of U.S. application Ser. No. 12/584,491 filed Sep. 4, 2009, now U.S. Pat. No. 7,946,480, which both claims benefit of U.S. Provisional Application 61/270,359 filed Jul. 6, 2009 and is a continuation-in-part of U.S. application Ser. No. 12/455,602 filed Jun. 3, 2009, now U.S. Pat. No. 7,861,924, which is a continuation of U.S. application Ser. No. 11/370,513 filed Mar. 7, 2006, now U.S. Pat. No. 7,866,544, which both claims benefit of U.S. Provisional Application 60/660,070 filed Mar. 9, 2005 and is a continuation-in-part of U.S. application Ser. No. 10/832,960 filed Apr. 27, 2004, now U.S. Pat. No. 7,118,031, which both claims benefit of U.S. Provisional Application 60/560,674 filed Apr. 7, 2004 and is a continuation-in-part of U.S. application Ser. No. 10/601,813 filed Jun. 23, 2003, now U.S. Pat. No. 7,240,827, which claims benefit of U.S. Provisional Application 60/429,478 filed Nov. 26, 2002.

Application Ser. No. 12/584,491 is also a continuation-in-part of U.S. application Ser. No. 12/315,840 filed Dec. 5, 2008, now U.S. Pat. No. 7,686,213, which is a continuation of U.S. application Ser. No. 11/895,976 filed Aug. 28, 2007, now U.S. Pat. No. 7,461,779, which is a divisional of U.S. application Ser. No. 11/714,615 filed Mar. 6, 2007, now U.S. Pat. No. 7,392,938, which is a divisional of U.S. application Ser. No. 11/415,531 filed May 2, 2006, now U.S. Pat. No. 7,201,313, which is a divisional of U.S. application Ser. No. 10/795,926 filed Mar. 8, 2004, now U.S. Pat. No. 7,040,533, which is a continuation-in-part of U.S. application Ser. No. 09/826,675 filed Apr. 5, 2001, now U.S. Pat. No. 6,702,181, which is a divisional of U.S. application Ser. No. 09/076,051 filed May 11, 1998, now U.S. Pat. No. 6,315,195, which claims benefit of U.S. Provisional Application 60/082,299 filed Apr. 17, 1998.

Application Ser. No. 12/584,491 is also a continuation-in-part of U.S. application Ser. No. 11/975,907 filed Oct. 22, 2007, now U.S. Pat. No. 7,946,477, which claims benefit of U.S. Provisional Applications 60/918,453; 60/918,455; and 60/918,458, each of which was filed Mar. 16, 2007. Application Ser. No. 11/975,907 is also a continuation-in-part of U.S. application Ser. No. 11/093,741 filed Mar. 29, 2005, now U.S. Pat. No. 7,284,692, which claims benefit of U.S. Provisional Application 60/557,937 filed Mar. 31, 2004.

Application Ser. No. 12/584,491 is also a continuation-in-part of U.S. application Ser. No. 11/361,327 filed Feb. 23, 2006, now U.S. Pat. No. 7,584,885, which is a divisional of U.S. application Ser. No. 10/814,100 filed Mar. 31, 2004, now U.S. Pat. No. 7,004,385, which claims benefit of U.S. Provisional Application 60/459,791 filed Apr. 1, 2003.

The disclosures of each of the above applications are herein incorporated by reference.

TECHNICAL FIELD

This invention relates to automated banking machines that operate responsive to data read from data bearing records including user cards, and which may be classified in U.S. Class 235, Subclass 379.

BACKGROUND OF INVENTION

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is also often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of transactions. For purposes of this disclosure an automated banking machine, automated transaction machine or an automated teller machine (ATM) shall be deemed to include any machine that may be used to automatically carry out transactions involving transfers of value.

Automated banking machines may benefit from improvements.

OBJECTS OF EXEMPLARY EMBODIMENTS

It is an object of an exemplary embodiment to provide an automated banking machine that operates responsive to data bearing records.

It is an object of an exemplary embodiment to provide a more secure way of conducting transactions with automated banking machines.

It is a further object of an exemplary embodiment to provide an automated banking machine that includes additional ways for verifying that a transaction is authorized.

It is a further object of an exemplary embodiment to provide an automated banking machine that works in conjunction with a portable device such as a mobile phone to further assure that transactions are authorized.

It is a further object of an exemplary embodiment to provide a system including an automated banking machine that provides features to help assure that transactions are authorized.

It is a further object of an exemplary embodiment to provide a method of operating a banking system.

It is a further object of an exemplary embodiment to provide at least one article bearing computer executable instructions that are operative to cause an automated banking machine or other computer to carry out transactions.

Further objects of exemplary embodiments will be made apparent in the following Detailed Description of Exemplary Embodiments and the appended claims.

The foregoing objects are accomplished with a system including an automated banking machine that operates in response to data bearing records. The automated banking machine includes a card reader that operates to read data from user cards corresponding to financial accounts. The automated banking machine includes a user interface that includes one or more input devices and output devices. The automated banking machine is operative to communicate with one or more remote computers to cause financial transfers to and from accounts corresponding to card data read from user cards. The exemplary automated banking machine may include a cash dispenser that is operative to dispense cash to users of the machine. The automated banking machine may be operative to accept currency bills, checks or other instruments from machine users. Other embodiments of automated banking machines may include other types of transaction function devices that operate in the carrying out of transactions with the machine.

In exemplary embodiments the machine may receive identifying inputs from users that are usable to determine that the machine user is authorized to conduct a requested transaction at the machine. In some embodiments this may include the card data and/or other input data which is a personal identification number (PIN). Such input data may also include biometric data or other data that can be read from an article or perceived from a user through at least one input device.

In further exemplary embodiments the automated banking machine may require the user to provide additional inputs to the machine or to another device in order to authorize a transaction. This may include in exemplary embodiments, requiring that the user authorize a transaction in at least one additional way which helps to assure that the person requesting to conduct the transaction is an authorized user. In some embodiments this may include operation of the automated banking machine to cause a message to be sent to a particular device or network address associated with the user. This may include for example, causing a text message to be sent to a system address which corresponds to the user's mobile phone or similar device. For example in some embodiments the user may be notified that a transaction is currently being conducted at an automated banking machine. The user may be required to provide an input to the phone in order to authorize the transaction to proceed. This may include for example an authorization input indicating that the transaction should proceed. Alternatively or in addition the input may include a secret code, biometric input or other authorization input that is generally known only to or capable of being provided by the user. Alternatively or in addition an automated voice message may be sent to a user's mobile phone to obtain a responsive authorization input.

In other exemplary embodiments operation of an automated banking machine may cause a message to be sent to a mobile phone or other device associated with the user. The user may be prompted through such a message to input certain data to or take other actions at the ATM if they wish for a transaction to proceed. This may include for example a message with a random code (or other transaction associated identifier) that is presented to the user, and which code is required to be input to the ATM in order for the transaction to proceed. Upon input of this code or other verification thereof, the user is then enabled to proceed with their requested transaction. Again such communications may be carried out through text messages, e-mail messages, automated voice/response systems or other suitable systems.

Various approaches may be taken within the scope of the concepts described herein for purposes of providing improved authentication techniques for transactions.

BRIEF DESCRIPTION OF DRAWINGS

FIG. 12 is an exemplary side, cross sectional view of an ATM keypad.

FIG. 13 is a schematic representation of a sensor for sensing whether an unauthorized key input sensing device has been placed adjacent to the keypad.

FIG. 20 shows a service provider, database, and requester arrangement.

FIG. 21 shows a flowchart of a service process.

DETAILED DESCRIPTION OF EXEMPLARY EMBODIMENTS

Figure 1:
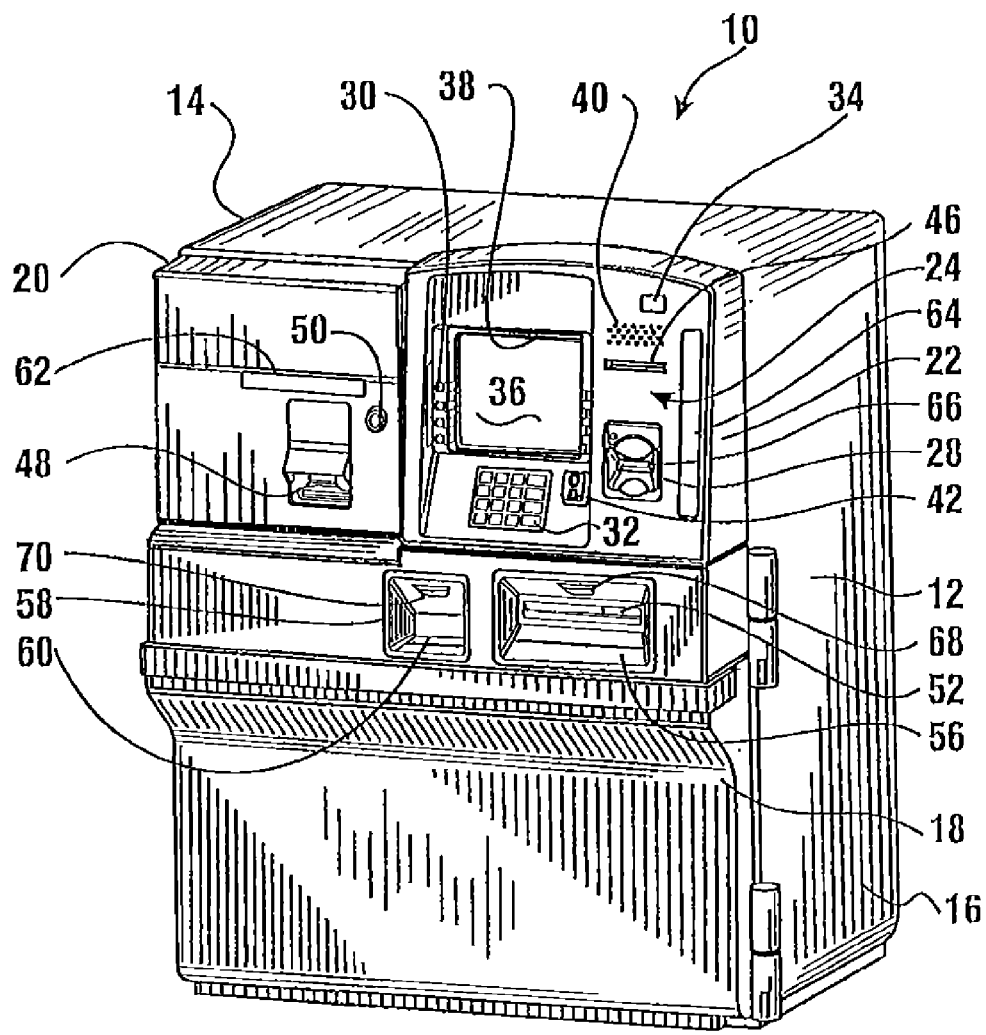
FIG. 1 is an isometric external view of an exemplary automated banking machine which is an ATM and which incorporates some aspects and features described in the present application.

Referring now to the drawings and particularly to FIG. 1, there is shown therein an exemplary embodiment of an automated banking machine generally indicated 10. In the exemplary embodiment automated banking machine 10 is a drive up ATM, however the features described and claimed herein are not necessarily limited to ATMs of this type. The exemplary ATM includes a housing 12. Housing 12 includes an upper housing area 14 and a secure chest area 16 in a lower portion of the housing. Access to the chest area 16 is controlled by a chest door 18 which when unlocked by authorized persons in the manner later explained, enables gaining access to the interior of the chest area.

The exemplary ATM 10 further includes a first fascia portion 20 and a second fascia portion 22. Each of the fascia portions is movably mounted relative to the housing as later explained, which in the exemplary embodiment facilitates servicing.

The ATM includes a user interface generally indicated 24. The exemplary user interface includes input devices such as a card reader 26 (shown in FIG. 3) which is in connection with a card reader slot 28 which extends in the second fascia portion. Other input devices of the exemplary user interface 24 include function keys 30 and a keypad 32. The exemplary ATM 10 also includes a camera 34 which operates as an image capture device and which also may serve as an input device for biometric features and the like. The exemplary user interface 24 also includes output devices such as a display 36. Display 36 is viewable by an operator of the machine when the machine is in the operative condition through an opening 38 in the second fascia portion 22. Further output devices in the exemplary user interface include a speaker 40. A headphone jack 42 also serves as an output device. The headphone jack may be connected to a headphone provided by a user who is visually impaired to provide the user with voice guidance in the operation of the machine. The exemplary machine further includes a receipt printer 44 (see FIG. 3) which is operative to provide users of the machine with receipts for transactions conducted. Transaction receipts are provided to users through a receipt delivery slot 46 which extends through the second fascia portion. Exemplary receipt printers that may be used in some embodiments are shown in U.S. Pat. No. 5,729,379 and U.S. Pat. No. 5,850,075, the entire disclosures of which are incorporated by reference herein. It should be understood that these input and output devices of the user interface 24 are exemplary and in other embodiments, other or different input and output devices may be used.

In the exemplary embodiment the second fascia portion has included thereon a deposit envelope providing opening 48. Deposit envelopes may be provided from the deposit envelope providing opening to users who may place deposits in the machine. The second fascia portion 20 also includes a fascia lock 50. Fascia lock 50 is in operative connection with the second fascia portion and limits access to the portion of the interior of the upper housing behind the fascia to authorized persons. In the exemplary embodiment fascia lock 50 comprises a key type lock. However, in other embodiments other types of locking mechanisms may be used. Such other types of locking mechanisms may include for example, other types of mechanical and electronic locks that are opened in response to items, inputs, signals, conditions, actions or combinations or multiples thereof.

The exemplary ATM 10 further includes a delivery area 52. Delivery area 52 is in connection with a currency dispenser device 54 which is alternatively referred to herein as a cash dispenser, which is positioned in the chest portion and is shown schematically in FIG. 3. For purposes hereof, a cash dispenser shall be deemed to include any device that causes stored currency such as coins and/or currency bills that are stored in the machine to be made available externally of the machine so that they may be taken by machine users. The delivery area 52 is a transaction area on the machine in which currency sheets are delivered to a user. In the exemplary embodiment the delivery area 52 is positioned and extends within a recessed pocket 56 in the housing of the machine.

ATM 10 further includes a deposit acceptance area 58. Deposit acceptance area is an area through which deposits such as deposit envelopes to be deposited by users are placed in the machine. The deposit acceptance area 58 is in operative connection with a deposit accepting device positioned in the chest area 16 of the ATM. Exemplary types of deposit accepting devices are shown in U.S. Pat. No. 4,884,769 and U.S. Pat. No. 4,597,330, the entire disclosures of which are incorporated herein by reference.

In the exemplary embodiment the deposit acceptance area serves as a transaction area of the machine and is positioned and extends within a recessed pocket 60. It should be understood that while the exemplary embodiment of ATM 10 includes an envelope deposit accepting device and a currency sheet dispenser device, other or different types of transaction function devices may be included in automated banking machines. These may include for example, check and/or money order accepting devices, ticket accepting devices, stamp accepting devices, card dispensing devices, money order dispensing devices and other types of devices which are operative to carry out transaction functions.

In the exemplary embodiment the ATM 10 includes certain illuminating devices which are used to illuminate transaction areas, some of which are later discussed in detail. First fascia portion 20 includes an illumination panel 62 for illuminating the deposit envelope providing opening. Second fascia portion 22 includes an illumination panel 64 for illuminating the area of the receipt delivery slot 46 and the card reader slot 28. Further, an illuminated housing 66 later discussed in detail, bounds the card reader slot 28. Also, in the exemplary embodiment an illuminating window 68 is positioned in the recessed pocket 56 of the delivery area 52. An illuminating window 70 is positioned in the recessed pocket 60 of the deposit acceptance area 58. It should be understood that these structures and features are exemplary and in other embodiments other structures and features may be used.

Figure 3:
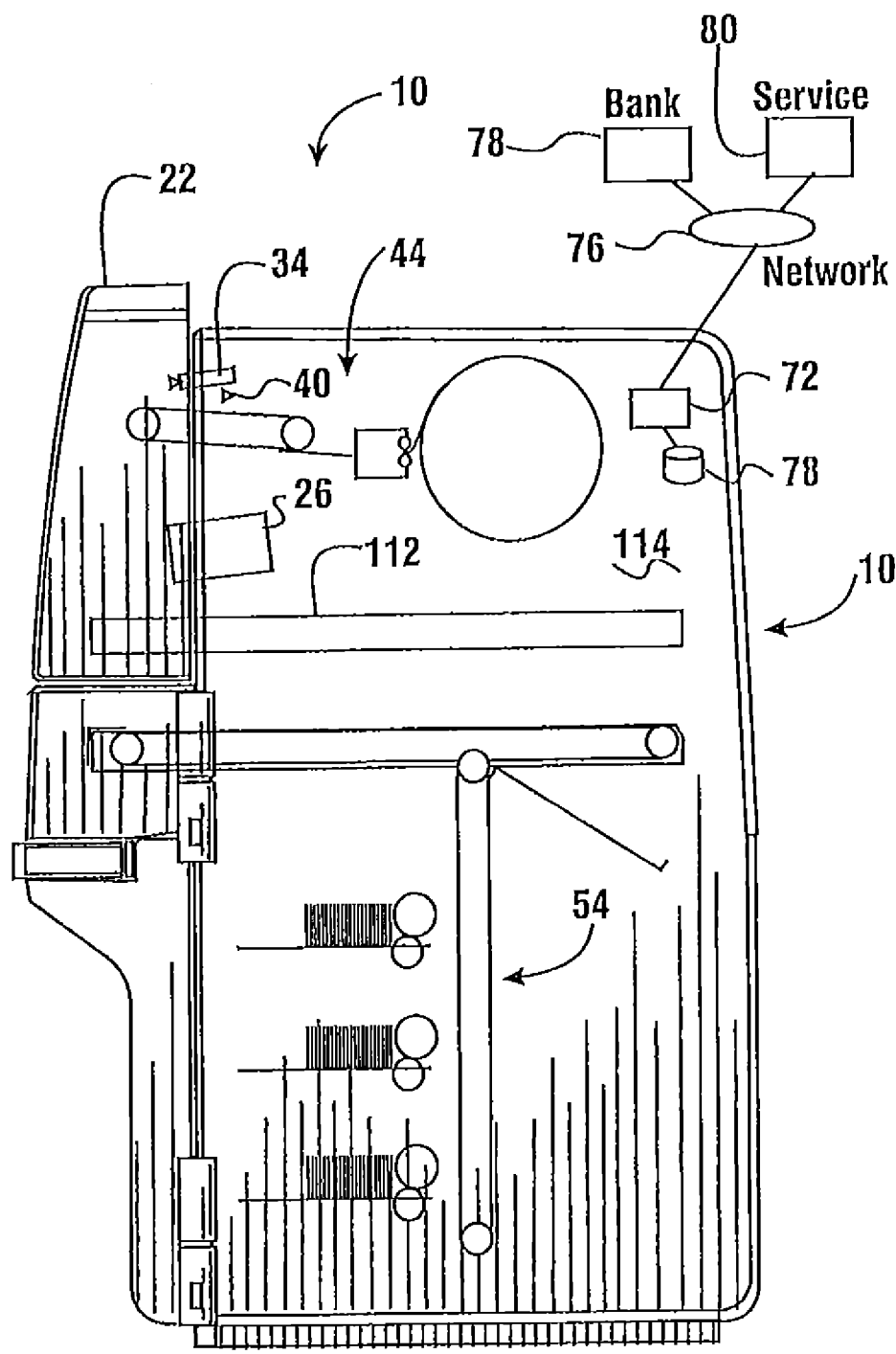
FIG. 3 is a transparent side view showing schematically some internal features of the ATM.

As schematically represented in FIG. 3, the ATM 10 includes one or more internal computers. Such internal computers include one or more processors. Such processors may be in operative connection with one or more data stores. In some embodiments processors may be located on certain devices within the ATM so as to individually control the operation thereof. Examples such as multi-tiered processor systems are shown in U.S. Pat. No. 6,264,101 and U.S. Pat. No. 6,131,809, the entire disclosures of which are incorporated herein by reference.

For purposes of simplicity, the exemplary embodiment will be described as having a single controller which is alternatively referred to herein as a computer, which controls the operation of devices within the machine. However it should be understood that such reference shall be construed to encompass multicontroller and multiprocessor systems as may be appropriate in controlling the operation of a particular machine. In FIG. 3 the controller is schematically represented 72. Also as schematically represented, the controller is in operative connection with one or more data stores 78. Such data stores in exemplary embodiments are operative to store program instructions, values and other information used in the operation of the machine. Although the controller is schematically shown in the upper housing portion of ATM 10, it should be understood that in alternative embodiments controllers may be located within various portions of the automated banking machine.

In order to conduct transactions the exemplary ATM 10 communicates with remote computers. The remote computers are operative to exchange messages with the machine and authorize and record the occurrence of various transactions. This is represented in FIG. 3 by the communication of the machine through a network with a bank 78, which has at least one computer which is operative to exchange messages with the ATM through a network. The bank computer is alternatively referred to herein as a host. For example, the bank 78 may receive one or more messages from the ATM requesting authorization to allow a customer to withdraw $200 from the customer's account. In an exemplary embodiment the ATM operates to send at least one message including data corresponding to card data read from the user's card as well as a personal identification number (PIN) and/or other identifying data to the remote computer. The data included in the one or more messages sent by the ATM enables the remote computer to determine that the user at the ATM is an authorized user who is permitted to conduct the requested transaction. The remote host computer at the bank 78 will operate to determine that such a withdrawal is authorized and will return one or more messages to the machine through the network authorizing the transaction. After the ATM conducts the transaction, the ATM will generally send one or more messages back through the network to the bank indicating that the transaction was successfully carried out. Of course these messages are merely exemplary.

It should be understood that in some embodiments the ATM may communicate with other entities and through various networks. For example as schematically represented in FIG. 3, the ATM will communicate with computers operated by service providers 80. Such service providers may be entities to be notified of status conditions or malfunctions of the ATM as well as entities who are to be notified of corrective actions. An example of such a system for accomplishing this is shown in U.S. Pat. No. 5,984,178, the entire disclosure of which is incorporated herein by reference. Other third parties who may receive notifications from exemplary ATMs include entities responsible for delivering currency to the machine to assure that the currency supplies are not depleted. Other entities may be responsible for removing deposit items from the machine. Alternative entities that may be notified of actions at the machine may include entities which hold marketing data concerning consumers and who provide messages which correspond to marketing messages to be presented to consumers. For example some embodiments may operate in a manner described in U.S. Pat. No. 7,516,087, the entire disclosure of which is incorporated herein by reference. Various types of messages may be provided to remote systems and entities by the machine depending on the capabilities of the machines in various embodiments and the types of transactions being conducted.

Figure 4:
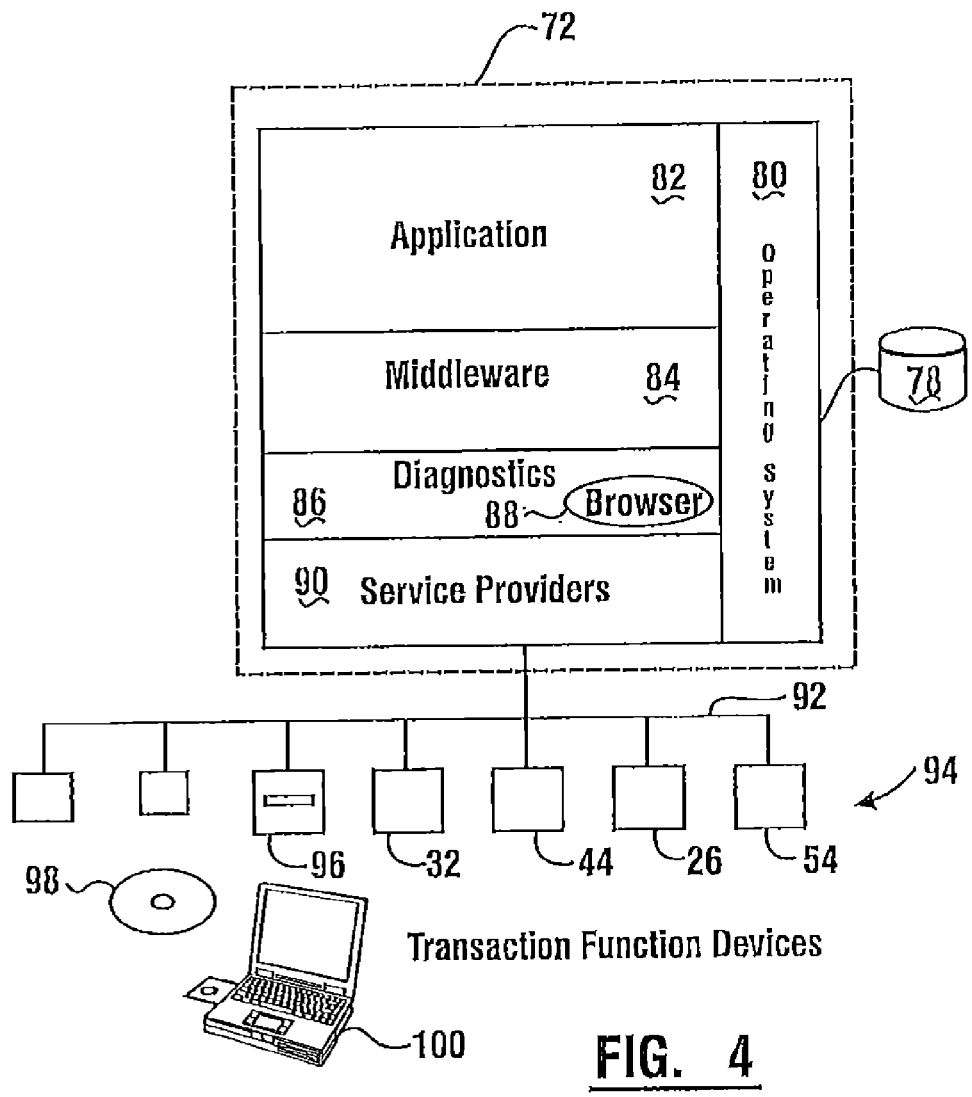
FIG. 4 is a schematic view representative of the software architecture of an exemplary embodiment.

FIG. 4 shows schematically an exemplary software architecture which may be operative in the controller 72 of machine 10. The exemplary software architecture includes an operating system such as for example Microsoft® Windows, IBM OS/2® or Linux. The exemplary software architecture also includes an ATM application schematically represented 82. The exemplary application includes the instructions for the operation of the automated banking machine and may include, for example, an Agilis™ 91x application that is commercially available from Diebold, Incorporated which is a cross vendor software application for operating ATMs. Further examples of software applications which may be used in some embodiments are shown in U.S. Pat. Nos. 6,289,320 and 6,505,177, the entire disclosures of which are herein incorporated by reference.

In the exemplary embodiment middleware software schematically indicated 84 is operative in the controller. In the exemplary embodiment the middleware software operates to compensate for differences between various types of automated banking machines and transaction function devices used therein. The use of a middleware layer enables the more ready use of an identical software application on various types of ATM hardware. In the exemplary embodiment the middleware layer may be Involve® software which is commercially available from a wholly owned subsidiary of the assignee of the present invention.

The exemplary software architecture further includes a diagnostics layer 86. The diagnostics layer 86 is operative as later explained to enable accessing and performing various diagnostic functions of the devices within the ATM. In the exemplary embodiment the diagnostics operate in conjunction with a browser schematically indicated 88.

The exemplary software architecture further includes a service provider layer schematically indicated 90. The service provider layer may include software such as WOSA XFS service providers for J/XFS service providers which present a standardized interface to the software layers above and which facilitate the development of software which can be used in conjunction with different types of ATM hardware. Of course this software architecture is exemplary and in other embodiments other architectures may be used.

As schematically represented in FIG. 4, a controller 72 is in operative connection with at least one communications bus 92. The communications bus may in some exemplary embodiments be a universal serial bus (USB) or other standard or nonstandard type of bus architecture. The communications bus 92 is schematically shown in operative connection with transaction function devices 94. The transaction function devices include devices in the ATM which are used to carry out transactions. These may include for example the currency dispenser device 54, card reader 26, receipt printer 44, keypad 32, as well as numerous other devices which are operative in the machine and controlled by the controller to carry out transactions. In the exemplary embodiment one of the transaction function devices in operative connection with the controller is a diagnostic article reading device 96 which may be operative to read a diagnostic article schematically indicated 98 which may provide software instructions useful in servicing the machine. Alternatively and/or in addition, provision may be made for connecting the bus 92 or other devices in the machine computer device 100 which may be useful in performing testing or diagnostic activities related to the ATM.

Figure 5:
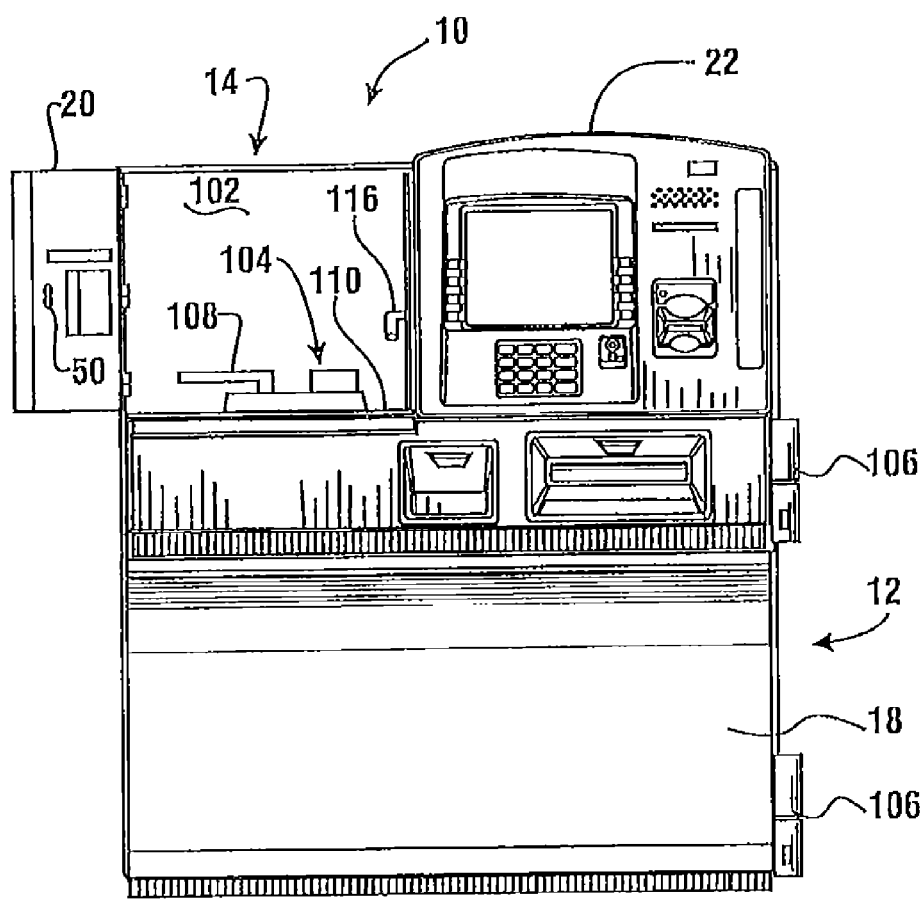
FIG. 5 is a front view showing the fascia portion moved to access a first portion of an upper housing of the machine.

In the exemplary embodiment of ATM 10 the first fascia portion 20 and the second fascia portion 22 are independently movably mounted on the ATM housing 12. This is accomplished through the use of hinges attached to fascia portion 20. The opening of the fascia lock 50 on the first fascia portion 20 enables the first fascia portion to be moved to an open position as shown in FIG. 5. In the open position of the first fascia portion an authorized user is enabled to gain access to a first portion 102 in the upper housing area 14. In the exemplary embodiment there is located within the first portion 102 a chest lock input device 104. In this embodiment the chest lock input device comprises a manual combination lock dial, electronic lock dial or other suitable input device through which a combination or other unlocking inputs or articles may be provided. In this embodiment, input of a proper combination enables the chest door 18 to be moved to an open position by rotating the door about hinges 106. In the exemplary embodiment the chest door is opened once the proper combination has been input by manipulating a locking lever 108 which is in operative connection with a boltwork. The boltwork which is not specifically shown, is operative to hold the chest door in a locked position until the proper combination is input. Upon input of the correct combination the locking lever enables movement of the boltwork so that the chest door can be opened. The boltwork also enables the chest door to be held locked after the activities in the chest portion have been conducted and the chest door is returned to the closed position. Of course in other embodiments other types of mechanical or electrical locking mechanisms may be used. In the exemplary embodiment the chest lock input device 104 is in supporting connection with a generally horizontally extending dividing wall 110 which separates the chest portion from the upper housing portion. Of course this housing structure is exemplary and in other embodiments other approaches may be used.

An authorized servicer who needs to gain access to an item, component or device of the ATM located in the chest area may do so by opening the fascia lock and moving the first fascia portion 20 so that the area 102 becomes accessible. Thereafter the authorized servicer may access and manipulate the chest lock input device to receive one or more inputs, which if appropriate enables unlocking of the chest door 18. The chest door may thereafter be moved relative to the housing and about its hinges 106 to enable the servicer to gain access to items, devices or components within the chest. These activities may include for example adding or removing currency, removing deposited items such as envelopes or checks, or repairing mechanisms or electrical devices that operate to enable the machine to accept deposited items or to dispense currency. When servicing activity within the chest is completed, the chest door may be closed and the locking lever 108 moved so as to secure the boltwork holding the chest door in a closed position. Of course this structure and service method is exemplary and in other embodiments other approaches may be used.

In the exemplary embodiment the second fascia portion 22 is also movable relative to the housing of the machine. In the exemplary embodiment the second fascia portion 22 is movable in supporting connection with a rollout tray 112 schematically shown in FIG. 3. The rollout tray is operative to support components of the user interface thereon as well as the second fascia portion. The rollout tray enables the second fascia portion to move outward relative to the ATM housing thereby exposing components and transaction function devices supported on the tray and providing access to a second portion 114 within the upper housing and positioned behind the second fascia portion. Thus as can be appreciated, when the second fascia portion is moved outward, the components on the tray are disposed outside the housing of the machine so as to facilitate servicing, adjustment and/or replacement of such components. Further components which remain positioned within the housing of the machine as the rollout tray is extended, become accessible in the second portion as the second fascia portion 22 is disposed outward and away from the housing.

Figure 2:
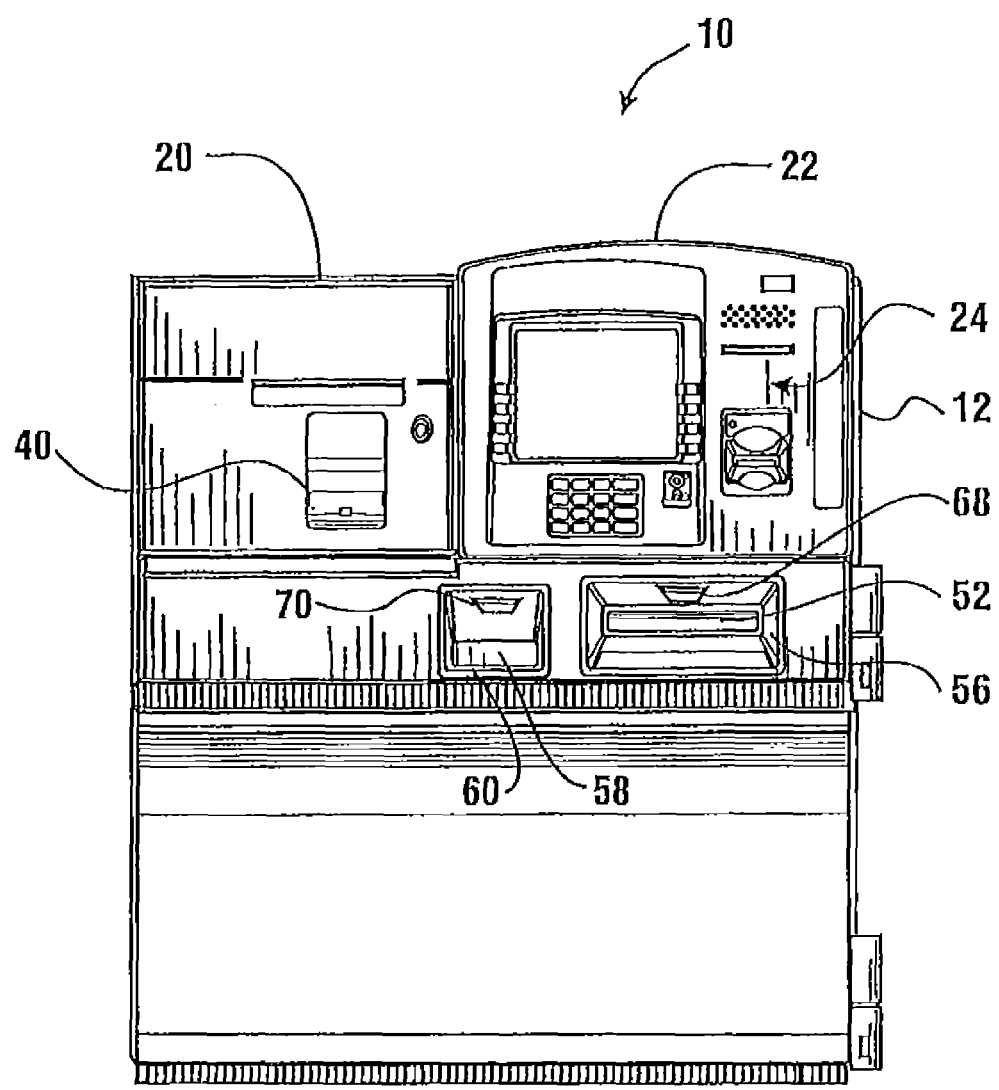
FIG. 2 is a front plan view of the ATM shown in FIG. 1.

In the exemplary embodiment the rollout tray 112 is in operative connection with a releasible locking device. The locking device is generally operative to hold the tray in a retracted position such that the second fascia portion remains in an operative position adjacent to the upper housing area as shown in FIGS. 1, 2 and 3. This releasible locking mechanism may comprise one or more forms of locking type devices. In the exemplary embodiment the releasible locking mechanism may be released by manipulation of an actuator 116 which is accessible to an authorized user in the first portion 102 of the upper housing 14. As a result an authorized servicer of the machine is enabled to move the second fascia portion outward for servicing by first accessing portion 102 in the manner previously discussed. Thereafter by manipulating the actuator 116 the second fascia portion is enabled to move outward as shown in phantom in FIG. 8 so as to facilitate servicing components on the rollout tray. Such components may include for example a printer or card reader. After such servicing the second fascia portion may be moved toward the housing so as to close the second portion 114. Such movement in the exemplary embodiment causes the rollout tray to be latched and held in the retracted position without further manipulation of the actuator. However, in other embodiments other types of locking mechanisms may be used to secure the rollout tray in the retracted position. It should be understood that this approach is exemplary and in other embodiments other approaches may be used.

Figure 6:
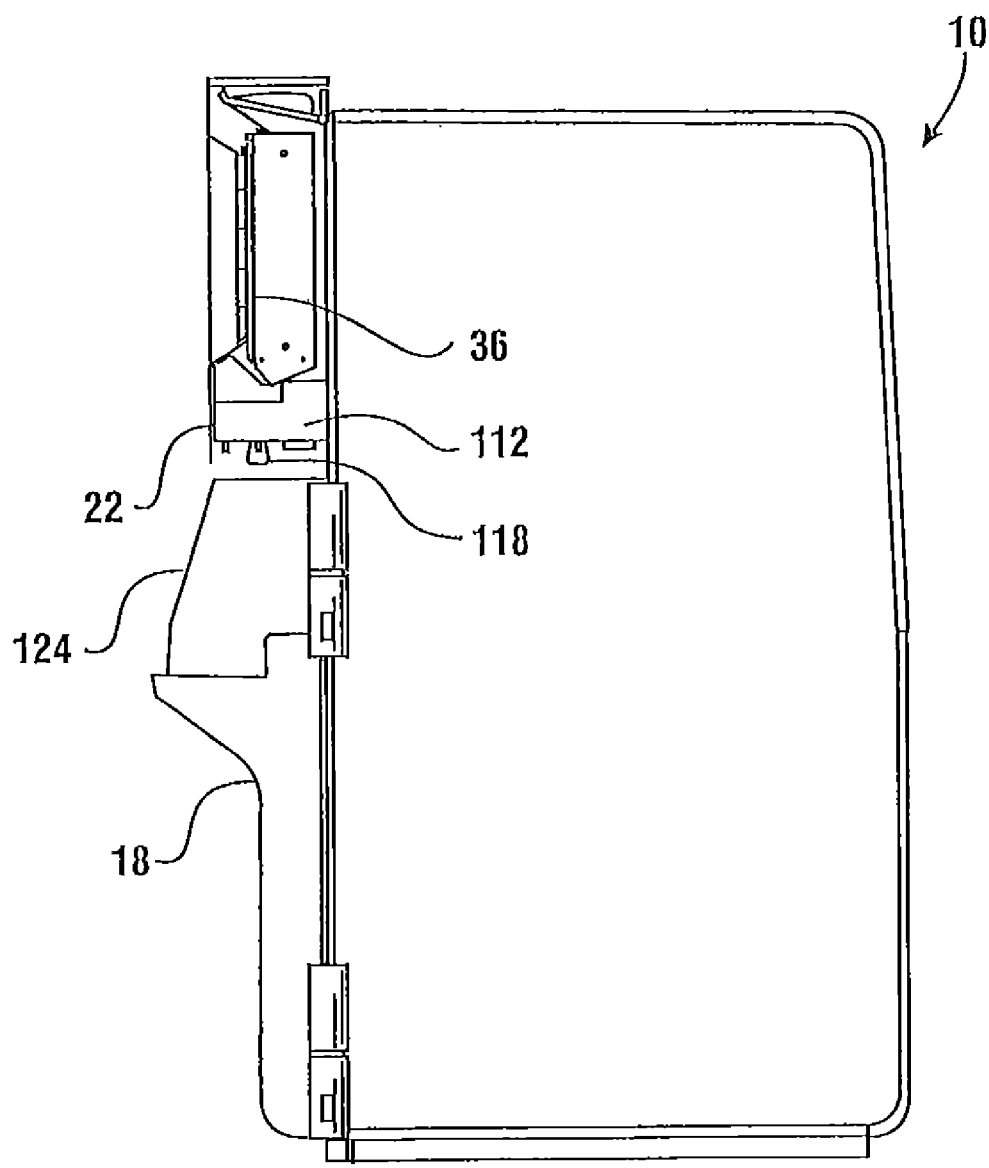
FIG. 6 is a partially transparent side view showing air flow through an air cooling opening of the machine.
Figure 7:
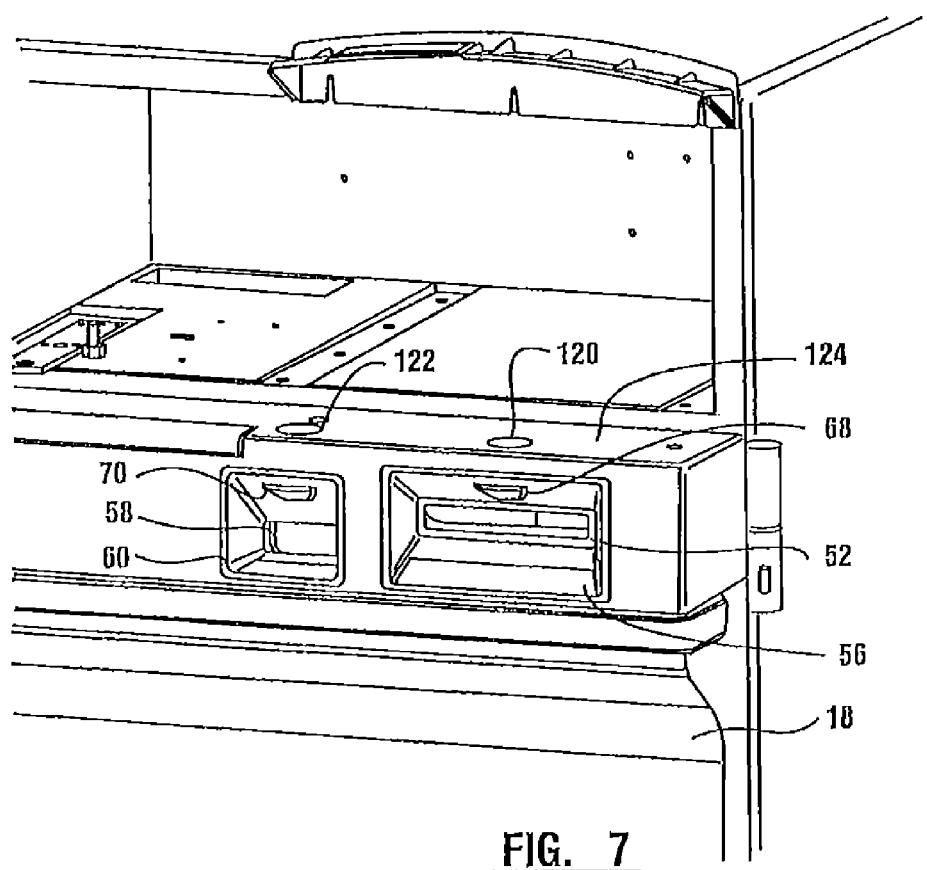
FIG. 7 is an isometric view of the ATM shown in FIG. 1 with the components of the upper housing portion removed.
Figure 10:
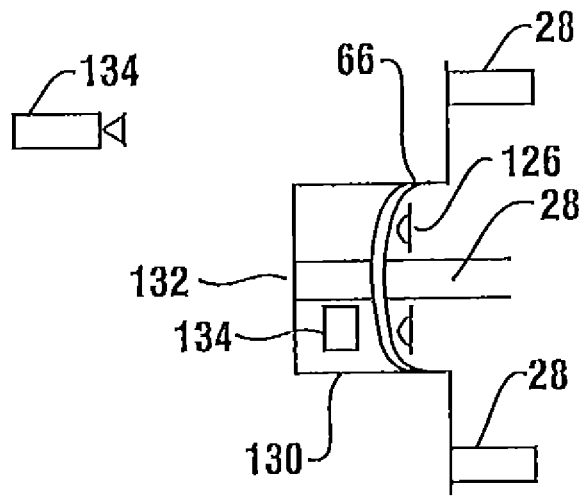
FIG. 10 is a schematic side view of an unauthorized card reading device in operative connection with a housing of the anti-fraud sensor.

As best shown in FIG. 7 in which the components supported in the upper housing are not shown, the delivery area 52 and the deposit acceptance area 58 are in supporting connection with the chest door 18. As such when the chest door 18 is opened, the delivery area 52 and the deposit acceptance area 58 will move relative to the housing of the machine. The exemplary embodiment shown facilitates servicing of the machine by providing for the illumination for the transaction areas by illumination sources positioned in supporting connection with the rollout tray 112. As best shown in FIG. 6, these illumination sources 118 are movable with the rollout tray and illuminate in generally a downward direction. In the operative position of the second fascia portion 22 and the chest door 18, the illumination sources are generally aligned with apertures 120 and 122 which extend through the top of a cover 124 which generally surrounds the recessed pockets 60 and 56. As shown in FIG. 10 aperture 120 is generally vertically aligned with window 68 and aperture 122 is generally aligned with window 70. In an exemplary embodiment apertures 120 and 122 each have a translucent or transparent lens positioned therein to minimize the risk of the introduction of dirt or other contaminants into the interior of the cover 124.

Figure 8:
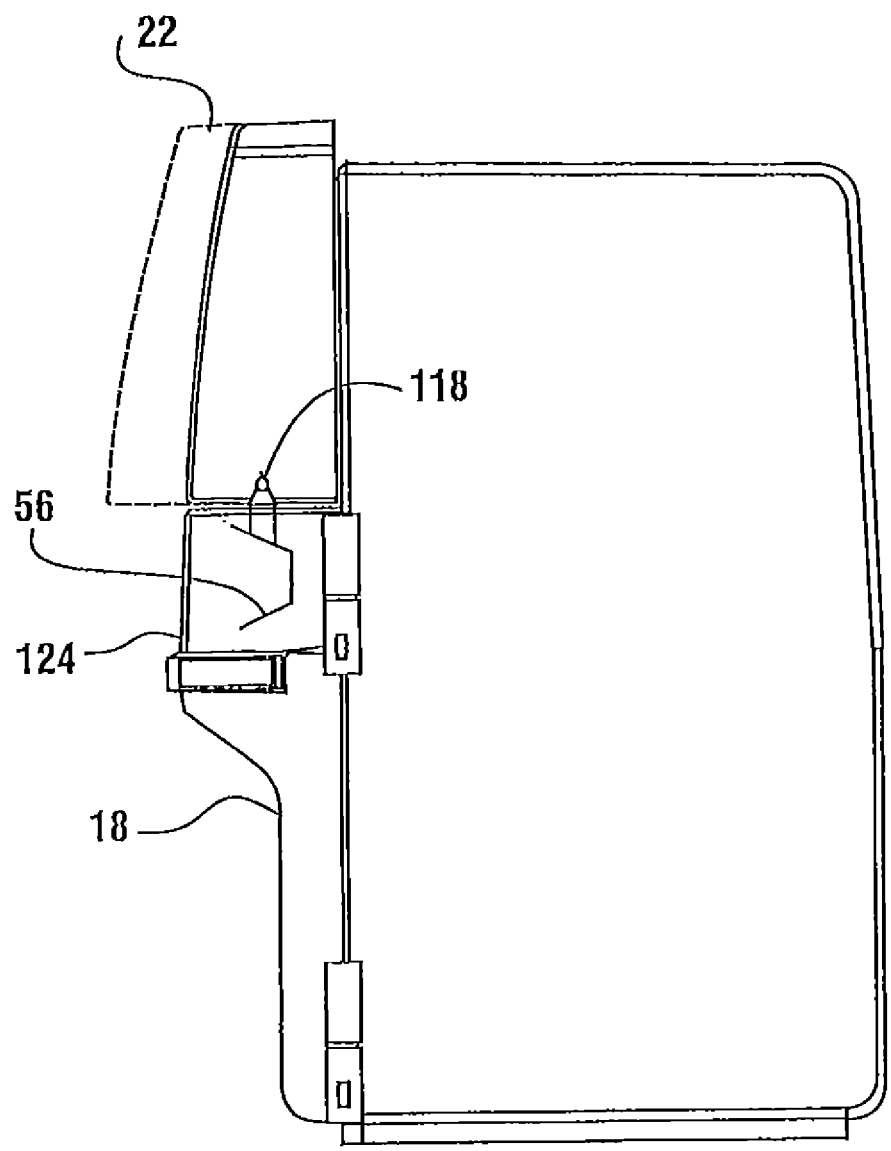
FIG. 8 is a schematic side view of the housing showing schematically the illumination system for the transaction areas and representing in phantom the movement of the upper fascia portion so as to provide access for servicing.

As can be appreciated from FIGS. 6 and 8, when the chest door 18 is closed and the second fascia portion 22 is moved to the operative position, the illumination sources 118 are positioned in generally aligned relation with apertures 120 and 122. As a result the illumination of the illumination devices is operative to cause light to be transmitted through the respective aperture and to illuminate the transaction area within the corresponding recessed pocket.

In operation of an exemplary embodiment, the controller executes programmed instructions so as to initiate illumination of each transaction area at appropriate times during the conduct of transactions. For example in the exemplary embodiment if the user is conducting a cash withdrawal transaction, the controller may initiate illumination of the delivery area 52 when the cash is delivered therein and is available to be taken by a user. Such illumination draws the user's attention to the need to remove the cash and will point out to the user that the cash is ready to be taken. In the exemplary embodiment the controller is programmed so that when the user takes the cash the machine will move to the next transaction step. After the cash is sensed as taken, the controller may operate to cease illumination of the delivery area 56. Of course these approaches are exemplary.

Likewise, in an exemplary embodiment, if a user of the machine indicates that they wish to conduct a deposit transaction, the controller may cause the machine to operate to initiate illumination of the deposit acceptance area 58. The user's attention is drawn to the place where they must insert the deposit envelope in order to have it be accepted in the machine. In the exemplary embodiment the controller may operate to also illuminate the illumination panel 62 to illuminate the deposit envelope providing opening 48 so that the user is also made aware of the location from which a deposit envelope may be provided. In an exemplary embodiment the controller may operate to cease illumination through the window 70 and/or the illumination panel 62 after the deposit envelope is indicated as being sensed within the machine.

In alternative embodiments other approaches may be taken. This may include for example drawing the customer's attention to the particular transaction area by changing the nature of the illumination in the recessed pocket to which the customer's attention is to be drawn. This may be done for example by changing the intensity of the light, flashing the light, changing the color of the light or doing other actions which may draw a user's attention to the appropriate transaction area. Alternatively or in addition, a sound emitter, vibration, projecting pins or other indicator may be provided for visually impaired users so as to indicate to them the appropriate transaction area to which the customer's attention is to be drawn. Of course these approaches are exemplary and in other embodiments other approaches may be used.

Figure 9:
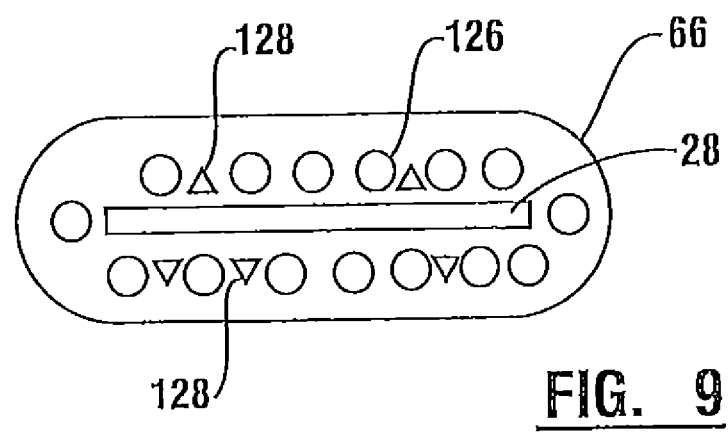
FIG. 9 is a schematic view of an illumination and anti-fraud sensing device which bounds a card reader slot of an exemplary embodiment.

As previously discussed the exemplary embodiment of ATM 10 is also operative to draw a user's attention at appropriate times to the card reader slot 28. ATM 10 also includes features to minimize the risk of unauthorized interception of card data by persons who may attempt to install a fraud device such as an unauthorized card reading device on the machine. As shown in FIG. 9, the exemplary card slot 28 extends through a card slot housing 66 which extends in generally surrounding relation of the card slot. It should be understood that although the housing 66 generally bounds the entire card slot, in other embodiments the principles described herein may be applied by bounding only one or more sides of a card slot as may be appropriate for detecting unauthorized card reading devices. Further, it should be understood that while the exemplary embodiment is described in connection with a card reader that accepts a card into the machine, the principles being described may be applied to types of card readers that do not accept a card into the machine, such as readers where a user draws the card through a slot, inserts and removes a card manually from a slot and other card reading structures.

In the exemplary embodiment the housing 66 includes a plurality of radiation emitting devices 126. The radiation emitting devices emit visible radiation which can be perceived by a user of the machine. However, in other embodiments the radiation emitting devices may include devices which emit nonvisible radiation such as infrared radiation, but which nonetheless can be used for sensing the presence of unauthorized card reading devices adjacent to the card slot. In the exemplary embodiment the controller operates to illuminate the radiation emitting devices 126 at appropriate times during the transaction sequence. This may include for example times during transactions when a user is prompted to input the card into the machine or alternatively when a user is prompted to take the card from the card slot 28. In various embodiments the controller may be programmed to provide solid illumination of the radiation emitting devices or may vary the intensity of the devices as appropriate to draw the user's attention to the card slot.

In the exemplary embodiment the card slot housing 66 includes therein one or more radiation sensing devices 128. The radiation sensing devices are positioned to detect changes in at least one property of the radiation reflected from the emitting devices 126. The sensing devices 128 are in operative connection with the controller. The controller is operative responsive to its programming to compare one or more values corresponding to the magnitude and/or other properties of radiation sensed by one or more of the sensors, to one or more stored values and to make a determination whether the comparison is such that there is a probable unauthorized card reading device installed on the fascia of the machine. In some embodiments the controller may be operative to execute fuzzy logic programming for purposes of determining whether the natures of the change in reflected radiation or other detected parameters are such that there has been an unauthorized device installed and whether appropriate personnel should be notified.

FIG. 10 shows a side view of the housing 66. An example of a fraud device which comprises unauthorized card reading device 130 is shown attached externally to the housing 66. The unauthorized card reading device includes a slot 132 generally aligned with slot 128. The device 130 also includes a sensor shown schematically as 134 which is operative to sense the encoded magnetic flux reversals which represent data on the magnetic stripe of a credit or debit card. As can be appreciated, an arrangement of the type shown in FIG. 10 enables the sensor 134 if properly aligned adjacent to the magnetic stripe of a card, to read the card data as the card passes in and out of slot 128. Such an unauthorized reading device may be connected via radio frequency (RF) or through inconspicuous wiring to other devices which enable interception of the card data. In some situations criminals may also endeavor to observe the input of the user's PIN corresponding to the card data so as to gain access to the account of the user.

As can be appreciated from FIG. 10 the installation of the unauthorized card reading device 130 changes the amount of radiation from emitting devices 126 and that is reflected or otherwise transmitted to the sensors 128. Depending on the nature of the device and its structure, the amount or other properties of radiation may increase or decrease. However, a detectable change will often occur in the magnitude or other properties of sensed radiation between a present transaction and a prior transaction which was conducted prior to an unauthorized card reading device being installed. Of course the sensing of the magnitude of radiation is but one example of a property of radiation that may be sensed as having changed so as to indicate the presence of an unauthorized reading device.

Figure 11:
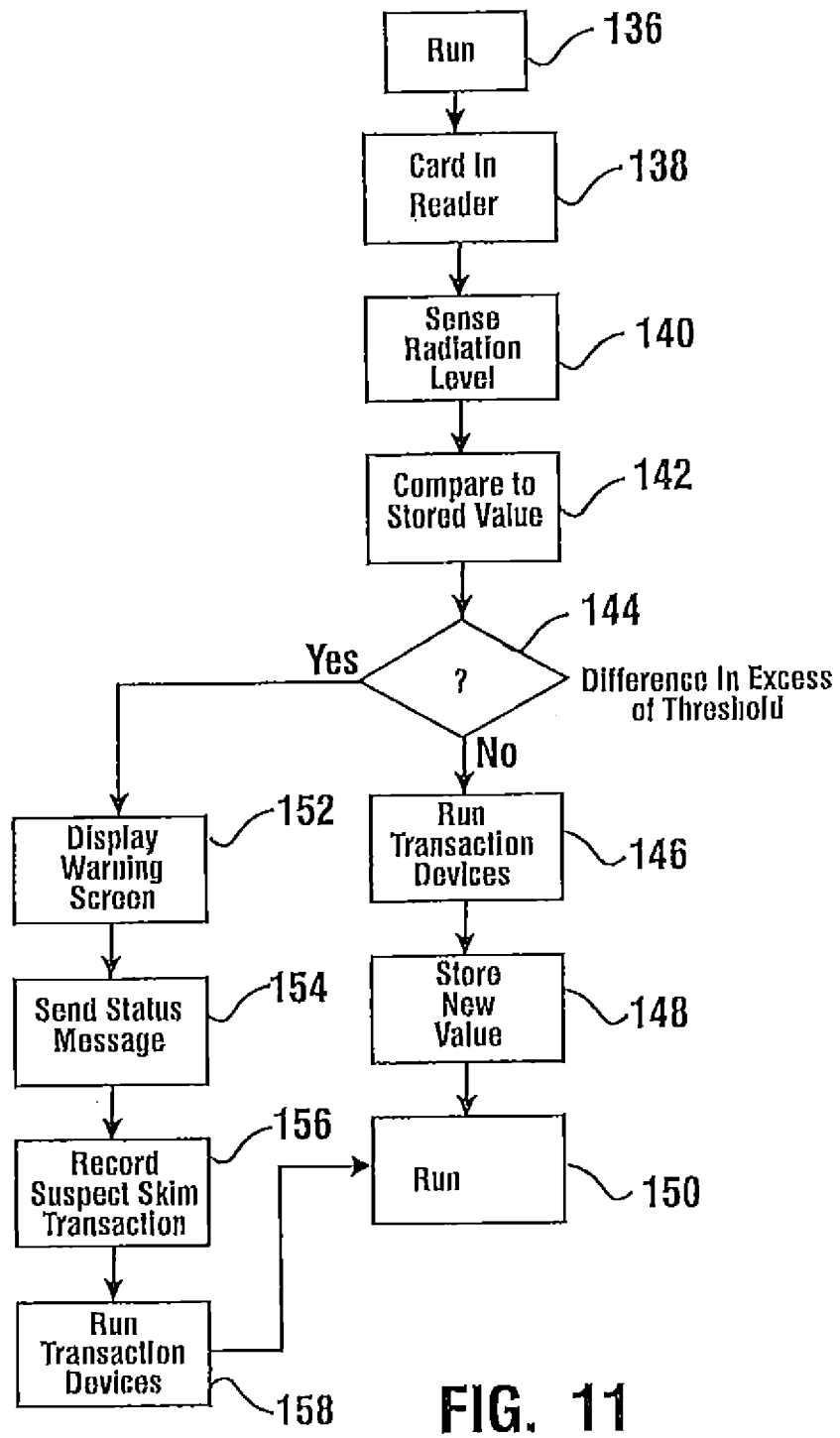
FIG. 11 is a schematic view of exemplary logic for purposes of detecting the presence of an unauthorized card reading device in proximity to the card reader during operation of the ATM.

FIG. 11 demonstrates an exemplary simplified logic flow executed by a controller for detecting the installation of an unauthorized card reading device. It should be understood that this transaction logic is part of the overall operation of the machine to carry out transactions. In this exemplary logic flow the machine operates to carry out card reading transactions in a normal manner and to additionally execute the represented steps as a part of such logic each time a card is read. From an initial step 136 the controller in the machine is operative to sense that a card is in the reader within the machine in a step 138. Generally in these circumstances the controller will be operating the radiation emitting devices 126 as the user has inserted their card and the card has been drawn into the machine. In this exemplary embodiment the controller continues to operate the radiation emitting devices and senses the radiation level or levels sensed by one or more sensors 128. This is done in a step 140.

The controller is next operative to compare the signals corresponding to the sensed radiation levels to one or more values in a step 142. This comparison may be done a number of ways and may in some embodiments execute fuzzy logic so as to avoid giving false indications due to acceptable conditions such as a user having the user's finger adjacent to the card slot 28 during a portion of the transaction. In the case of a user's finger for example, the computer may determine whether an unauthorized reading device is installed based on the nature, magnitude and changes during a transaction in sensed radiation, along with appropriate programmed weighing factors. Of course various approaches may be used within the scope of the concept discussed herein. However, based on the one or more comparisons in step 142 the controller is operative to make a decision at step 144 as to whether the sensed value(s) compared to stored value(s) compared in step 142 have a difference that is in excess of one or more thresholds which suggest that an unauthorized card reading device has been installed.

If the comparison does not indicate a result that exceeds the threshold(s) the ATM transaction devices are run as normal as represented in a step 146. For example, a customer may be prompted to input a PIN, and if the card data and PIN are valid, the customer may be authorized to conduct a cash dispensing transaction through operation of the machine. Further in the exemplary embodiment, the controller may operate to adjust the stored values to some degree based on the more recent readings. This may be appropriate in order to compensate for the effects of dirt on the fascia or loss of intensity of the emitting devices or other factors. This is represented in a step 148. In step 148 the controller operates the ATM to conduct transaction steps in the usual manner as represented in a step 150.

If in step 144 the difference between the sensed and stored values exceeds the threshold(s), then this is indicative that an unauthorized card reading device may have been installed since the last transaction. In the exemplary embodiment when this occurs, the controller is operative to present a warning screen to the user as represented in a step 152. This warning screen may be operative to advise the user that an unauthorized object has been sensed adjacent to the card reader slot. This may warn a user for example that a problem is occurring. Alternatively if a user has inadvertently placed innocently some object adjacent to the card reader slot, then the user may withdraw it. In addition or in the alternative, further logic steps may be executed such as prompting a user to indicate whether or not they can see the radiation emitting devices being illuminated adjacent to the card slot and prompting the user to provide an input to indicate if such items are visible. Additionally or in the alternative, the illuminating devices within the housing 66 may be operative to cause the emitting devices to output words or other symbols which a user can indicate that they can see or cannot see based on inputs provided as prompts from output devices of the machine. This may enable the machine to determine whether an unauthorized reading device has been installed or whether the sensed condition is due to other factors. It may also cause a user to note the existence of the reading device and remove it. Of course various approaches could be taken depending on the programming of the machine.

If an unauthorized reading device has been detected, the controller in the exemplary embodiment will also execute a step 154 in which a status message is sent to an appropriate service provider or other entity to indicate the suspected problem. This may be done for example through use of a system like that shown in U.S. Pat. No. 5,984,178 the entire disclosure of which is herein incorporated by reference. Alternatively messages may be sent to system addresses in a manner like that shown in U.S. Pat. No. 6,289,320 the entire disclosure of which is also herein incorporated by reference. In a step 156 the controller will also operate to record data identifying for the particular transaction in which there has been suspected interception of the card holder's card data. In addition or in the alternative, a message may be sent to the bank or other institution alerting them to watch for activity in the user's card account for purposes of detecting whether unauthorized use is occurring. Alternatively or in addition, some embodiments may include card readers that change, add or write data to a user's card in cases of suspected interception. Such changed data may be tracked or otherwise used to assure that only a card with the modified data is useable thereafter. Alternatively or in addition, in some embodiments the modified card may be moved in translated relation, moved irregularly or otherwise handled to reduce the risk that modified data is intercepted as the card is output from the machine. Of course these approaches are exemplary of many that may be employed.

In the exemplary embodiment the ATM is operated to conduct a transaction even in cases where it is suspected that an unauthorized card reading device has been installed. This is represented in a step 158. However, in other embodiments other approaches may be taken such as refusing to conduct the transaction. Other steps may also be taken such as capturing the user's card and advising the user that a new one will be issued. This approach may be used to minimize the risk that unauthorized transactions will be conducted with the card data as the card can be promptly invalidated. Of course other approaches may be taken depending on the programming of the machine and the desires of the system operator. In addition while the fraud device shown is an unauthorized card reading device, the principles described may also be used to detect other types of fraud devices such as for example false fascias, user interface covers and other devices.

In some embodiments additional or alternative features and methods may be employed to help detect the presence of unauthorized card reading devices or other attempted fraud devices in connection with the ATM. For example in some embodiments an oscillation sensor may be attached to the machine to detect changes in frequency or vibration that result from the installation of unauthorized devices on the ATM. FIG. 10 shows schematically an oscillator 127 attached to the interior surface of the ATM fascia. Oscillator 127 may be operative responsive to the controller and suitable vibration circuitry to impart vibratory motion to the fascia in the vicinity of the card reader slot. A sensor 129 is in operative connection with the fascia and is operative to sense at least one parameter of the motion imparted to the fascia by the oscillator 127. Although oscillator 127 and sensor 129 are shown as separate components, it should be understood that in some embodiments the functions of the components may be performed by a single device.

The sensor 129 is in operative connection with the controller of the ATM through appropriate circuitry. The controller selectively activates the oscillator and the sensor 129 is operative to sense the resulting movement of the fascia caused by the oscillation. The installation of an unauthorized card reading device or other fraud device on the ATM will generally result in a change in at least one property being sensed by the sensor 129. This may include changes in amplitude, frequency or both. Alternatively or in addition, some embodiments may provide for the oscillator to impart vibration characteristics of various types or vibratory motion through a range of frequencies and/or amplitudes. Sensed values for various oscillatory driving outputs may then be compared through operation of the controller to one or more previously stored values. Variances from prior values may be detected or analyzed through operation of the controller and notifications given in situations where a change has occurred which suggests the installation of an unauthorized device.

In some embodiments the controller may cause the oscillator and sensor to operate periodically to sense for installation of a possible unauthorized device. Alternatively, the controller may cause such a check to be made during each transaction. Alternatively in some embodiments oscillation testing may be conducted when a possible unauthorized device is detected by sensing radiation properties. The controller may operate to take various actions in response to sensing a possible unauthorized reading device through vibration, radiation or both. For example detecting a possible fraud device by both radiation and oscillation may warrant taking different actions than only detecting a possible fraud device through only one test or condition.

In some embodiments the controller may be programmed to adjust the thresholds or other limits used for resolving the presence of a possible fraud device for responses to changes that occur over time at the machine. This may include for example adjusting the thresholds for indicating possible fraud conditions based on the aging of the oscillator or the sensor. Such adjustments may also be based on parameters sensed by other sensors which effect vibration properties. These may include for example, the fascia temperature, air temperature, relative humidity and other properties. Of course readings from these and other sensors may be used to adjust thresholds of the oscillation sensor, radiation sensor or other fraud device sensors. Various approaches may be taken depending on the particular system.

In some embodiments the oscillator may additionally or alternatively be used to prevent the unauthorized reading of card reader signals. This may be done for example when the banking machine has a device which takes a user card into the machine for purposes of reading data on the card. In such embodiments the controller may operate to vibrate the area of the fascia adjacent to the card reader slot when a user's card is moving into and/or out of the slot. In such cases the vibration may be operative to cause the generation of noise or inaccurate reading by an unauthorized card reading sensor so as to make it more difficult to intercept the card stripe data using an unauthorized reading device. In some embodiments such vibration may also serve to disclose or make more apparent the presence of unauthorized card reading devices. Of course these approaches are exemplary and in other embodiments other approaches may be used.

In some exemplary embodiments provision may be made for detecting the presence of unauthorized input sensing devices for sensing a user's inputs through the keypad on the ATM. Such unauthorized input sensing devices may be used by criminals to sense the PIN input by the user. Detecting unauthorized devices may be accomplished by providing appropriate sensing devices in or adjacent to the keypad. Such sensing devices may be operative to detect that a structure has been placed over or adjacent to the keypad. Such sensors may be in operative connection with the controller in the machine or other devices which are operative to determine the probable installation of such an unauthorized input sensing device. In response to determining the probable installation of such a device, the controller may be operative in accordance with its programming to provide notification to appropriate entities, modify the operation of the machine such as to disable operation or prevent certain operations, or to take other appropriate actions.

FIG. 12 shows the cross-sectional view of exemplary keypad 32. Keypad 32 is shown schematically, and it should be understood that not all of the components of the keypad are represented. Keypad 32 includes a plurality of keys 250. Keys 250 are moveable responsive to pressure applied by a user's finger to provide an input corresponding to alphabetical or numerical characters. Extending between some of the keys 250 are areas or spaces 252. Extending in spaces 252 are sensors 254. In the exemplary embodiment the sensors 254 are radiation type sensors, but as previously discussed, in other embodiments other approaches may be used. Overlying the sensors 254 is an outer layer 256. In the exemplary embodiment, layer 256 is translucent or otherwise comprised of material so as to partially enable the transmission of radiation from the sensors therethrough.

As represented in FIG. 13, the exemplary sensors 254 include a radiation emitter 258 and a radiation receiver 260. During operation the radiation emitter is operative to output radiation that is at least partially reflected from the inner surface of layer 256. The reflected radiation is received by the receiver 260. Corresponding electrical signals are produced by the receiver, and such signals are transmitted through appropriate circuitry so as to enable the controller to detect the changes in signals that correspond to probable presence of an unauthorized reading device.

Figure 14:
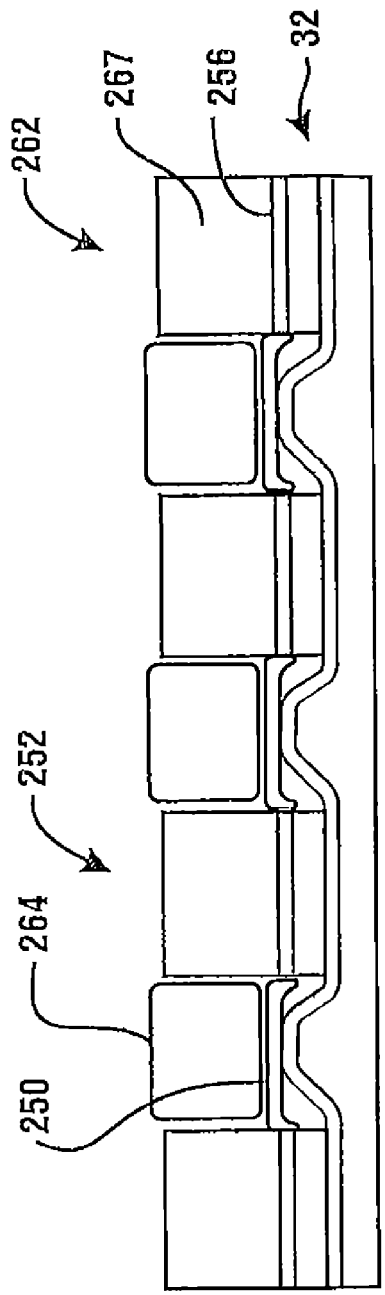
FIG. 14 is a view of a keypad similar to FIG. 12 but with an unauthorized key input sensing device attached.

FIG. 14 is a schematic view of an unauthorized input intercepting device 262 that has been positioned in overlying relation of a keypad 32. The input intercepting device 262 includes false keys 264 which are moveable and which are operatively connected to the corresponding keys 250 of the keypad. In the exemplary embodiment, input intercepting device 262 includes sensors which are operative to detect which of the false keys 264 have been depressed by a user. Because the depression of the false keys is operative to actuate the actual keys 250, the ATM is enabled to operate with the device 262 in place. Input intercepting device 262 in exemplary embodiments may include a wireless transmitter or other suitable device for transmitting the input signals to a criminal who may intercept such inputs.

Figure 15:
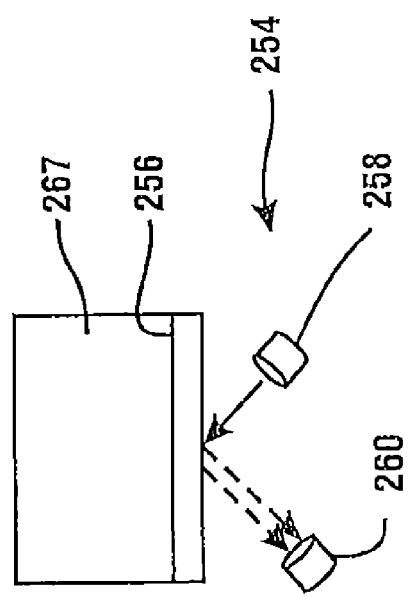
FIG. 15 is a schematic representation similar to FIG. 13, but representing the change in reflected radiation resulting from the attachment of the unauthorized key input sensing device.
Figure 19:
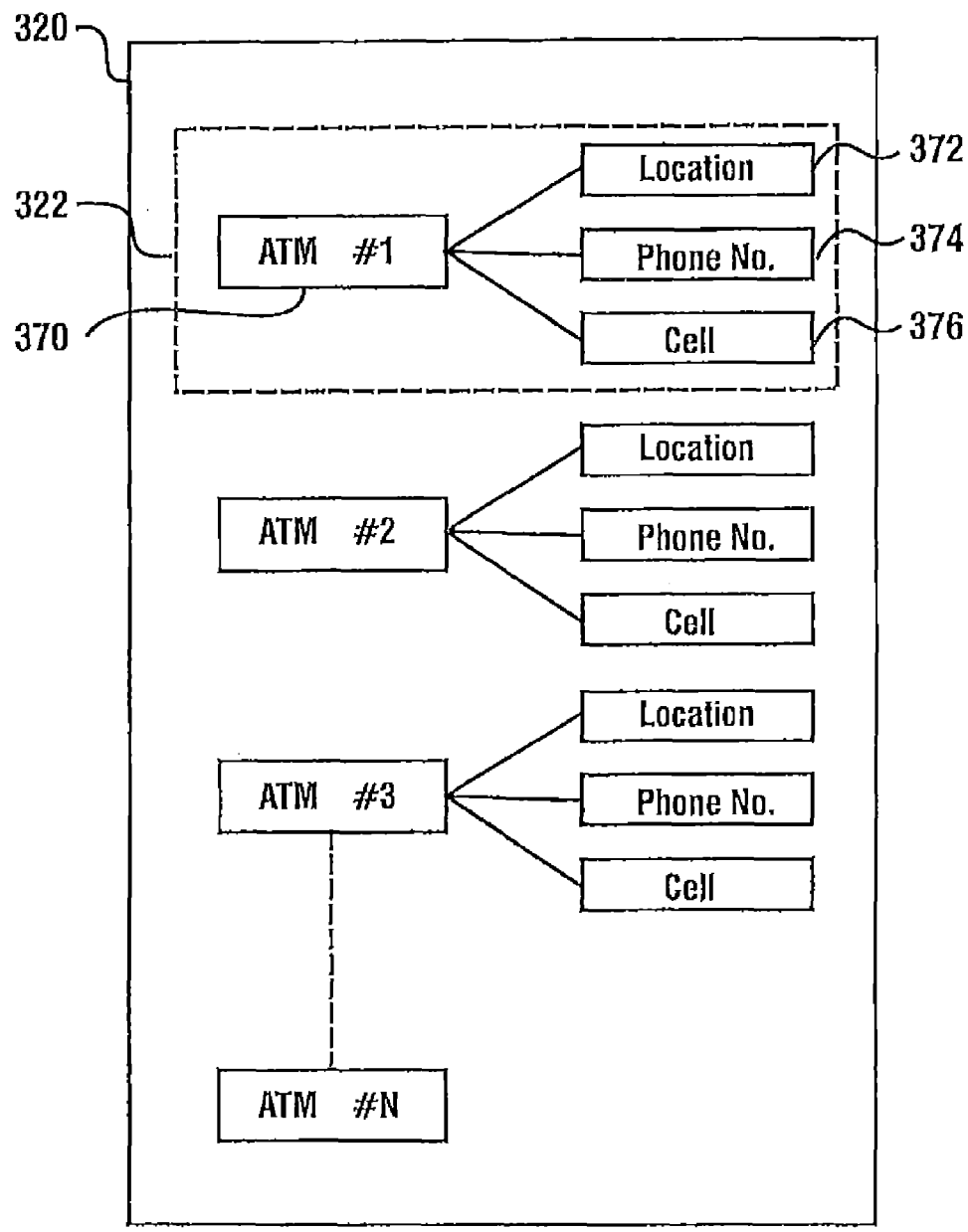
FIG. 19 shows a database portion.

As represented in FIG. 19, the input intercepting device 262 includes portions 267 which extend in the areas 252 in overlying relation of layer 256. As represented in FIG. 15, the portion of the input intercepting device extending in overlying relation of the layer 256 is operative to cause a change in the amount of radiation from the emitter 258 that is reflected and sensed by the receiver 260 of the sensor. This is because the overlying portion will have different radiation reflecting or absorbing characteristics which will change the radiation reflective properties of the layer 256 compared to when no such input intercepting device is present. Thus the installation of the unauthorized input intercepting device can be detected.

In some exemplary embodiments the controller may be operative to sense the level of reflected radiation at the sensors periodically. This may be done, for example, between transactions when a user is not operating the terminal. This may avoid giving a false indication that an unauthorized input intercepting device has been installed when a user is resting a hand or some other item adjacent to the keypad during a transaction. Of course in other embodiments sensor readings can be taken and compared during transactions to prior values stored in a data store to determine if a change lasting longer than normal has occurred which suggests that an unauthorized input intercepting device has been installed rather than a user has temporarily placed their hand or some other item adjacent to the keypad. For example, in some exemplary embodiments the controller may not resolve that there is a probable unauthorized input intercepting device on the machine until a significant change from a prior condition is detected in the radiation properties adjacent to the keypad on several occasions both during a transaction and thereafter. Alternatively or in addition, a controller may be operative to determine that an improper device has been installed as a result of changes that occur during a time when no transactions have occurred. Alternatively in other embodiments, the controller may operate to sense and analyze signals from the sensors responsive to detecting inputs from other sensors, such as for example an ultrasonic sensor which senses that a person has moved adjacent to the machine but has not operated the machine to conduct a transaction. Of course these approaches are merely exemplary of many approaches that may be used.

It should be understood that although in the exemplary embodiment radiation type sensors are used for purposes of detection, in other embodiments other types of sensors may be used. These include, for example, inductance sensors, sonic sensors, RF sensors, or other types of sensing approaches that can be used to detect the presence of material in locations that suggest an unauthorized input intercepting device being positioned adjacent to the keypad. Further, in some embodiments the controller or other circuitry associated with the sensors may be operative to make adjustments for normal changes that may occur at the machine. These may include, for example, changes with time due to aging of emitters, the build up of dirt in the area adjacent to the keypad, weather conditions, moisture conditions, scratching of the surface of the sensing layer, or other conditions which may normally occur. Appropriate programs may be executed by the controller or other circuitry so as to recalibrate and/or compensate for such conditions as may occur over time while still enabling the detection of a rapid change which is sufficiently significant and of such duration so as to indicate the probable installation of an unauthorized input intercepting device. Of course these approaches are exemplary of many approaches that may be used.

In other embodiments other or additional approaches to detecting fraudulent reading or other improper activities may be used. For example, in some embodiments the fascia of the banking machine may be subject to observation within a field of view of one or more imaging devices such as camera 131 schematically represented in FIG. 10. Camera 15 may be in operative connection with an image capture system of the type shown in U.S. Pat. No. 6,583,813, the entire disclosure of which is herein incorporated by reference.

In some embodiments the controller and/or an image capture system may be operative to execute sequences of activities responsive to triggering events that may be associated with attempts to install or operate fraud devices. For example, the presence of a person in front of the banking machine may be sensed through image analysis, weight sensors, sonic detectors or other detectors. The person remaining in proximity to the machine for a selected period or remaining too long after a transaction may constitute a triggering event which is operative to cause the system to take actions in a programmed sequence. Such actions may include capturing images from one or more additional cameras and/or moving image data from one or more cameras from temporary to more permanent storage. The sequence may also include capturing image data from the fascia to try to detect tampering or improper devices. Radiation or vibration tests may also be conducted as part of a sequence. Notifications and/or images may also be sent to certain entities or system addresses. Of course these actions are exemplary.

In some exemplary embodiments the controller of the ATM or other connected computers may be operatively programmed to analyze conditions that are sensed and to determine based on the sensed conditions that a fraud device is installed. Such a programmed computer may be operative to apply certain rules such as to correlate the repeated sensing of abnormal conditions with a possible fraud or tampering condition and to conduct tests for the presence of fraud devices. Such events may constitute soft triggers for sequences or other actions to detect and reduce the risk of fraud devices. Of course these approaches are merely exemplary and in other embodiments other approaches may be used.

In some embodiments the ATM may include sensors adapted to intercept signals from unauthorized card readers or customer input intercepting devices. For example, some fraud devices may operate to transmit RF signals to a nearby receiver operated by a criminal. The presence of such RF signals in proximity to the ATM may be indicative of the installation of such a device. Such signals may be detected by appropriate circuitry and analyzed through operation of the ATM controller or other processor, and if it is determined that it is probable that such a device is installed, programmed actions may be taken.

For example, in some embodiments suitable RF shielding material may be applied to or in the fascia to reduce the level of RF interference from devices within the ATM at the exterior of the fascia. Antennas or other appropriate radiation sensing devices may be positioned adjacent to or installed on the fascia. A change in RF radiation in the vicinity of the fascia exterior may result upon the installation of an unauthorized device. The RF signals can be detected by receiver circuitry, and signals or data corresponding thereto input to a processor. In some embodiments the circuitry may also determine the frequency of the radiation sensed to be used in resolving if it is within the range emitted by legitimate devices such as cell phones of users operating the ATM. In other embodiments the circuitry may analyze the signals to determine if they are varying, and the circuitry and/or the processor may evaluate whether the changes in a signal correspond to the input of a PIN or a card to the ATM.

In response to the sensed signal data, the processor may operate in accordance with its programming to evaluate the nature and character of the intercepted signals. For example, if the signals do not correspond to a legitimate source, such as a cell phone, the processor may operate to take actions such as to wholly or partially cease operation of the ATM, capture images with a camera, and/or notify an appropriate remote entity through operation of the ATM. Alternatively, the processor may compare the sensed RF signals to transaction activity at the ATM. If the sensed signals are determined to be varying in ways that correspond in a pattern or relationship to card or PIN inputs, for example, the processor may operate in accordance with its programming to cause the ATM or other devices to take appropriate programmed steps.

In still other exemplary embodiments the processor may be in operative connection with an RF emitter. The processor may operate in accordance with its programming to cause the emitter to generate RF signals that interfere with the detected signals. This can be done on a continuing basis or alternatively only at times during user operation of the ATM when user inputs are likely to be intercepted. For example, the processor controlling the emitter may operate the ATM or be in communication with a controller thereof. In such situations, the processor may operate to control the emitter to produce outputs at times when a user's card is moving into or out of a card slot, and/or when the ATM is accepting a user's PIN or other inputs. Thus, the emitter may be operative to produce interfering signals during relatively brief periods so as to not disrupt RF transmissions for an extended period in the event an incorrect determination is made and the RF signals are from a legitimate source.

In some embodiments an emitter may be a type that transmits on a plurality of frequencies intended to disrupt transmissions within the expected range of frequencies for a fraud device. In other embodiments the emitter may be controlled responsive to the processor to match the frequency or frequencies of suspect signals that have been detected. Of course these approaches are exemplary of approaches that may be used.

In still some other embodiments the risk of interception of customer inputs to an automated banking machine may be reduced by using types of input devices that reduce or eliminate user contact with the machine. By reducing such user contact the possibilities for interception of user inputs may be reduced. For example in some embodiments the at least one controller of the automated banking machine may operate computer executable instructions which comprise eye tracking software. Eye tracking software may operate to determine from visible features of the user's eyes, where the user is looking. This may be done in exemplary embodiments by having infrared or near infrared emitters directed to an area of the user's eyes and positioning cameras or other image capture devices which can detect the reflected radiation from the user's eyes. By having such emitters and image capture devices adjacent to the display of the ATM, the at least one controller in the machine is operative to determine the area on the display to which the user's eye or eyes are directed. This can be accomplished for example using eye tracking software available from Tobii Technology of Stockholm, Sweden that is sold under the trademark My Tobii. Of course this is but one of many commercial products that may be used for this purpose.

In exemplary embodiments the at least one controller in the machine may be operated to receive inputs such as a user's PIN by tracking where an ATM user is looking. This may be done in an exemplary embodiment by the controller operating to provide output indicia on the display that instructs the user to gaze at certain features presented on the display. For example the display may output different colored rectangles in the corners thereof. The user may be prompted to gaze at each of the specific rectangles at different times. By detecting the reflected radiation from the user's eyes as the user looks at each of the rectangles, the at least one controller is able to determine where the user is currently looking.

Thereafter in an exemplary embodiment the user may be prompted to look at characters or other indicia output on the screen and to select in sequence the ones which correspond to the user's PIN by gazing at each specific one and then blinking. In this way the user can gaze at the indicia corresponding to each of the characters of the PIN number and select each character in the proper order by blinking. In some embodiments this may be done by presenting all of the possible characters on a single output screen through the display while in other embodiments a subset of characters may be output in a plurality of different display screens. Further in exemplary embodiments the display may provide an output such as a star symbol each time that the user is sensed by the machine as having selected a character of a PIN number. Of course this is merely an exemplary approach.

In some exemplary embodiments the display may also include indicia such as a rectangle which a user can gaze at after they have input all of the characters of their PIN number. This provides an input to the machine so that the machine can then operate to attempt to process a transaction using the characters that the customer has input. In addition in some embodiments the at least one controller may cause the display to output a rectangle or other indicia that a user can select to reset their PIN inputs. Thus for example, if the user happens to involuntarily blink in a manner which causes an erroneous input which does not correspond to a character of their PIN, the user can correct the error by resetting the inputs and start over.

In such exemplary embodiments because the movement of the user's eyes is not perceptible from vantage points that are observable by a third party, it is more difficult to intercept the customer's PIN input. Further in some embodiments even micro cameras which are surreptitiously mounted on the machine would generally not be effective to enable criminals to determine the user's PIN inputs based on observation of the user through the camera.

It should be understood that while this exemplary approach is described in connection with a user providing a PIN or other secret code to an automated banking machine, the principles may be used for receiving other inputs from banking machine users. This may include for example enabling users to provide transaction instructions to the machine. Such transaction instructions may include for example selecting transaction types and amounts. This may be accomplished in some embodiments by the at least one controller operating to present different transaction options as text in rectangles or other indicia on the screen. The user may operate to select one of the transaction options by gazing at it and blinking their eyes. Likewise amounts may be selected by presenting a representation of the numerical keypad through the display in response to operation of the controller. The user can then present inputs corresponding to numerical amounts by gazing at selected numerals and then blinking. Numerous types of inputs may be provided in this manner.

Further it is to be understood that while in this exemplary embodiment the approach of providing inputs has been discussed as the user gazing at a particular rectangular icon or other indicia on the screen and then blinking, in other embodiments other approaches may be used. This may include for example the user providing a machine input by looking at a particular item of indicia on the screen for more than a predetermined time so as to select it. Alternatively selections may be made through other eye movements such as moving the eye in a cross pattern centered on the particular item of indicia output on the display. Numerous approaches may be used employing the principles described.

In some exemplary embodiments the ATM 10 is provided with enhanced diagnostic capabilities as well as the ability for servicers to more readily perform remedial and preventive maintenance on the machine. This is accomplished in an exemplary embodiment by programming the controller and/or alternatively distributed controllers and processors associated with the transaction function devices, to sense and capture diagnostic data concerning the operation of the various transaction function devices. In an exemplary embodiment this diagnostic data may include more than an indication of a disabling malfunction. In some embodiments and with regard to some transaction function devices, the data may include for example instances of speed, intensity, deflection, vacuum, force, friction, pressure, sound, vibration, wear or other parameters that may be of significance for purposes of detecting conditions that may be developing with regard to the machine and the transaction function devices contained therein. The nature of the diagnostic data that may be obtained will depend on the particular transaction function devices and the capabilities thereof as well as the programming of the controllers within the machine.

An exemplary embodiment includes an automated banking machine security arrangement. The automated banking machine (e.g., ATM) includes a Global Positioning System (GPS). An ATM with GPS can include self-service features enabling a user of the machine to carry out transactions. As previously discussed, an ATM can include a cash dispenser permitting a cash withdrawal transaction. As explained in more detail later, GPS (or some other position indicator) also enables more efficient servicing of an ATM. Systems and methods related to the monitoring, status, and servicing of ATMs may be found in U.S. Pat. No. 5,984,178, the entire disclosure of which is herein incorporated by reference.

An ATM (or each ATM in a network of ATMs) can be embedded with a GPS transceiver. The operation of a GPS is well known and need not be discussed in detail herein. An ATM's GPS module or unit can identify the geographical position of the ATM by using a coordinate system. For example, the GPS unit can read its latitude and longitude coordinates with the use of one or more satellites. An ATM with GPS technology allows the ATM to annunciate its location. The ATM can emit its coordinates through a variety of known communication mechanisms.

In an exemplary arrangement, an ATM is provided with GPS to permit tracking of the ATM. The tracking can be beneficial in maintaining accurate location information on a plurality of ATMs, especially if certain ATMs are moved during their lifetime. As explained in more detail herein, tracking can also be used to thwart thieves who are able to pickup and remove an entire ATM unit.

A GPS unit (including an antenna) can be built into an ATM so that the GPS cannot be dismantled. The GPS can be connected with an ATM in a manner ensuring that the ATM's positional information (i.e., coordinates) can continue to be conveyed. For example, critical components of the GPS (and ATM) can be battery backed to enable conveyance of the unit's position. This arrangement permits a GPS disconnected from its main power source to still have the ability to accurately obtain from one or more satellites the ATM position. The GPS unit may comprise a satellite phone.

An ATM computer or controller can request a reading of location data from the GPS unit. It should be understood that for purposes of brevity, herein a "computer" may comprise one or more computers or processors, whether in a single device or distributed among several devices. The GPS unit can obtain the ATM position coordinates from one or more satellites. The ATM computer can receive the location data from the GPS unit. The ATM can transmit its GPS-obtained position to a service monitoring (or responsible for) the security of the ATM. The security monitoring service center may oversee the monitoring of plural GPS-equipped ATMs. Communication between an ATM and the security center (which may be the ATM's host) can be carried out in a known manner of communication, including the use of a phone line, a proprietary line, a wireless system, a satellite system, a network, an intranet, and/or the Internet. Critical components in the ATM can also be battery backed to ensure communication with the GPS unit and the security center. A computer software program operating at the security center (or in the ATM) can be used to determine if the normally stationary (or fixed) ATM terminal has been improperly moved.

Figure 16:
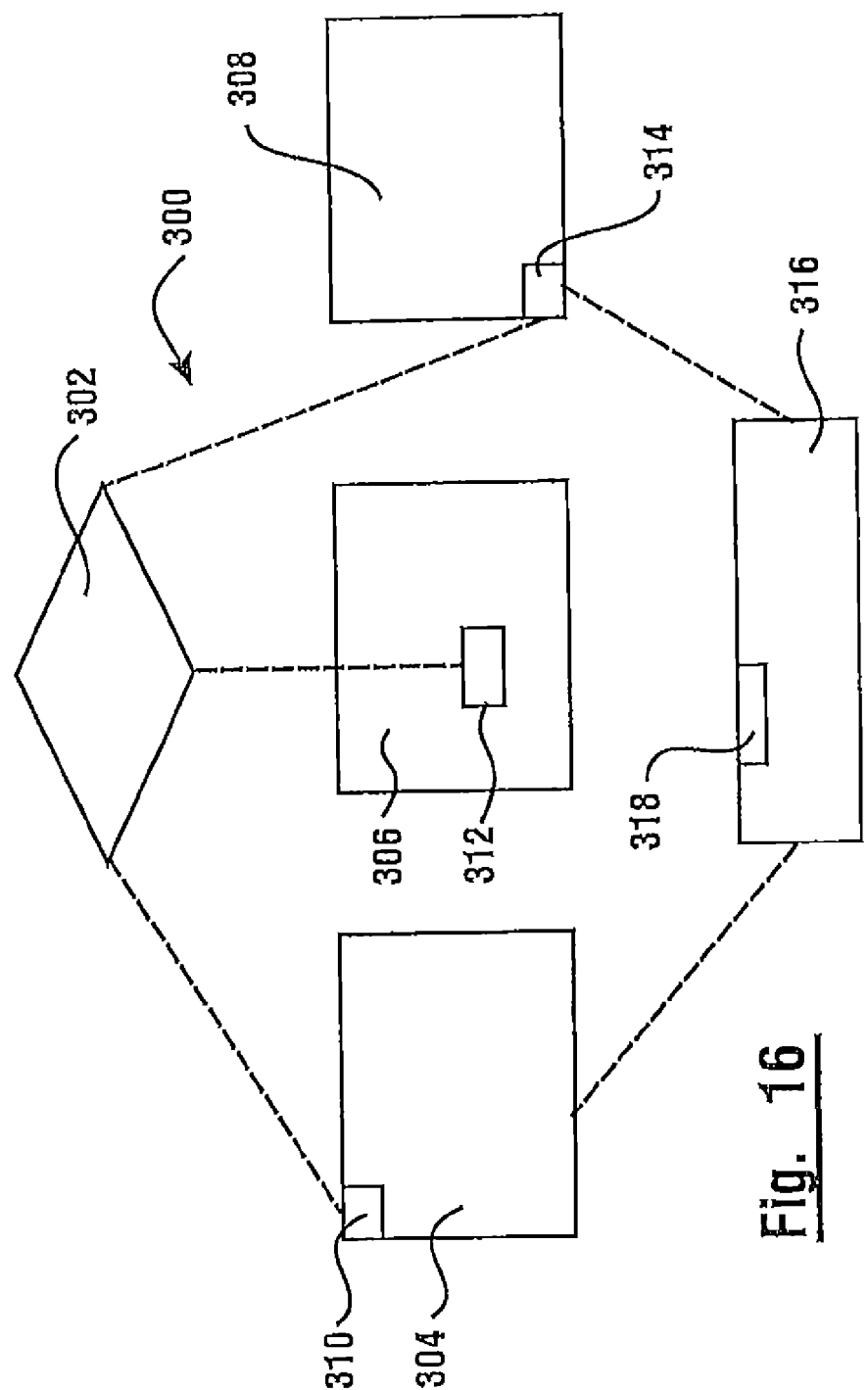
FIG. 16 shows an automated banking machine security arrangement.

FIG. 16 shows a shared security/monitoring arrangement 300 for plural ATMs. The arrangement 300 includes a satellite 302, ATMs 304, 306, 308 with respective GPS units 310, 312, 314, and a security/monitoring center 316. As previously discussed, the ATMs 304, 306, 308 can obtain a GPS reading via the satellite 302 and then transmit the read data to the security center 316. For example, a GPS reading may be obtained with a satellite phone which is able to transmit the GPS data to a web site accessible by the security center computer. The security center 316 can include many different types of communication devices, including a cell phone system 318.

A stolen ATM having GPS technology enables movement of the stolen ATM to be tracked. One or more computers operating in conjunction with a security center enable the current position of a moving ATM to be tracked in real time. Software operating in a security center computer can be used to present the individual GPS-reported ATM positions as a simultaneous path of travel. The software can overlay the travel path of a stolen ATM onto a road map of the surrounding area. Authorities can be kept informed as to the route of the tracked ATM. The real time overlay map can also be downloaded (e.g., via the Internet) from the security center to the authorities (e.g., police). The monitoring arrangement permits a stolen ATM with GPS to be recovered.

The security center can be in operative connection with a database containing the locations of respective ATMs stored in memory. The security center can use a computer (e.g., a host computer) to compare a received ATM GPS location to the stored location assigned to that particular ATM. If the compared locations do not substantially match, then the computer can determine that the ATM was stolen and, responsive thereto, cause proper action to be initiated. The comparison may include a predetermined percentage error range to compensate for GPS reading calibrations, fluctuations, deviations, and other factors. Additional GPS location data readings and location comparisons may be performed to ensure accuracy before a final determination on theft is made.

Figure 17:
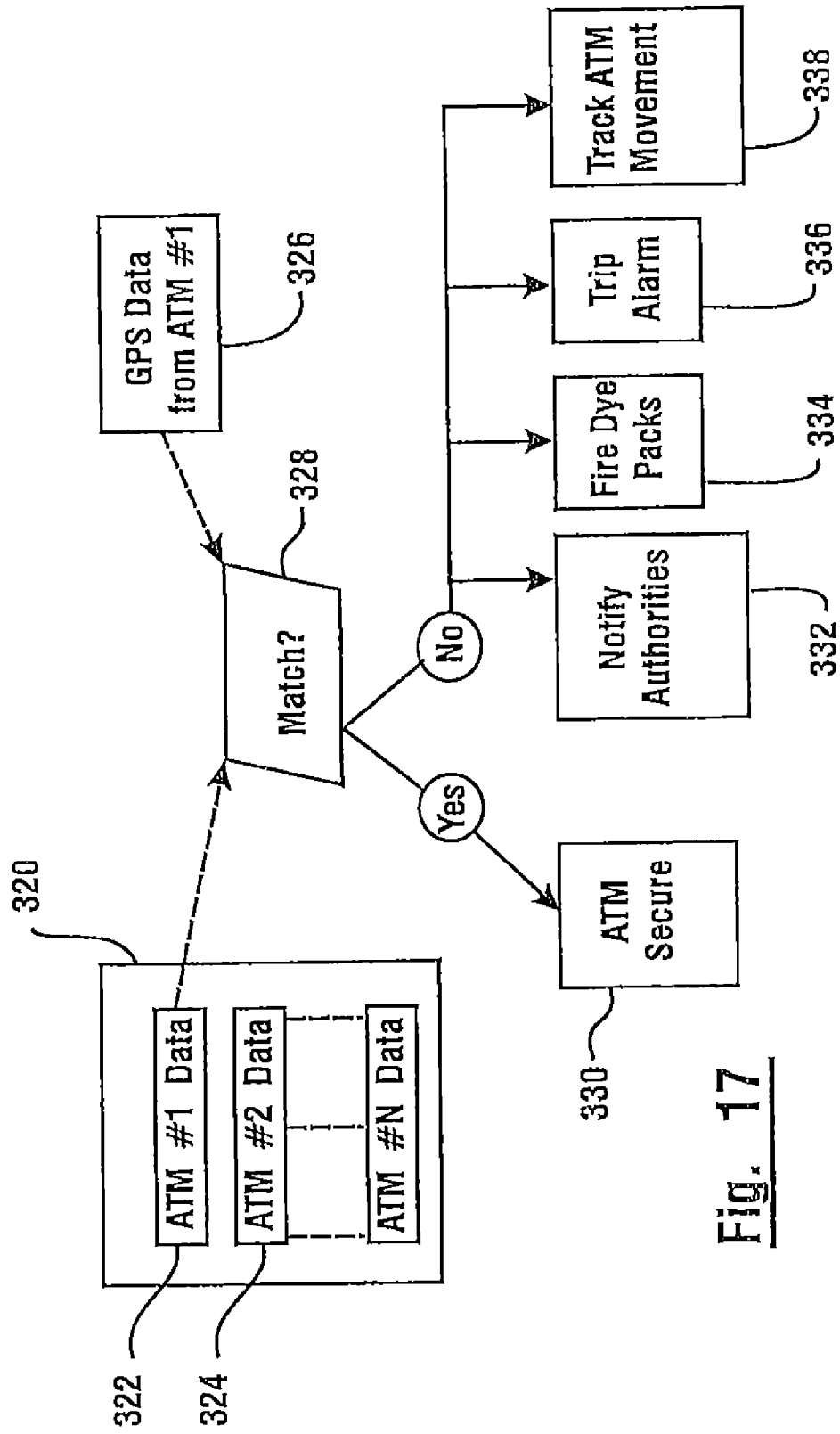
FIG. 17 shows an arrangement for comparing GPS location data to stored location data.

FIG. 17 shows steps in a process of comparing read GPS location data to stored ATM location data. Location data for a plurality of ATMs (i.e., ATM #1 to ATM #N) is stored in a database 320. Stored data 322 includes location data corresponding to the fixed or assigned location of ATM #1 (e.g., ATM 304). Stored data 324 includes location data corresponding to the fixed location of ATM #2 (e.g., ATM 306). GPS data 326 was obtained using the GPS unit of ATM #1. The location data in the stored data 322 for ATM #1 is compared to the GPS location data 326 for ATM #1 by using a computer 328, which may be in the security center 316. If the comparison results in a corresponding "Yes" match, then ATM #1 is determined as secure 330.

However, if the comparison does not result in a corresponding match, then the security status of ATM #1 is determined as stolen. Following a "No" match, at least one of the response actions 332, 334, 336, 338 can be executed, as explained in more detail later. That is, response to a determination of theft one or more actions can be initiated, including notifying 332 the authorities about the theft, firing 334 dye packs located in the stolen ATM, tripping 336 an alarm in the stolen ATM, and/or tracking 338 movement of the stolen ATM. It should be understood that a security center 316 can include the database 320 and the computer 328, and cause commencing of the actions 332, 334, 336, 338. Alternatively, the database 320 can be remotely located from the security center 316, yet in operative connection therewith to enable the security center to request and receive location data from the database (and store data in the database).

Figure 18:
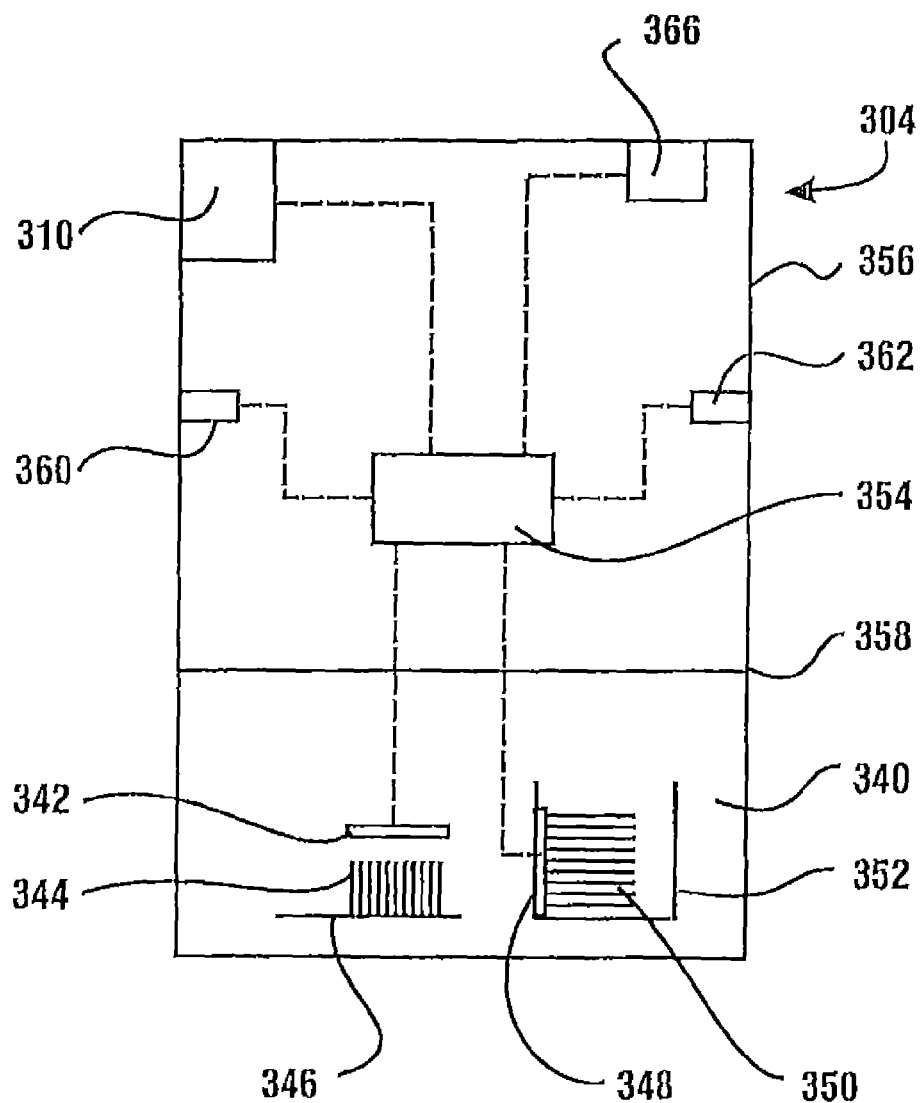
FIG. 18 shows an ATM with GPS.

The GPS location analysis performed by the security center 316 for a particular ATM can be used to cause the firing of dye packs in that particular ATM. FIG. 18 shows the ATM 304 including a secure chest or safe portion 340. The ATM chest 340 includes a dye pack 342 adjacent to cash 344 in a currency dispenser 346. The cash 344 may be in a currency cassette in the currency dispenser 346. The ATM chest 340 also includes a dye pack 348 adjacent to cash 350 in a cash deposit bin 352. The cash deposit bin 352 can hold cash that was deposited by ATM users or cash that was not taken following a cash withdrawal transaction. The GPS transceiver 310 and an ATM computer 354 are also shown. The ATM computer 354 can cause firing of the dye packs 342, 348. The ATM computer 354 can be instructed by the security center 316 to fire the dye packs 342, 348. The ATM 304 further includes movement sensors 360, 362. Although the GPS unit 310 and the ATM computer 354 are shown in the upper portion 356 of the ATM housing 358, it should be understood that they may be situated inside of the secure chest portion 340 of the ATM housing (e.g., like GPS unit 314).

Different communication methods can be used in carrying out the determination of whether an ATM was stolen. In one arrangement the ATM computer 354 can periodically obtain a regularly time-based location reading from the GPS unit 310 (i.e., predetermined reading times). In another arrangement the ATM computer 354 can continuously receive updated GPS data from the GPS unit 310. The ATM 304 (or the GPS unit 310) can transmit the read GPS location information to the security center 316. The security center 316 analyzes the transmitted GPS location information (e.g., by performing the previously discussed location comparisons) to determine if inappropriate movement (e.g., theft) involving the ATM 304 has occurred. As previously discussed, response actions 332, 334, 336, 338 can also be initiated via the security center 316.

In another arrangement the ATM 304 can use the sensors 360, 362 (e.g., motion detectors) to detect movement (e.g., tilt, lateral, vertical, and/or horizontal movement) of the ATM 304. The ATM computer 354 is in operative connection with the sensors 360, 362 to receive information therefrom. In response to a sensed ATM movement, the ATM computer 354 can take action to thwart the suspected theft of the ATM 304. For example, the ATM computer 354 can cause the dye packs 342, 348 to be fired. The ATM computer 354 may notify the security center 316 of the sensed ATM movement. As previously discussed, the security center 316 can initiate response actions 332, 334, 336, 338 to thwart the suspected theft of the ATM.

Alternatively, an analysis of GPS location information can be used to verify whether or not the sensed ATM movement was the result of the ATM 304 being illegally moved from its expected location or because of some other disturbance (e.g., an earthquake). In response to a sensor 360, 362 detecting movement of the ATM 304, the ATM computer 354 can request a location reading from the GPS unit 310. The ATM 304 transmits the acquired GPS location data 326 to the computer 328 associated with the security center 316. Again, the security center 316 can compare (as previously discussed) the GPS location data 326 to stored location data 372 to determine whether the particular ATM 304 (i.e., ATM #1) was actually moved from its foundation. Thus, both movement sensors 360, 362 and GPS 310 can be used together to accurately determine whether or not an ATM 304 was stolen.

In a further arrangement the plurality of ATMs 304, 306, 308 each include a wireless cell phone. FIG. 18 shows the ATM 304 including a cell phone system 366. The ATM computer 354 is in operative connection with the cell phone 366. Each ATM can use their cell phone to call the security center 316, which includes the cell phone system 318. Each ATM is also operative to receive calls from the security center 316. The security center cell phone system 318 is operative to simultaneously communicate with plural ATMs via their cell phones.

The security center 316 is in operative connection with a database having memory for storage of cell calling area information corresponding to each respective ATM cell phone. The stored cell calling area information can be in previously discussed database 320 or it can be in a separate cell database. FIG. 19 depicts an expanded portion of the database 320 showing additional ATM information. The previously discussed stored data 322 corresponding to ATM #1 is also depicted. For ATM #1 the identity data 370 is stored in corresponding relationship with the ATM's location data 372, cell phone number data 374, and call cell data 376. The database 320 enables the identity 370 of an ATM to be ascertained via its stored location data 372 or by its stored cell phone number data 374. Likewise, an ATM location 372 can be identified via its cell phone number 374, and vice versa. That is, in the database 320 each ATM cell phone number is also stored in corresponding relationship with a respective cell calling area. For example, phone number data 374 is stored in relation with cell data 376.

The cell assigned to an ATM can be the call cell in which that ATM is physically located. That is, the assigned cell can be the cell in which the cell phone (of the fixed ATM) would use to originate a phone call. The stored location data for a particular ATM can be used to determine which cell is to be assigned to the phone number for that particular ATM. That is, the assigned cell can be based on the stored (and assigned) location. For example, the cell calling area which covers the location 372 of ATM #1 can be used as the cell 376 assigned to ATM #1. Using the stored location data enables the database to be quickly updated to reflect any changes in cell areas, cell providers, etc.

It should be understood that some ATMs may be located in the same cell calling area. Thus, these ATMs could be assigned the same cell data in the database 320. For example, both ATM #1 and ATM #3 could have the same stored cell data. Contrarily, a cell in the database may be assigned to only a single cell phone number because the phone number belongs to an isolated distant ATM. For example, the cell data assigned to ATM #2 may be the only instance of that cell in the entire database 320.

An exemplary security checking operation involving the cell phone arrangement will now be discussed. An ATM computer 354 causes the ATM's cell phone 366 to periodically call the security center cell phone system 318. The security center 316 uses the computer 328 (or another computer) to perform an initial analysis of the received call. In an exemplary embodiment of first level security analysis, the security center 316 can recognize which ATM cell phone placed the call, such as by using caller ID, etc. The security center 316 can use this information to learn the cell assigned to the ATM from which the call was made. For example, the security center 316 can use caller ID to ascertain the phone number 374 belonging to a call originating from the phone of the not yet identified ATM. By knowing the phone number 374 the security center 316 can use the database 320 to identify the ATM as ATM #1. The security center 316 can further use the database 320 to determine the cell 376 assigned to ATM #1. Thus, the assigned cell 376 is known.

Next, the security center 316 needs to compare the assigned cell 376 to the used cell. The security center 316 can obtain the cell used by the ATM phone. Triangulation calculations or secondary sources may be used in obtaining the cell in which the call was made. The security center computer 328 can then compare the obtained cell to the cell 376 assigned to that particular ATM 370. If the compared cells do not match, then it is determined that the cell phone of ATM #1 was moved out of its assigned cell area 376. The security level for ATM #1 can be flagged as suspect. Thus, the theft of ATM #1 can be viewed as suspect. In the first level of security analysis, improper movement of a particular ATM can be suspected via the ATM's cell phone, without using the ATM's GPS unit. Although ATM #1 was used in the example, it should be understood that a first analysis can be applied to any of the ATMs in the ATM network.

Returning to the exemplary example, following a suspicion of theft of ATM #1, the security center 316 can initiate appropriate response actions 332, 334, 336, 338 to thwart the suspected theft, as previously discussed. Alternatively, in response to the suspicion, the security center 316 can begin another (second) level of security analysis on ATM #1. That is, a second analysis can be performed before a response action 332, 334, 336, 338 is initiated by the security center 316. The second analysis can be performed to double check or validate the suspicion of theft of ATM #1. The second analysis can be independent from the first analysis. The second analysis can use the GPS unit of ATM #1.

In an exemplary embodiment of second level security analysis, the security center 316 submits a request to the suspect ATM #1 asking for an updated GPS reading. The request can be communicated in a manner previously discussed, including using cell phone communication. In a manner previously discussed, an ATM computer 354 attempts to obtain an updated reading with its GPS unit 310, and then transmit the updated reading to the security center 316. The security center 316 can then compare (as previously discussed) the updated GPS location data 326 to database location data 372 corresponding to the suspect ATM #1. Based on the location comparison, the security center 316 can determine whether the suspected theft activity was founded. If an updated GPS reading is no longer obtainable then this information can also be a factor in the determination. Once a determination is made that the ATM was actually illegally moved (i.e., stolen), then responsive actions such as notifying authorities 332, firing dye packs 334, starting an alarm 336, and/or ATM tracking 338 can be initiated to thwart the theft.

In other security arrangements, the ATM does not have to rely on a security center to perform a determination of ATM movement. In an exemplary embodiment the ATM's own computer can make the determination.

An ATM computer can have a backup battery power source. Battery sources for computers are known in the art. An ATM computer 354 can have access to location data locally stored in the ATM. For example, the ATM data 322 can be stored in ATM #1 or in a security software program operating in ATM #1. The location data 372 for ATM #1 may have been previously downloaded to ATM #1 for storage therein. Thus, the ATM #1 computer 354 itself (instead of the security center) can run a security computer program to perform a comparison of the ATM's assigned location 372 to the location obtained from the ATM's GPS reading 326. If the ATM computer 354 determines that the locations 372, 326 do not match, then the ATM computer 354 can cause an ATM alarm to trip and/or notify the security center (or other authorities) regarding the theft of the ATM. Again, the security center can cause appropriate response actions 332, 334, 336, 338 to be carried out.

In another security arrangement, motion sensors, GPS, and a cell phone (or cell phone modem) can be used in combination to analyze the status of an ATM. For example, an ATM GPS unit can periodically or continuously receive position readings. The GPS unit and cell phone are in operative connection so that the cell phone can receive GPS data from the GPS unit (even when the cell phone is in an "off" or sleep condition). Detected motion of the ATM (via a motion sensor) causes the cell phone to be placed in an "on" or awakened condition (i.e., turned on). The cell phone when turned on is programmed to transmit GPS data to a satellite. The satellite can receive the transmitted data and recognize the data sender (i.e., the cell phone/ATM). The satellite can then send the GPS information and sender data to a web site that allows monitoring of the ATM's location. That is, the web site can be accessible by a security center computer.

It should be understood that various alternative combinations may be used in the exemplary embodiments. For example, a cell phone can be programmed to receive and transmit the GPS data. A cell phone can include the GPS system. Also, while motion is detected, a cell phone can be periodically turned on (e.g., every minute) to receive and/or transmit the GPS data. When movement of the ATM stops, so do the transmissions. Furthermore, the cell phone can bypass the satellite to send the GPS information (and cell phone/ATM ID data) directly to the web site (or a database). A computer may link the GPS unit and the cell phone. Alternatively, a GPS satellite phone may be used.

An ATM's alarm can be tripped responsive to reading GPS data. The alarm can also have a backup battery power source. An alarm controller in the ATM can activate the alarm in response to the ATM's security computer program determining movement of the ATM via the GPS reading (and/or via one or more movement sensors). The alarm can be audible or silent. A silent alarm can notify a security center or authorities. An audible alarm can have different decibel levels. A higher decibel level, which is uncomfortable to a thief operating the getaway vehicle, may be used while ATM movement is detected. The alarm can be switched to a lower decibel level when ATM movement is no longer detected, or vice versa. Hence, an ATM can have a plural stage audible alarm. Furthermore, known functions for drawing attention to a stolen ATM or cash may additionally be used. For example, the GPS can also be associated with tripping a cash staining device (e.g., dye packs) located in the ATM.

In a further exemplary embodiment, even if an ATM 304 is stolen, the cash in its chest portion 340 (or safe) can be rendered useless to the thieves. The security system in the ATM can also monitor the sequence that was used to open the ATM's chest 340. The security system, which can include the computer 354 and a software program operable in the computer, can recognize a normal (or permitted) chest opening sequence. The security system can also detect a non-normal (or non-authorized) chest opening sequence. If the chest is not opened in the proper sequence, then the security system can act to have cash 344, 350 inside the chest 340 marked in a manner indicative of stolen cash (e.g., stained/dyed cash).

The software can be programmed to monitor chest opening sequences. Alternatively, the software can be programmed to initiate monitoring of a chest opening sequence following a detection of suspicious (or confirmed) ATM movement.

An example of a normal sequence for accessing the cash in the chest will now be discussed. The predetermined chest door opening sequence can include a plurality of sequence events. In the example, the ATM is first put into a maintenance mode. Next an unlocking of the chest door occurs. This may include entering one or more correct combinations. Next the chest door handle is turned to cause an interior lock bolt to move to unlock the chest door. Then the chest door is pivoted or swung to an open position to provide access to the chest interior. It should be understood that the opening of the chest door may be one of the sequence events. The performing of certain steps in the sequence can be a prerequisite for later steps.

Sensors can detect whether a predetermined (normal) sequence portion was carried out. The sensors can be in operative connection with the security system computer to provide feedback to the computer. Again, the security system, including the computer and sensors, can operate with a backup power source, such as one or more batteries.

The computer can be informed or recognize when the ATM status condition is in maintenance mode. Sensors can be used to detect when unlocking of the chest door occurs. The entering of mechanical or electronic combinations can be sensed. Sensors can detect when the chest door handle is turned. Sensors can be positioned adjacent to the handle to detect movement of the handle. Motion sensors can be positioned adjacent to the lock bolt work components which (in the predetermined sequence) would need to move to permit opening of the chest door. Other sensors can be used to detect when the chest door was moved from a closed position to an open position. An example of a lock bolt work arrangement for an automated banking machine may be found in U.S. Pat. No. 5,784,973, the entire disclosure of which is herein incorporated by reference.

The software operated by the security system computer can analyze the sensor input to determine if any events or steps in the normal chest door opening sequence have been bypassed. The software can compare the sensed (performed) sequence events to the stored (expected) predetermined sequence steps. For example, the ATM computer can monitor and track sequence event occurrence. Responsive to the monitoring, the computer can determine whether all expected sequence events have occurred. The computer can assign a condition (e.g., positive or negative) to the chest door opening status. Therefore, when opening of the chest door is detected, the computer can conclude whether to fire the dye packs.

In a non-normal chest opening sequence the chest door was opened, but not in the expected sequence. For example, the chest door (or other chest components) may have been drilled or burnt to enable the chest door to be opened for accessing the cash. The exemplary ATM security system can detect if a chest bolt was unlocked without the chest door lock first being unlocked (or other optional prerequisite steps, e.g., maintenance mode, combination, code access, etc.). For example, the security system can detect whether the door combination was not correctly (or ever) entered, yet the chest's interior bolt was moved to an unlocked position. The security system can also detect whether the chest door was opened without turning of the door handle. The security system can make a determination that unauthorized access was granted to the chest interior responsive to the door being opened (or in an unlocked position enabling opening thereof) out of sequence. The detection of a non normal chest door opening sequence (or order) can be interpreted as an attack against the chest (and any cash therein).

In response to a determination of an attack against the chest, the cash 344, 350 inside the chest 340 can be devalued by the security system. The chest 340 includes a chest door, such as previously discussed chest door 18. The chest door in an open position enables a service person to access devices and components in the security chest interior. The security system includes a currency staining system, and a method of actuating the staining system. For example, the security system can include dye packs 342, 348. The dye packs 342, 348 can be located in the chest 340 adjacent to the cash 344, 350. The security system can cause the dye packs 342, 348 to be activated (e.g., fired or exploded) to release the dye therefrom.

The security software operating in the ATM computer 354 can be programmed to cause the computer 354 to initiate firing of the dye packs 342, 348 in response to a determination that the door of the chest 340 was opened (or moved) without following (or completion of) a required sequence (or pattern) for opening the chest door. That is, dye packs can be triggered to fire upon unauthorized movement of the chest door. The computer programming software in the security system can be read by the computer 354 to determine unauthorized chest access and initiate an electronic firing of the dye packs.

The ATM security system computer may determine that the door opening sequence is improper prior to the chest door being opened. Thus, the computer may be programmed to automatically fire the dye packs when the chest door is still closed but is detected as being placed in an unlocked condition. In other programming embodiments firing of the dye packs may not occur until the chest door is actually opened. For example, the computer may not determine an improper sequence until the chest door was actually opened.

In alternative embodiments the computer can issue a warning of a detected improper chest opening sequence. Such a warning can be audible or visible (e.g., a display message, etc.). The warning may be presented in a manner that is undetectable (silent) to the public, but detectable to an authorized service person. The warning may be presented as a flashing light at the rear of the ATM. The warning may be presented via a cell phone call to a specific number at a security center. The warning may be beneficial to an authorized service person who inadvertently generated an out-of-sequence step. A code can be inputted to the ATM to override or reset the out-of-sequence programming, or disable firing of the dye packs. Entry of the code may be time based. For example, if the code is not entered within a predetermine time period, then override is no longer a valid option.

Dye released from a dye pack 342, 348 is operative to deface cash (i.e., currency or money or notes or bills) in a known manner. The size and amount of dye packs and their placement relative to cash in an ATM chest can be strategically predetermined to ensure optimum devaluing of all the cash in the chest upon activation of the dye packs.

New ATMs can be provided with the sequence monitoring security system. Existing ATMs can be retrofit with the security system. Because the sequence monitoring security system can be provided in some ATMs without needing any additional sensors or alarm grids, it can be easy to provide a low-cost retrofit. The sequence monitoring security system may be provided as a backup to normal anti-theft detection arrangements for ATMs.

As previously discussed, an ATM computer can cause dye packs to be fired, such as in response to a security software program detecting an improper chest opening sequence. That is, an ATM computer can control operation of the ATM dye packs. As previously discussed, an ATM computer can also communicate with the security center computer. Thus, the security center can directly communicate instructions to the ATM computer, including instructions for the ATM computer to fire the dye packs. That is, regardless of the monitored security status of a chest opening sequence, an ATM computer can be instructed by a security center to activate the dye packs at any time. Thus, dye pack activation can be independent of chest opening sequence monitoring.

As previously discussed, dye pack activation can be a response action 334 to ATM theft. A security center 316 can use ATM GPS information 326 to confirm that an ATM was stolen. Responsive to the confirmation of theft, the security center 316 can instruct the ATM computer 354 to actuate its dye packs 344, 348. Upon the ATM computer 354 receiving the instruction to fire the dye packs 344, 348, the ATM computer can cause the dye packs to be exploded to stain the cash 344, 350 located within the interior of its chest 340. Thus, the staining of money inside of an ATM can be the result of a positional reading taken with a GPS unit of that ATM.

In another exemplary arrangement, the security center itself can directly signal ATM dye packs to fire. That is, the security center can fire the dye packs without using the ATM computer. The security center may cause the dye packs to be activated following a theft confirmation. The signal from the security center to a dye pack may be encrypted. A dye pack can have a trigger device (or a detonator) set to fire upon receiving a predetermined frequency or wave. A radio frequency may be used. The frequency can be unique to a particular dye pack or a series of dye packs in a particular ATM. The security center can generate and transmit the frequency. Alternatively, if the security center is too far from the ATM, then the security center can cause the ATM (or another nearby source) to initiate or generate the triggering frequency.

It should be understood that the scope of the described concepts for determining whether an automated banking machine was moved is not limited to the embodiments disclosed herein. For example, image recognition, land-based radar, and sound waves can also be used in determining whether an ATM was stolen. A camera unit can be fixedly mounted to periodically capture an image of an ATM. The camera unit can transmit the image to a security center. The security center can have an original image of the ATM stored in a database. The security center can use image recognition software to compare the image received from the camera unit to the image in storage. Likewise, data relating to land based radar and/or sound waves can be used in determination comparisons. If compared data does not match, then an appropriate response action can be initiated by the ATM, as previously discussed. Alternatively, one or more additional analyses may be performed to confirm that the ATM was actually stolen. The confirmation analyses may include security comparisons already discussed, including comparisons involving data related to movement sensors, phone cells, and/or ATM GPS.

An ATM may need servicing (e.g., transaction function device malfunction, cash replenishment, low paper supply, predetermined maintenance, etc.) An ATM with GPS provides a service center (which may comprise the security center) the ability to identify the closest service personnel to the ATM. A dispatching program can operate in a service center computer (or an ATM host computer). The service center can receive both GPS information and a service request from an ATM. The GPS information and service request may be received in the same transmission packet. The service center can also receive (e.g., via GPS, address input, phone, voice, etc.) the current (or latest) locations of service personnel in the field. The dispatching program can determine which available service person can reach the ATM needing service the quickest. The program can match service personnel to service-needing ATMs for optimum efficiency.

The dispatching program can also use received ATM GPS information to generate optimal directions for the chosen service person to use to reach the ATM. The directions can include the most efficient route. The directions can be transmitted to the service person in a known manner. The dispatching program can also operate in real time with regard to current traffic conditions that may influence the route decisions, and hence the servicer-to-ATM matching. Thus, the chosen servicer may not necessarily be the closest servicer in distance. In an exemplary embodiment, the servicer is chosen based on smallest estimated travel time. The use of ATM GPS allows a servicer to reach an ATM in the quickest manner. The ability to quickly associate the position of an ATM needing servicing with the current positions of available service personnel results in a more efficient service dispatch. ATM operating efficiency can be improved.

In other exemplary embodiments, an ATM can signal what type of servicing is needed. Thus, a servicer may be chosen based on smallest estimated travel time in conjunction with the needed skill level of the service person.

It should be understood that the use of GPS for servicing applies to both fixed and portable (or movable) ATMs. For example, a portable ATM may be built into a vehicle that is able to drive to different sporting events, entertainment venues, etc. The portable ATM can be used (e.g., cash withdrawal transactions, etc.) by users at the events. Again, the ability to use GPS to quickly analyze or compare the current position of a portable ATM with the current positions of available service personnel results in a more efficient service dispatch.

The previously discussed use of GPS enables an ATM to be installed at any location just by plugging it in. Thus, in alternative embodiments there is no need to keep a database on where ATMs are located, because GPS tracking keeps the security/service center aware of their location, especially for purposes of servicing. A dynamic database of machine locations can be established and automatically updated.

The ability to locate a machine's geographical position can also be used to enhance the usage security of other automated transaction machines (e.g., ATMs). An exemplary embodiment combines the signals of a GPS system with a cellular device (e.g., cell phone) to provide information related to the geographical location of the cellular device user. That is, the exemplary embodiment includes the ability to track cellular devices using a combination of cellular or GPS/cellular technology. A cellular device can be equipped with a GPS receiver and/or transmitter.

For purposes of this disclosure a cell phone shall be deemed to include a cell phone, PDA, pager or other device that has audio and/or text communication capabilities. It should be understood that although a cell phone is used as the cellular device (or cellular object) in some exemplary embodiments herein, other cellular devices can likewise be used. That is, a cellular device need not be limited to a phone. For example, an object such as a card, key, time piece, wallet, vehicle, human body, etc. may have cellular technology (and/or GPS technology) embedded therein or thereon which allows the location of the object to be ascertained. Cell triangulation is one method to remotely determine the current location of a cellular object. Likewise, GPS communication is one method to remotely determine the current location of an object having GPS technology (e.g., GPS transmitter and/or receiver).

An exemplary cellular embodiment includes the ability to obtain the geographical location of an automated banking machine (e.g., ATM). As previously discussed, an ATM location can be obtained via an embedded GPS device in the ATM or a database of ATM installation locations. Thus, an ATM user's cell phone location can be compared with the ATM location to determine if the user is an authorized user.

The arrangement can be operated independently or as part of a fraud prevention (or security) service to which an ATM cardholder can join. A member in the fraud prevention program grants permission for his cell phone's location to be known to the provider of the security service whenever his account (or one of his accounts) is accessed at an ATM. The member provides to the service provider the information (e.g., cell phone number, cell phone provider, contact options, etc.) necessary to set up the service. The service provider program can be provided by a partnership between a financial institution (e.g., bank), a transaction processor host, and one or more cell service providers. Alternatively, the program can be controlled by a sole proprietor.

Different types of member-selectable contact options are available. For example, the program can be set up to alert a member about a transaction that is being requested on his/her account from an ATM which is not within reasonable proximity to his/her cell phone. The service provider notifies the member via the member's cell phone that a transaction is being requested at a particular ATM. Another selectable option can include having the service provider prevent a transaction request from being carried out when the ATM location and the member's cell phone location do not substantially correspond.

Figure 22:
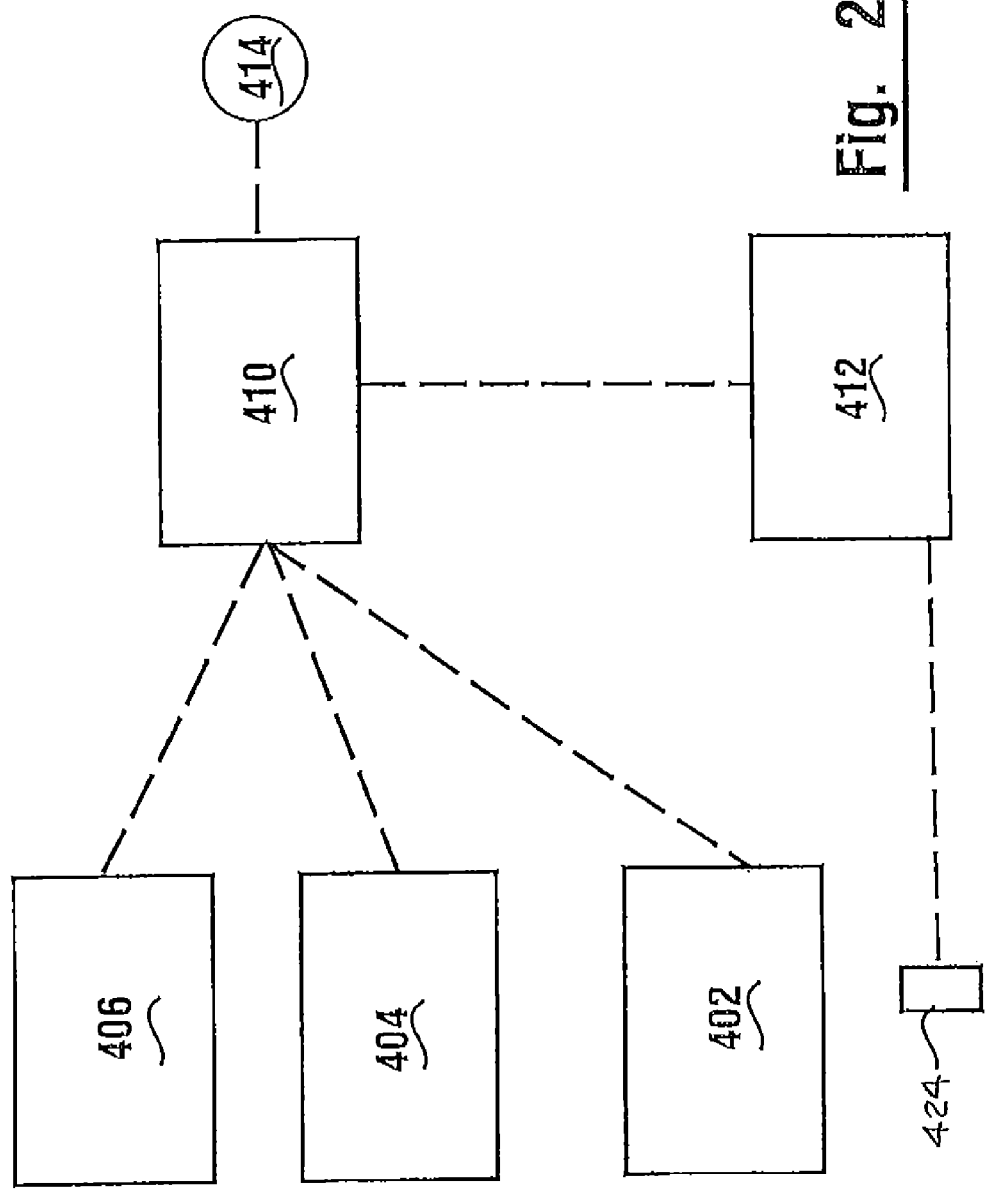
FIG. 22 shows an exemplary fraud prevention service arrangement.

An exemplary method of operation of a fraud prevention service will now be explained with reference to FIG. 22. As shown, the exemplary system arrangement 400 includes ATMs 402, 404, 406, an ATM host 410 in communication with the ATMs, a cell phone locator system 412 in communication with the host, and a member's cell phone 408.

An ATM 402 receives user identification data from a customer. The identification data may be received during a transaction request. The identification can be in the form of a name, account number, PIN, code, password, data sequence, biometric data, or some other information linking a person to an account. The identification can be input or provided by the customer to the ATM 402, such as from a card or a biometric type of input (iris scan, fingerprint, etc.). For purposes of this disclosure card data includes data read from a card or other object through operation of the machine that can be used to determine a corresponding financial account. Alternatively, the identification may be determined from some other customer input or a customer item read by the ATM 402.

The ATM 402 sends the user identification data to a computer of the host 410. The host computer can be part of a host system for an ATM network. Each of the ATMs is in communication with the host. In some embodiments the host 410 can communicate with other computers outside of the ATM network in carrying out a transaction.

The host 410 can operate to determine the ATM location from a GPS device in the ATM 402. Alternatively the host 410 can determine the ATM location from one or more databases 414 that includes the locations of the ATMs in the network. The host has access to the database 414. The ATM can provide its ATM ID to the host during communication with the host. For example, the ATM ID can be sent to the host when the user identification data is sent to the host 410. The host can compare an ATM ID to ATM IDs in the database to ascertain the location of an ATM. In other arrangements, data obtained by the host via a GPS device in an ATM may first need to be compared with a database to ascertain the location of the ATM.

The host 410 can also determine the cell phone 408 assigned to the received user identification data. The database 414 links authorized ATM users to their cell phones (and their accounts). For example, the host can compare received (or determined) account data to account data in the database 414 to ascertain the cell phone assigned to that account.

The host 410 is in operative communication with a cell phone locator system 412. In some embodiments the cell phone locator system may comprise a separate computer or computers and other hardware that is operative to determine cell phone location, while in other embodiments the cell phone locator system may comprise software instructions operative in one or more computers that operate in conjunction with other functions and determine cell phone location through communication with other devices or systems. The host can request the cell phone locator system 412 to provide the location of the cell phone 408 corresponding to the user. The host can provide the cell phone locator with a cell phone number, a cell phone account number, or other information corresponding to the ascertained cell phone.

The cell phone locator system 412 receives the host request and determines the current location of the cell phone 408. The cell phone locator can use cell triangulation to determine the current location of the cell phone. Alternatively, the cell phone locator can use a GPS device in the cell phone to determine the location of the cell phone. For example, the cell phone may receive a request from the cell phone locator to report its location. In response to the request, the cell phone can find its location (or GPS coordinates) using its GPS receiver. The cell phone then communicates the location data to the cell phone locator using cellular technology. Alternatively, the cell phone may transmit its location to the cell phone locator system using (via satellite) GPS technology. Thus, the cell phone locator system 412 knows the location (or GPS coordinates) of the cell phone.

The host 410 receives the location of the cell phone from cell phone locator system 412. Alternatively, the host can receive the location of the cell phone directly from the cell phone. The host can then compare the cell phone's location to the ATM's location. If the locations correspond, then the received user identification data is authenticated. The current ATM customer (adjacent to the ATM) is determined as an authorized user of the account. The transaction request is approved.

If the locations do not correspond, then the host may operate in accordance with its programming so that the current ATM customer is denied the ability to perform transactions with that account (corresponding to the received identification data). That is, a transaction request (and/or use of the ATM) would be denied. The security arrangement prevents an unauthorized ATM user (i.e., a thief) from using an ATM card that was stolen from a service member, to perform a transaction at the ATM involving the member's financial account. Thus, even if a member's ATM card and PIN are stolen by a thief, the fraud prevention service can still prevent unauthorized ATM access to funds in the member's bank account. Because of the additional cell phone security feature, the thief's use of the ATM would be limited (e.g., card entry, PIN entry, etc.), and would not include theft of the member's money.

It should be understood that cell phone and ATM locations are deemed to correspond through operation of the system based on predetermined variables. Particular variables can be assigned to particular users of the fraud prevention service. For example, one correspondence may require that the compared locations be within a predetermined degree or distance from each other. In another acceptable correspondence arrangement, the ATM location may have to be physically located within the same cell as the cell phone. Correspondence may also be time sensitive. For example, a member of the fraud prevention service can have their account set up such that ATM usage is only permitted during specific times of specific days. Thus, time can be another factor (or variable) that may have to be met (along with correspondence between cell phone location and ATM location) before a transaction is authorized. In still other arrangements, time can be chosen by a member as the only variable. For example, a member who only needs limited access to an ATM may select their ATM access time period as limited to 9-10 a.m. on Saturday mornings. Any (fraudulent) attempt to access this person's account at an ATM outside of this designated time period would be denied. The fraud prevention system is flexible and enables users to select and/or change their assigned variables to meet their particular needs and safety concerns. This may be done for example by the user establishing the parameters through correspondence with their financial institution when they establish the service. Alternatively or in addition the user may establish and/or change their desired usage parameters through communication with the bank in connection with an online banking system. Thus, for example, users who have the online banking service and the associated secure communications associated therewith may be given the option to modify their ATM usage parameters through an online interface which thereafter operates to cause the parameters for authorized transactions to be changed. Alternatively or in addition ATMs may include programming which enables a user once they have established their authority to operate the machine to thereafter change or modify certain user parameters through inputs through the ATM interface. Of course these approaches are exemplary and in other embodiments other approaches may be used.

An exemplary system for fraud prevention will now be explained. A person uses an ATM to request a financial transaction, such as a cash withdrawal transaction request for $100 from a checking account. The request (along with other information) is transmitted from the ATM to the transaction processor host (which may be the host computer for the ATM network). As previously discussed, the host knows or can determine the location of the ATM from which the transaction request is being made. The host also knows that the transaction request is from a particular individual due to the identification (e.g., an account number on a card) provided to the ATM during the request.

The host analyzes database records corresponding to that particular individual. The host can determine through execution of its programmed instructions whether the individual is a member of the fraud prevention program. If so, then the host also determines the member's cell phone provider. This is done by accessing stored data in at least one data store. The host requests the current location of the member's cell phone from the cell phone provider (or a phone location server associated therewith). The cell phone provider computer or computers determines the current location of the member's cell phone and then transmits messages including data corresponding to that location back to the host. The host compares the received cell phone location to the ATM location. If the two locations are within a predetermined range or proximity of one another then the transaction requested is determined safe and can be authorized according to normal transaction authorization rules in place. However, if the two locations do not correspond or are not within the predetermined acceptable proximity, then appropriate fraud notification rules and procedures can be implemented.

Thus, grant/denial of an ATM transaction request involving a member's account can be based on that member's location. If it is concluded that the member is adjacent the ATM, then the transaction request is granted. Otherwise the transaction request is denied. The member's determined location (via the member's cell phone location) can be used as another (or secondary) source of user identification.

A variety of additional fraud notification rules can be defined (selected) by the member, such as at the time of service protection enrollment. In a first example, if a member (e.g., a female) has sole access to her account and she normally has the cell phone with her, then she may have selected an option in which the service provider (e.g., bank or host operating on behealf) denies any transaction request where there is a mismatch between the ATM location and her cell phone location. With this selected option the member's cell phone may receive from the service provider a text message like "A transaction was just attempted against your account, but was denied due to location discrepancies between the ATM in question and your cell phone. Please contact us at . . . for more information."

In the first example, an ATM may be instructed by a host to capture the inserted card responsive to a determined mismatch of locations. Further, the host itself may be programmed to notify the police of a potential theft in progress at the particular ATM. This may be done for example through an automated voice response interface that operates to cause a synthesized voice message to the police in the jurisdiction where the transaction is being attempted. Alternatively or in addition text messages, e-mail, radio or other types of transmission messages to communicate with appropriate authorities may be used.

In a second example, a member (e.g., a male) may share access to an account (such as with a spouse) and it can sometimes happen that the location of the designated cell phone and an ATM location may not coincide. Therefore, the member may select a notification option which causes the at least one computer of the service provider to operate to notify the cell phone holder via a text message on the cell phone that "A transaction was just requested against your account at the ATM located at Wisconsin and M streets." Many methods of informing the holder that they have a text message can be used. For example, an audible (ring) or vibratory notification can be used. Additionally, messages other than in text format (e.g., a voice message, e-mail message, page or other messaging) can be used.

If the location and/or timing of the requested ATM transaction for which notice is given is suspicious to the member then he can further investigate. For example, he may call his spouse for verification. If necessary, he can notify the ATM's bank and/or the police. Alternatively, the host (or the security service) may be programmed to notify proper authorities of a potential fraud in progress at the particular ATM. Thus, the scenario is cardholder/fraud prevention-centric.

In an exemplary embodiment of the security system, a selectable option permits the cell phone holder to grant permission for the requested ATM transaction (e.g., by the spouse) to be remotely authorized. Permission can be granted by the security system to allow the ATM transaction to proceed upon receiving one or more messages corresponding to consent from the designated cell phone. Consent can be automatically granted upon the system receiving a call from the designated cell phone to a certain phone number (or code) within a certain amount of time. For example, a person may initiate a consent call after verifying that their spouse is trying to use the ATM. The consent call phone number (or consent code or password) may also be selectable by a member in some embodiments of the fraud prevention system. The ATM may be instructed by its host to capture an inserted card responsive to the system determining a mismatch of locations in combination with no received consent call or other appropriate response to authorize the ATM usage.

It should be understood that in some embodiments there may be many other detection, notification, and consent options available. For example, an ATM with a camera can capture an image of the current ATM user at the time of the detected discrepancy in locations between the ATM and the cell phone. The captured user image (with or without a text message) can be sent to the designated cell phone. The person having the cell phone in their possession can be notified (via the phone) of the discrepancy and that they have access to an image of the ATM user in question. The cell phone holder can then view the user image on a display screen of the cell phone.

The image can help the cell phone holder (e.g., owner) quickly determine whether to grant consent to the current ATM user. This may be done, for example, in the manner described in U.S. Pat. No. 7,533,805 the disclosure of which is herein incorporated by reference in its entirety. Thus, consent can be image based. Communication and data transfer between the security system and a designated cell phone can occur in real time or near real time.

Also, in some embodiments more than one cell phone can be assigned to an account. This may be done, for example, by associating multiple cell phone numbers, text message numbers, e-mail addresses or other predetermined notification network addresses with an account in at least one database that is accessible by one or more computers that are operative to cause notifications to be given. Thus, the host can obtain the current location of plural cell phones. For example, GPS or triangulation of cell areas may be used to determine the cell phones' location. If the host (or another computer of the service provider) determines that one of the cell phones is currently located adjacent to the ATM then the transaction request is permitted. This option enables family members such as both spouses (who have respective cell phones) to separately carry out an ATM transaction without requiring service provider notification.

Other methods of communicating between the service provider and the member may be used in some embodiments. For example, a personal (human voice) phone call may be made on behalf of the service provider notifying the service member of the situation involving their account. This may be done through operation of an automated voice response (AVR) system in operative connection with one or more computers so as to dial and/or send a simulated voice message to one or more phones. This may be done in the manner of the incorporated disclosure or through other types of devices. Alternatively or in addition one or more computers of the service provider may operate to give notice to a live service person to make a call to the cell phone of the customer involved. The service provider can call the cell phone number assigned to the member causing the cell phone to ring. After the member answers their cell phone, the service provider can inform the member of the discrepancy situation. Instead of a live person, a recorded message can be used for the informing. Other communication formats can be used. This may include, for example, IM (instant messaging), text messaging and the like may be the communications formats used to contact the member's cell phone.

Alternatively, a member's device other than their cell phone may be contacted by the service provider. For example, a notifying e-mail may be sent (by the service provider such as through automated computer dispatch) to the member's home PC. A voice message may be left on the member's home answering machine. Alternatively or in addition the user may be contacted via pager message, message to a service to which the user subscribes, for example Twitter$^{SM}$ or other methodology that is operative to provide a user that reasonably prompt notification.

As discussed, in some embodiments different security levels of fraud detection and member notification can be selected by the member. For example, a different level of detection may use cell triangulation in placing the location of a cell phone instead of having GPS embedded in the cell phone. The cell in which the cell phone is deemed present can be compared to the cell in which the ATM resides. If the cells correspond, then the transaction requester is authenticated as an authorized user of the account. It should be understood that even further detection and notification procedures may be available in some embodiments to members of the security system.

As previously discussed, an exemplary embodiment of the security system enables authorization (or authentication) of ATM transactions based on the (cellular) location of the security system member. The authorization can be further based on GPS location of the ATM. The exemplary security system provides additional transaction security to help prevent unauthorized ATM access to a financial account if it is determined that the location of the ATM from which the account transaction is being requested substantially differs from the location of the authorized user of the account. The location of the ATM can be determined via GPS technology. The location of the authorized user can be determined via the location of the user's cell phone. The location of the cell phone can be determined via cellular or GPS/cellular technology.

It should be understood that the description of the security system with regard to ATMs is exemplary, but is not to be limited thereto. An ATM is one of many automated transaction machines in which the security system can be implemented. Likewise, the security system can be used with facilities, such as gas stations. A positive comparison of the gas station (or fuel pump) GPS location with the purchaser's cell phone location grants access to the fuel. Alternatively, a cellular device may be located in or on a vehicle. When a person requests fuel for the vehicle, a comparison is made of the vehicle location (e.g., cellular location) and gas station location (e.g., GPS location). Additionally, the security system can be used in conjunction with other transaction facilities, including stores, restaurants, etc. The security system can be used where location-based verification or identification of a person is needed. The security system helps to reduce or prevent unauthorized use of a financial account by determining whether the location at which the account is trying to be used substantially differs from the current location of the authorized user of the account.

The exemplary security arrangement permits a method to be carried out including the steps of (a) receiving input with an ATM, where the input corresponds to an account; (b) determining a current distance of an authorized user of the account relative to the ATM; and (c) determining whether the received input corresponds to the authorized user responsive to the determination in (b). Step (c) can include determining whether a current ATM customer is authorized access to the account responsive to a computer comparison of the current location of the authorized user relative to the ATM. The determination in (c) can include comparing ATM location to current authorized user location. The current authorized user location can correspond to location of a personal item of the authorized user, where (b) includes determining location of a personal item of the authorized user. The current authorized user location can correspond to location of a cell phone of the authorized user, where (b) includes determining location of a cell phone of the authorized user. The cell phone can include a Global Positioning System (GPS) receiver, where (b) includes determining location of the cell phone via GPS. The input can correspond to an account of the authorized user, where (c) includes determining whether the current ATM customer is the authorized user. Step (a) can include receiving account data on/from a card. Step (a) can include receiving biometric input corresponding to an authorized user of the account.

The exemplary security arrangement permits another method to be carried out including the steps of (a) receiving a transaction request at an automated transaction machine, where the transaction request is associated with an account;

(b) determining location of the automated transaction machine; (c) determining at least one location of at least one authorized user of the account; (d) comparing the location determined in (b) to the at least one location determined in (c); and (e) responsive to a positive comparison in (d), granting the transaction request received in (a).

The exemplary security arrangement permits a further method to be carried out including the steps of (a) receiving customer identification input with an automated transaction machine; (b) determining a first customer location as location of the machine, responsive to the input; (c) independent of (b), determining a second customer location as current location of an item on the customer, responsive to the input; (d) comparing the first and second customer locations; and (e) responsive to a positive comparison in (d), authorizing a first customer transaction with the machine. Step (a) can include receiving customer identification input with an ATM including a currency dispenser, and where (c) includes determining location of a cell phone.

The exemplary security arrangement permits another method to be carried out including the steps of (a) determining location of a portable communication device affiliated with an authorized customer responsive to input to an automated transaction machine; and (b) determining whether the input corresponds to the authorized customer responsive to relative location between the device and the machine. The portable communication device can comprise a cell phone. A customer of the machine can be authorized a transaction responsive to location of the cell phone corresponding to location of the machine. The machine can comprise an ATM.

The exemplary security arrangement permits another method to be carried out including the steps of (a) determining location of a cell phone affiliated with an authorized customer; and (b) authorizing to the customer a transaction with an automated transaction machine responsive to location of the cell phone corresponding to location of the machine.

The exemplary security arrangement permits another method to be carried out including the steps of (a) receiving input with an automated transaction machine, where the input is associated with a customer affiliated with an object locatable independent of operation of the machine; and (b) authorizing a customer transaction with the machine responsive to correspondence between location of the object and location of the machine. The object can comprise a cellular item, a GPS item, or an RFID item, for example.

The exemplary security arrangement permits another method to be performed including the steps of (a) receiving input with an automated transaction machine, wherein the input is associated with a customer affiliated with a remotely locatable device; (b) operating at least one computer to determine location of the device; (c) operating the at least one computer to determine whether the location of the device determined in step (b) corresponds to location of the machine; and (d) responsive to correspondence in step (c), authorizing to the customer a transaction with the machine.

The exemplary security arrangement permits another method to be performed including the steps of (a) receiving input with an automated transaction machine, wherein the input is affiliated with a cell phone; (b) operating at least one computer to determine whether location of the cell phone corresponds to location of the machine; and (c) responsive to correspondence in step (b), authorizing a transaction with the machine.

The exemplary security arrangement permits another method to be performed including the steps of (a) receiving input with an automated transaction machine from a person associated with a cell phone; and (b) determining whether the person is an authorized user of the machine using location of the cell phone relative to location of the machine.

The exemplary security arrangement can include an apparatus comprising: a system, where the system includes a plurality of cell phones, at least one computer, a plurality of cash dispensing ATMs each having a GPS device, an ATM host in operative communication with and remote from the ATMs, and a cell phone locator system in operative communication with and remote from the host; where the ATM is operative to receive user identification data from a customer, the host can determine a cell phone ID assigned to the received user identification data, the host can also determine location data corresponding to an ATM from either a database or from a GPS device in the ATM, the cell phone locator can determine the current location of a cell phone corresponding to the cell phone ID responsive to a request from the host, the cell phone locator can then send the cell phone's location data to the host, the host can then compare the cell phone's location data to the ATM's location data, responsive to the comparison the host can either authorize the customer to perform a transaction at the ATM if the locations correspond or deny the customer from performing a transaction at the ATM if the locations do not correspond.

The exemplary security arrangement can include another apparatus comprising: at least one automated transaction machine, where each machine is operative to receive account information from a customer during a transaction request, and a host, where the host includes at least one computer, where the host is in operative communication with the at least one machine, where the host is operative to determine geographical location of a transaction request at a machine responsive to account information received at the machine, where the host is operative to determine geographical location of at least one authorized user corresponding to account information received at a machine independent from a determination of geographical location of a transaction request at the machine, where the host is operative to compare transaction request geographical location to authorized user geographical location, and where the host is operative to determine whether a machine customer corresponds to the at least one authorized user. The apparatus can further comprise a cell phone, where the host is operative to determine geographical location of at least one authorized user via the cell phone. The cell phone can include a Global Positioning System (GPS) receiver. The apparatus can further comprise a cell phone locator system, where the cell phone locator system is operative to determine the current location of the cell phone. The host can be in operative communication with the cell phone locator system, where the host is in operative to request the cell phone location from the cell phone locator system. The cell phone locator system is operative to provide the current location of the cell phone to the host. At least one automated transaction machine comprises at least one automated teller machine ("ATM"), where each ATM includes a currency dispenser, and where each currency dispenser is operative to dispense currency from a respective ATM. Each ATM is operative to receive account information from a customer during a transaction request. At least one ATM includes a GPS receiver. The host is operative to determine geographical location of at least one ATM via GPS data. The host is operative to compare cell phone location to ATM location to determine whether a current ATM customer corresponds to an authorized ATM user.

In alternative arrangements, a RFID object can be used instead of or in combination with cellular and GPS objects. An RFID object can be used to verify that the current ATM user is an authorized user. The RFID object can be separate from a user card. The RFID object can be used as another security level for verifying user authorization. The ATM has a RFID reader. The user data read from the RFID object (tag) is compared to another form of user identification (user card, user fingerprint, iris scan, other biometrics, etc.). The comparing can take place at the ATM, ATM host, or security center. The comparison can be used to determine if the RFID object ID and user ID correspond. A positive correspondence permits the user to use the ATM for transactions. If the ATM is unable to obtain the necessary data from the RFID object (which is an indication that the RFID object is not adjacent the ATM) then usage of the ATM is denied.

The ability to locate an ATM's geographical position can also be used to provide location-oriented services to the public. A service provider ("SP") can provide the services. The service provider can comprise or be associated with a previously discussed security center or service center including one or more computers. A computer in the ATM (or the GPS system) can convey coordinate location data to the service provider. The service provider computer or computers can operate to store this ATM location data in a database along with other location data corresponding to other ATMs. Thus, the database can include the locations of plural ATMs, including ATMs belonging to different banking networks. The database may also contain location information for many other locations that may be of public or private interest. The database may contain data corresponding to waypoint location information, e.g., stores, food establishments, bank branches, or even dynamic ATM-service vehicle locations.

ATMs with GPS capability provide the capability to reference coordinates for ATM-based map generation. The database can also store map data. A service provider can use a geographical starting point reference from which to generate a variety of "how to get there from here" directions, which may be in the form of a map.

An ATM direction-providing service can receive a request for directions from one or more entities (e.g., a person, computer, machine, etc.). For example, a person at a first location (e.g., a merchant store, fuel station, restaurant, etc.) may wish to have directions to the nearest ATM. The direction requester may be a person desiring to use an ATM to perform a financial transaction (e.g., cash withdrawal, reload a smart card, etc.). Of course the individual may also be an ATM service person needing to located a malfunctioning ATM.

The system allows a person to provide their current (or best known) location to the service provider. The current location may be provided to the service provider in numerous known ways. From this "current location" information, the location service can instruct or provide directions to the person on how to get to the nearest (or desired) ATM. The service provider can also provide directions to the nearest ATM belonging to a requested particular bank or financial institution (e.g., a bank belonging to the requester's home banking network).

The service provider providing the directions can be a company, person, computer, and/or machine. The service provider can communicate with a direction requester via diverse communication devices and processes. The direction-providing service can be made available to a direction requester via a variety of communication devices, such as PDA, cell phone, Internet, address input, input device equipped with a GPS receiver, on-line devices, and off-line devices. Other known transmission processes suitable for communication may be used, including analog, digital, wireless, radio wave, microwave, satellite, and Internet communication. For example, the service provider may operate one or more computers to communicate with a person using voice recognition software and speech software. In another example, a person can wirelessly transmit their request along with their current GPS location to the direction-providing service over the Internet via a hand-held computer or cell phone. In response, the service can download (e.g., as e-mail, PDF file, voice mail, instant message, etc.) the requested directions (e.g., a detailed map) to the hand-held computer. In a further example, a cell phone can include a GPS system. The person can wirelessly transmit their request along with their current GPS location to the service via the cell phone. For example, when the cell phone calls a particular phone number of the service provider for a directions request, the cell phone also transmits its current GPS location. Alternatively, the service provider computer can operate to recognize the cell phone number via caller ID, match the cell phone's number to the cell phone's GPS system, obtain the cell phone's current location from the cell phone's GPS system, and then transmit directions to the nearest ATM based on the cell phone's location.

FIG. 20 shows one or more computers of a service provider 380 in operative connection with a database 390. The service provider 380 includes at least one computer 382. The service provider 380 can simultaneously communicate with and provide information to plural requesters 384, 386, 388.

The database 390 can store ATM location data 392, map data 394, and additional data 396. Such additional data 396 may be key words or phrases, such as landmark names, points of interest, street intersections, city sections such as Chinatown and Little Italy, etc. For example, a requester may not know their exact address location but can inform the service provider (via their phone) that they are near the intersection of 19th and M streets. The computer 382 can operate to recognize (such as via voice recognition software) the received intersection as location information. From the intersection information the computer 382 can provide the requested directions. It should be understood that directions can also contain landmarks, points of interest, street intersections, etc. For example, by knowing which intersection the requester is near and the (real time) visual lay out of the city, the service provider 380 can instruct the requester that the nearest ATM is next to a landmark that is easily visible from the intersection. Such a landmark may be a well lit (neon) sign, a bell tower, a pedestrian bridge, etc. Thus, additional stored data 396 can be used by the service provider computer 382 to more accurately understand requests and provide locations/directions to requesters.

An exemplary flowchart of requesting/receiving service is shown in FIG. 21. The actions performed by the requester and by the service provider are also shown. In the exemplary method a requester (e.g., a person) contacts the service provider.

The SP acknowledges the contact and asks for the person's PIN or service access code. The person provides their PIN.

The SP compares the PIN with a list of valid PINs and determines the PIN acceptable. The level of service associated with the PIN is obtained. The SP asks for the person's current location. The person notifies the SP of their current location (e.g., an address, notable landmark, etc.).

The SP analyzes (e.g., voice recognition, speech to data interpretation, etc.) the provided location for best fit location comprehension. That is, the SP computer tries to recognize the provided location. The comprehended location may be compared to locations in the database to determine if it is a usable (valid) location. If the provided location is not usable, then the SP may ask the person to again provide the location, or more information may be requested to ensure location accuracy. For example, the SP may speak the comprehended location to the person and ask the person to validate whether the location is correct. Once a provided location is deemed valid, then the SP can ask for the person's request. In response, the person may request directions to the nearest available ATM.

The SP uses the database information to determine the shortest available route from the person's current location to the nearest ATM. The SP generates directions in a format capable of being received by the person. The format can match the format in which the request was received. For example, if the request was made via the person's cell phone, then the directions can be provided in a form capable of being received by the person's cell phone. The SP provides the directions to the person. The person receives the directions. It should be understood that in other arrangements greater or fewer steps may be carried out, and the order of the steps can vary.

The person's request for directions may be selected from a list of options. For example, options may include press number 1 for information regarding the nearest ATM, press number 2 for information regarding the nearest fee-free ATM, etc. Once the first option is input then another set of options may be provided to the person. The second set of options may relate to the context in which the information content is to be provided. For example, assuming that the nearest ATM was selected in the first option set, the second options may include press number 1 for the ATM address, press number 2 for a map to the ATM, press number 3 for an operator to guide you to the ATM, etc. Further sets of options may follow to ensure the desired service. The service provider can know the level of service available to the requester based on the provided PIN. Likewise, other information (e.g., requester's home banking network) can correspond to the provided PIN.

The person's communication device may partake in obtaining the person's current location and in notifying the service of the current location. For example, the person's communication device may include GPS. GPS, triangulation of cell areas, or other manners may be used to determine the requester's (cell phone) location. Also, a person's request for directions may be a default request based on the manner of communication. For example, a service provider may treat any person calling their phone number as a direction requester by default. Thus, a person may not have to actually (e.g., verbally) request directions, it already being inferred.

The direction-providing service may be a free service, a pay-as-you-use service, and/or limited to paid subscribers. A person may have access to the service as a result of being a valued customer of a particular bank. For example, an ATM customer that regularly incurs ATM transaction fees to the bank may receive free access to the ATM-directing service. The bank can provide (or pay for) the service on behalf of the valued customer.

The level of service may vary with the type of service to which the person has subscribed. For example, one type of service may include having a personal assistant stay on a phone with the person until they correctly and safely reach their desired ATM, while another level of service may simply provide the street address of the nearest ATM.

Figure 23:
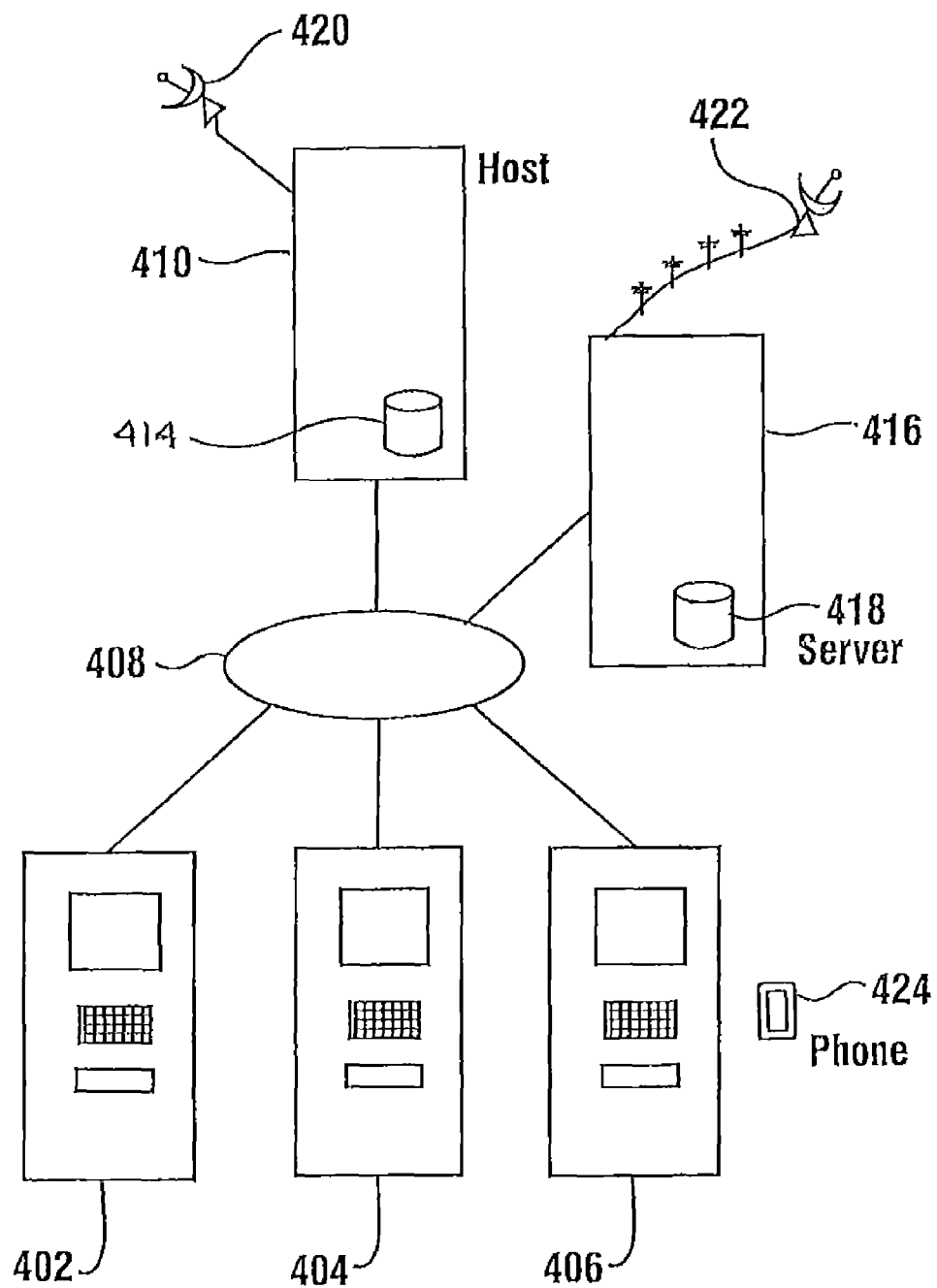
FIG. 23 is a schematic view of an alternative automated banking machine system.

FIG. 23 shows schematically the system of an exemplary embodiment that may be operated to minimize the risk of a user's financial account being accessed by an unauthorized person at an automated banking machine. It should be understood that the system is shown schematically and is highly simplified for purposes of facilitating explanation.

The system shown in FIG. 23 includes automated banking machines 402, 404 and 406. The automated banking machines may in some embodiments be ATMs and in other embodiments other types of banking machines may be used. The automated banking machines are connected through one or more networks 408 with one or more remotely located computers. In the exemplary embodiment, the remote computers include a host computer 410. The host computer can include one or multiple computers that are in operative communication with one or more data stores schematically indicated 412. The exemplary embodiment further includes one or more other remote computers. This is schematically represented by a server 416. Server 416 is also in operative connection with one or more data stores 418.

In the exemplary embodiment, the host computer 410 is in operative connection with a wireless communication system schematically indicated 420. Similarly, in this exemplary embodiment the server 416 is also in operative connection with a wireless communication system schematically indicated 422. In exemplary embodiments, the wireless communication system may be operative to provide connections to achieve communications with cell phones, such as phone 424 schematically shown in FIG. 23. The wireless communication systems may be in operative connection with one or more wireless networks. Alternatively or in addition, the wireless communication networks may be operative to communicate wirelessly with other devices. This may include in some embodiments, the capability for communication of GPS data for tracking cell phones or other wireless devices, as previously discussed. Alternatively or in addition, the wireless communication capability may be usable for wireless tracking of the automated banking machines or other items.

In the exemplary embodiment, the automated banking machines may include input devices of the types previously discussed. This may include, for example, a card reader which is operative to read data from user cards which correspond to financial accounts. The automated banking machines may also include other input devices which have a capability to provide user identifying data. The exemplary automated banking machines may also include input devices such as keypads which are usable to receive manual inputs from users. This may include, for example, data such as personal identification numbers (PINs). Keypads may also be used for receiving transaction amounts or other user-provided inputs. It should be understood for purposes of this disclosure that keypads can include touch screens or other devices that can receive user selectable inputs.

Exemplary automated banking machines may also include other input devices such as for example a bar code reader. Bar code readers may be usable to read for example one-dimensional or multi-dimensional bar codes for purposes of determining the data represented thereby. Of course this is accomplished thorough operation of one or more banking machine computers that are included in each of the automated banking machines. Further, in some exemplary embodiments image capture devices, such as cameras, may be associated with or mounted near or within each of the automated banking machines. The image capture devices may operate in connection with one or more computers and systems having the capabilities described in U.S. Pat. No. 7,533,805, the entire disclosure of which is herein incorporated by reference. Of course these capabilities are exemplary and in other embodiments other approaches may be used.

In the exemplary embodiment, the one or more servers 416 can have capabilities like those described in U.S. Pat. No. 7,516,087, the disclosure of which has been herein incorporated in its entirety. This includes for example, including in the one or more data stores 418 data which corresponds to user data and messages or other actions to be presented and/or taken when a particular user is determined to be requesting a transaction at a particular ATM. This can include for example, presenting certain specific determined messages to the particular user based on stored information and/or criteria associated with that particular user.

In this particular exemplary embodiment, the one or more server data stores 418 include data corresponding to one or more predetermined notification network addresses. The network addresses are associated with user data that is received by the server 416 responsive to a user conducting a transaction at a particular automated banking machine. This network address data may correspond to one or more ways of communicating with the particular user. In exemplary embodiments, these ways of communicating may correspond to communication with a user's cell phone. This data may include, for example, address data for calling the particular user's cell phone. Alternatively or in addition, the address data may include data for communicating a text message to the user's particular cell phone. Alternatively or in addition, the data may include an e-mail address at which messages are receivable with the user's cell phone or other manner for communicating with the particular user's cell phone or other mobile device so as to enable the communication to be provided to the user during or proximate to the conduct of a particular transaction at an automated banking machine. Furthermore, the exemplary embodiment of the one or more servers 416 includes computer executable instructions that are operative to cause the server to generate message content appropriate for messages to be communicated to a user's cell phone or other mobile device related to particular transaction conditions. Alternatively or in addition, such message generation capabilities may be associated with other connected computers and/or the wireless communication system with which the server 416 is connected.

In the exemplary embodiment, the host system may operate in a manner like that discussed in the incorporated disclosures to receive messages from an automated banking machine and to cause a financial transfer related to an account corresponding to card data on a card that is read for purposes of carrying out the transaction at the particular machine. Thus for example, in exemplary embodiments the host 410 may receive one or more messages from an automated banking machine at which a user is requesting a transaction. These host messages may include data corresponding to card data which identifies the user and/or their financial account. The host messages may include data corresponding to a PIN number or other identifier presented by the user at the banking machine. The one or more messages sent to the host from the banking machine may generally also include information regarding the type of transaction the user wishes to conduct. This may include, for example, a cash withdrawal from the automated banking machine. The one or more messages sent to the host may also include data corresponding to an amount associated with the transaction that the user wishes to conduct. This may include for example, in a cash withdrawal transaction, a request for $200 to be dispensed from the banking machine and assessed to a user's checking account.

In exemplary embodiments the host may operate in accordance with its programming based on data stored in the one or more data stores, to determine that the card data corresponds to an authorized user whose account is authorized to carry out the requested transaction. The host computer may also operate in accordance with its programming to determine that PIN number data or other data included with a message corresponds to that which is appropriate for the particular user or account. This is done based on the host computer operating to determine that the data included in the message corresponds to data in the one or more data stores 412. Of course these approaches are exemplary and other approaches can be used.

The host computer may also determine that the requested automated banking machine transaction is authorized for the particular account and/or user, and operates to cause one or more messages to be sent from the host to the particular automated banking machine. This may include, for example, including data in the messages which indicates that the transaction is authorized. In response to receiving the messages from the host, the automated banking machine operates to carry out the authorized transaction. In this example, this would include operating a cash dispenser to cause cash stored in the machine in the requested amount of $200 to be dispensed to a user.

Of course in a situation where the host computer determines that the transaction is not authorized, then the messages sent to the automated banking machine will indicate that the transaction is not to be conducted. In this case, the automated banking machine may operate to display an appropriate message to the user, and will also operate to cancel the transaction. In some embodiments, and based on the messages from the host to the automated banking machine, the user card may be returned to the user. In cases where the card is reported stolen or otherwise the programming of the host indicates the card is being improperly used, the messages to the automated banking machine may operate to cause the banking machine to capture the card. Of course these approaches are exemplary.

Furthermore, in exemplary embodiments the automated banking machine may operate once it has successfully carried out the authorized transaction, to generate one or more messages to the host to indicate the successful completion of the transaction. This may be done through operation of the one or more banking machine computers included in the machine, which operate in accordance with their programming to cause such messages to be sent to the host. The host may operate in accordance with its programming in response to the data included in such sent messages to cause a financial transfer from the user's account in an amount corresponding to the cash dispensed. Alternatively, if the automated banking machine was not able to carry out the transaction (for example the cash could not be dispensed), the at least one computer in the automated banking machine operates to cause one or more messages to be sent to the host with data indicating that the authorized transaction could not be carried out. The host operates in response to such messages from the automated banking machine to record that the transaction could not be completed. The host also operates in such circumstances in accordance with its programming not to charge the user's account for the value of the requested transaction. The host may further operate in accordance with its programming to cause a notification to be given in appropriate circumstances of a problem or other situation at the banking machine that will need to be remedied because the transaction could not be completed. This might include for example, information that the transaction was unable to be completed because the automated banking machine does not contain sufficient cash. The host may operate in accordance with its programming to give notice to appropriate service persons to replenish the machine with cash. Of course these operations and steps are exemplary, and in other embodiments other approaches may be used.

In the system schematically represented in FIG. 23 the system may operate to provide additional assurance or security that a requested transaction at an automated banking machine has been authorized by the actual owner of the account. This is accomplished in an exemplary embodiment by the user being contacted via a cell phone (or other mobile/portable device) message during the transaction through a particular network address associated with the cell phone that they have registered for receiving notifications. In a manner previously discussed, the cell phone's contact data can be associated (linked) in a data store with user identification data (e.g., account data). The user identification data (or data corresponding thereto) can be read by the automated banking machine. Thus, user data read by the automated banking machine can be used to access stored contact data for the correct cell phone.

In one exemplary embodiment, the cell phone operates to receive a particular message or security data that the user is required to input to the automated banking machine in order to have a transaction proceed. The security data can comprise a code. The received message can include the security data, which may also be referred to herein as permission, authorization, confirming, consent, approval, identifier, or security data. User input of the transaction security data (e.g., code) at the machine is sensed through operation of the at least one banking machine computer. The code is compared and verified (determined) as the appropriate (e.g., same) code that was sent during the transaction to the cell phone that is associated in a data store with the particular user.

Of course if the user's card has been stolen, the message that is sent to the user's cell phone will alert the actual authorized user that a (fraudulent) transaction is being attempted. Of course the person (e.g., a thief) attempting unauthorized use of the automated banking machine will not receive the provided code. Thus, a fraudulent transaction request will not be authorized to be carried out even in circumstances where a thief (i.e., as an operator of the machine) has an authorized card/ID and PIN number for a particular account.

Figure 24:
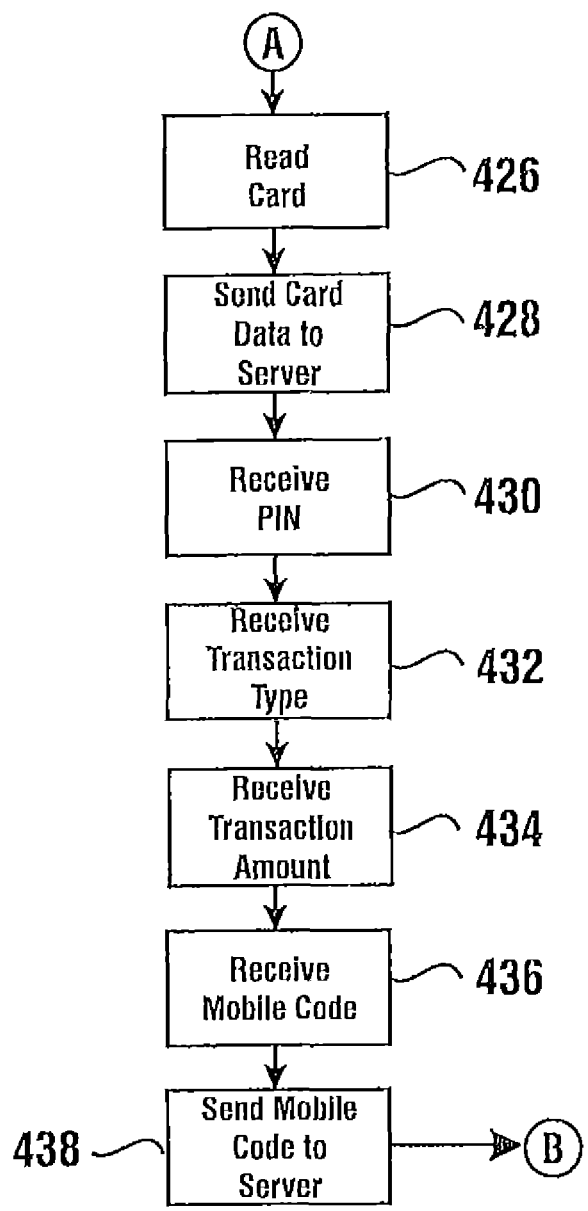
FIGS. 24 and 25 are a schematic representation of software logic carried out by an exemplary automated banking machine used in the system shown in FIG. 23.
Figure 25:
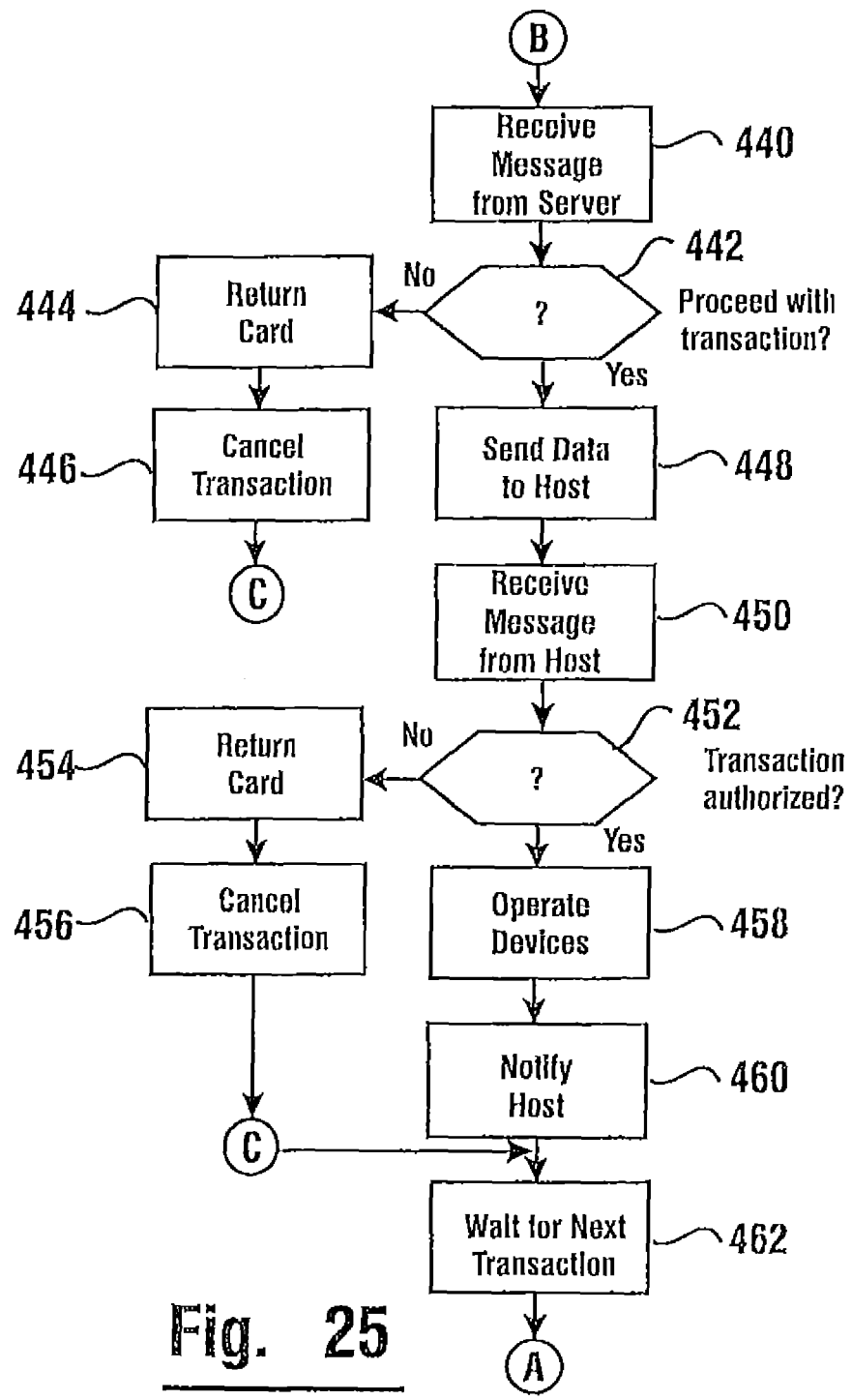

The exemplary software logic flow carried out through operation of banking machine computers in the automated banking machine in a system which has these capabilities is schematically represented in FIGS. 24 and 25. As can be appreciated, before a user approaches the automated banking machine it may be operating in a wait mode. This may include, for example, outputting particular promotional messages or other information to attract a user to the machine and/or providing instructions to a user on how to commence a transaction with the machine. In the exemplary embodiment, the machine user may commence a transaction by inserting or swiping a card which includes data corresponding to the user's financial account. This is represented schematically in FIG. 24 by a step 426 in which the machine operates to cause a user's card to be read. This can be done for example through operation of a card reader in the machine.

In accordance with the incorporated disclosure, the exemplary embodiment of the banking machine computer is operative to cause to be sent to the server 416 one or more messages including data corresponding to at least a portion of the read card data. This is represented in a step 428. Of course as can be appreciated, the one or more messages to the server 416 may be encrypted or otherwise configured so as to reduce the risk of unauthorized interception of the data that is exchanged in the messages between the automated banking machine and the at least one server 416.

In operation of the automated banking machine in this exemplary embodiment, the machine then operates in accordance with the software instructions to receive PIN data from a user. This is represented by a step 430. The user inputs their PIN number through a keypad or other input device on the machine. Of course it should be understood that other input devices for receiving identifying information may be used. This may include for example biometric inputs, facial recognition inputs, or other inputs that are suitable for identifying the particular user or their account.

In the exemplary embodiment, the automated banking machine operates in accordance with its programming to provide a user with transaction options that the user may select. These transaction options correspond to transaction types that the user could conduct at a machine. The embodiment operates to receive from the user one or more inputs which are indicative of the particular transaction type that the user wishes to conduct at the machine. This is represented by step 432. For purposes of this example, it will be presumed that the user wishes to request a cash withdrawal from their account, such as their checking account.

Step 434 represented in FIG. 24 corresponds to receipt by the automated banking machine from the user of the particular amount associated with the transaction that they wish to conduct. In this case the amount of the cash withdrawal would be $200. The automated banking machine operates to receive through inputs from the user, an indication that this is the amount of the particular cash withdrawal that the user wishes to receive. This can be done through a keypad, touch screen, or other suitable input devices.

In the exemplary embodiment of the system represented in FIG. 23, the automated banking machine operates responsive to one or more server messages from the server 416 to provide a particular output for users that have elected to receive a service in which additional authorization is required in order to conduct transactions. This includes in this exemplary embodiment, responsive to operation of the server 416, receipt of a message through their designated mobile phone or other portable device, which indicates the occurrence of a transaction at an automated banking machine. Further in this exemplary embodiment, the server operates in the manner later described in detail to cause to be sent to the mobile phone, a particular code (or other transaction related identifier) which the user must input/provide to the banking machine to allow the machine to carry out the requested transaction.

In some systems, a requirement for additional transaction authorization may be triggered by the type of transaction being requested. For example, if a cash withdrawal transaction is requested and the user card data corresponds in a data store to a cell phone contact, then a security code may be sent to the cell phone. Thus, based on the transaction type, the banking machine can be programmed to additionally expect or request the machine user (during the transaction) to input data corresponding to a security code. However, even though an account may be associated with a cell phone, other types of account transactions (e.g., an account balance request transaction) may not necessarily trigger the additional security steps that include the sending of a security code to a customer's cell phone followed by user input of the code to the machine. In such a scenario, the banking machine may be programmed to not expect any user input of data corresponding to a security code.

In an exemplary embodiment, at least one computer of the machine is programmed to carry out a transaction, such as a cash withdrawal/dispensing transaction. The programming may cause the computer to carry out the transaction in stages. For example, in a first stage of the transaction the machine computer causes a reader device (e.g., card reader) to obtain user identifying data from a user of the machine. In a second stage of the transaction the computer sends a message to a remote computer (e.g., server). The message causes cell phone contact data to be obtained (by the remote computer) from a data store which associates the cell phone contact data with the user identifying data. The message also causes a security code to be sent (by the remote computer) to the user cell phone which corresponds to the cell phone contact data.

In a third stage of the transaction the computer receives user inputted data through an input device of the machine. In a fourth stage of the transaction the machine computer causes cash to be dispensed, based on the received user input corresponding to the sent security code. Of course it should be understood that other transaction stages/steps can occur between these mentions stages. For example, before the fourth stage the machine computer can cause the inputted data to be sent to the remote computer for comparison with the security code, and receive the comparison result.

In some exemplary embodiments, the code may be a random one-time use code that is generated through operation of the server (or other computer in operative connection with the server) executing a random character generation program. The random characters may include in some embodiments, numbers, letters, or other characters which are included in a code that otherwise cannot be predicted in advance, and which the user is required to input to allow the transaction to proceed. Thus, in the exemplary embodiment, in step 436 the machine receives from the user in response to an (message) output through a banking machine display device, the (same) code that the server caused to be sent to the user's mobile device. Of course it should be understood that if the transaction is not being conducted by the authorized user, then the person conducting the transaction will not know the required code. Thus, the person will not be able to input the correct code, and therefor will input an improper code or no code.

Furthermore, code entry can be time sensitive. Thus, if the person operating the automated banking machine does not input the correct code within a given time period, the machine may operate to cancel the transaction and return to its initial waiting state. The machine may also operate in accordance with its programming to return the user card to the user.

In the exemplary embodiment, after receiving the code from the user, the automated banking machine computer operates in accordance with its programming to send one or more messages to the server 416. These one or more messages include data corresponding to at least a portion of the code that was received from the user. This is represented in step 438. Of course as can be appreciated as in the case with the other server messages and host messages, such messages may be appropriately encrypted or otherwise configured to reduce the risk of interception.

In the exemplary embodiment, the server operates in the manner hereafter explained to determine if the user-inputted data (corresponding to the code) that was sent by the automated banking machine to the server in step 438, corresponds to the (same) code that the server generated and caused to be sent to the user's mobile device. The server operates in response to this determination to send to the automated banking machine, one or more messages with data which indicates whether the user-inputted data corresponds to the data (code) that was included in the one or more messages sent to the cell phone. Machine receipt of these messages is represented by a step 440 in FIG. 25.

In a step represented 442, the automated banking machine computer operates in accordance with its programming to determine from the one or more messages received in step 440 whether the data included therein indicates that the transaction should proceed. If the server determined that the transaction should not proceed, the banking machine computer operates in accordance with its programming to return the user's card. This is represented in a step 444. The machine also operates to cancel the transaction as represented in step 446. However, as can be appreciated, a record of the transaction may be recorded and stored in the machine, at the server or in other connected computers so as to provide data usable to determine whether there is a pattern of possible fraudulent activity related to a particular card. After canceling the transaction, the machine then returns to its waiting state to begin another transaction.

In the exemplary embodiment, if the one or more messages received by the machine from the server indicates that the transaction should proceed, then the automated banking machine operates in accordance with its programming to send one or more messages to the host 410. These one or more messages may be of the type previously discussed which include data corresponding to the card data, identifying information such as the PIN, transaction type, and amount. The sending of such one or more messages to the host is represented by step 448. Therefore, after performing the additional security process, the machine can communicate with the host to carry out the transaction process. As later described, part of the transaction process may occur while the additional security process is being carried out.

The host operates in response to the receipt of the messages from the automated banking machine to determine if the card data corresponds to an authorized financial account and whether the account is authorized to perform the transaction in the amount requested. The host also operates to cause to be determined whether the PIN number or other identifying data corresponds to a particular authorized user that is permitted to conduct a transaction on the account. Based on this determination, the host operates to send one or more messages to the ATM which includes data corresponding to whether the transaction should be allowed to proceed. These host messages are received by the automated banking machine as represented in a step 450.

The banking machine computer then operates in accordance with its programming to determine if the messages received from the host indicate that the transaction is authorized by the host. This is represented in a step 452. If the data included in the one or more messages from the host indicate the transaction is not authorized, the banking machine will operate in accordance with its programming to return the user's card. This is represented in step 454. The machine will also cancel the transaction as represented in step 456. In the exemplary embodiment, the machine will then return to the waiting state for another transaction. Of course it should be understood that in some embodiments the one or more messages returned by the host may indicate that the user's card is to be captured, additional images are to be taken of the user, or other activities are to be conducted through operation of the one or more banking machine computers. The steps taken depend on the particular programming of the system and the content of the particular messages received from the host computer. It should be understood that the steps described are exemplary and in other embodiments other steps or approaches may be used.

If the one or more messages received by the automated banking machine from the host indicate that the transaction is authorized to be carried out, the automated banking machine operates in accordance with its programming to cause the particular devices of the machine to operate so as to complete the transaction. This is represented by a step 458. This includes for example, dispensing cash through operation of the cash dispenser to the user in the amount of the $200 requested. This may also include the operation of other devices such as a printer to provide the user with a receipt, operating the display to provide the user with instructions to take their cash, or other steps/operations. Further, it should be understood that the automated banking machine computer may operate in accordance with its programming to provide the user with promotional or other messages such as those described in the incorporated disclosure as the transaction requested is being fulfilled through operation of the devices of the banking machine.

The automated banking machine of the exemplary embodiment operates in accordance with its programming to send one or more messages to the host. These messages indicate whether the transaction that was authorized was enabled to be successfully carried out. This is represented by a step 460. If the transaction was enabled to be successfully carried out, the host computer operates responsive to the data included in the one or more host messages to cause the user's account to be assessed for the value of the cash dispensed. Of course if the transaction could not be carried out, the host may operate in the manner previously discussed to avoid assessing the user's account for any amount. The host may also operate in accordance with its programming to cause notifications to be given or to take other steps to remedy any service problem that may be determined to exist at the machine which may be preventing the machine from fully carrying out transactions.

In the exemplary embodiment, after sending the messages to the host regarding the fulfillment of the transaction or taking the other steps, the machine can return to its waiting state pending the initiation of another transaction by a user. This is represented in FIG. 25 by a step 462. Of course it should be understood that this schematic logic flow which is represented in FIGS. 24 and 25 is highly simplified and does not show certain actions and steps that may be carried out through operation of the one or more banking machine computers.

Furthermore, it should be understood that the steps carried out by the banking machine computer are carried out by computer executing instructions that are recorded on one or more articles in the machine which hold such instructions. Such articles may include for example a hard drive which includes the data and software used in operation of the machine. The hard drive may be in operative connection with the one or more banking machine computers. Alternatively or in addition, other articles which include computer executable instructions may include flash memory devices, DVDs, CDs, read-only memories, programmable read-only memories or any other form of electrical, magnetic or optical storage media from which computer executable instructions and data may be recovered for execution. Thus, programming software can cause banking machine computers to perform transaction operations. Similarly, other computers operated in the system may have computer executable instructions stored on similar articles for purposes of carrying out their program steps. This includes for example, articles of computer readable media associated with the servers and the host computers used in the system.

Figure 26:
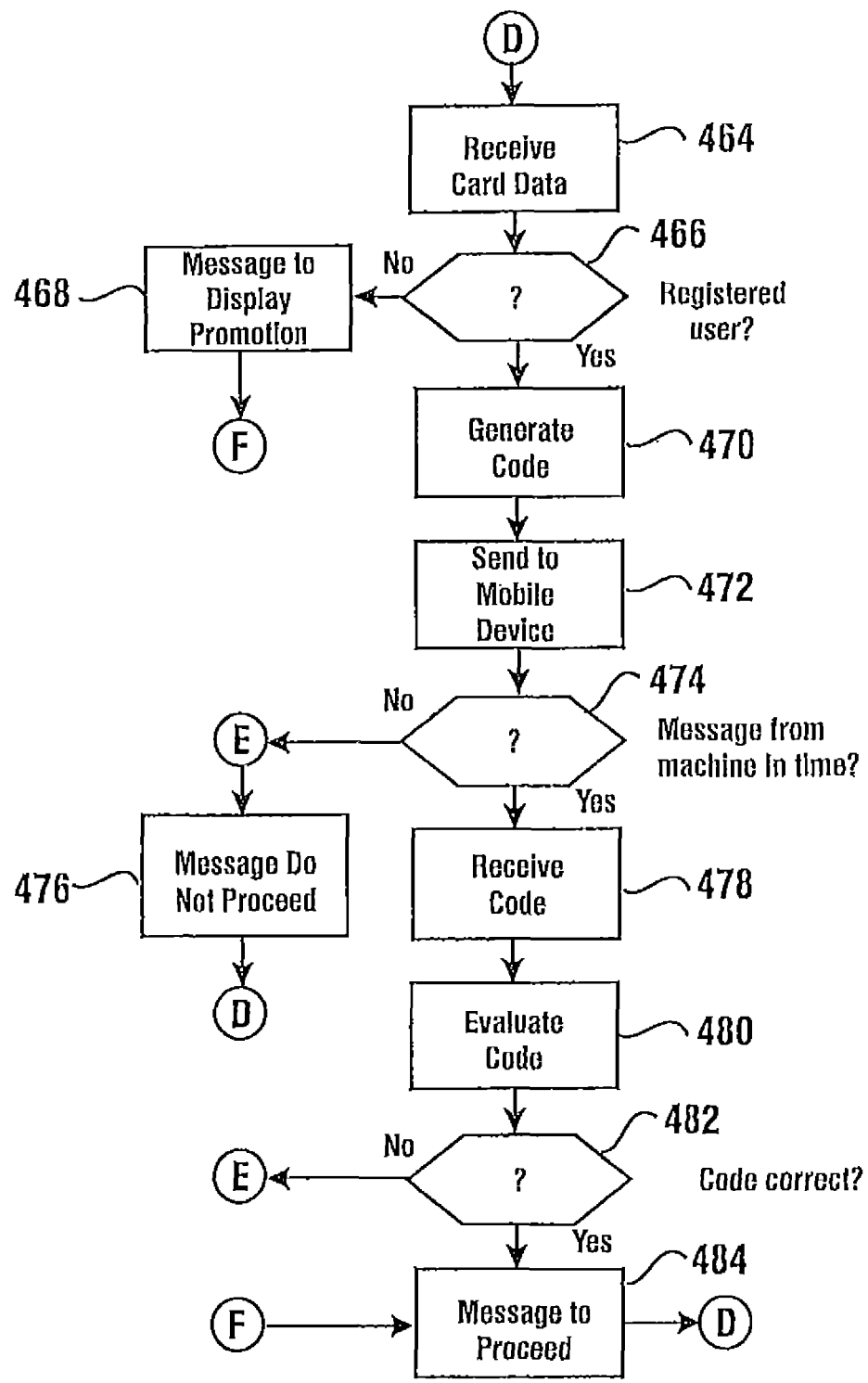
FIG. 26 is a simplified schematic representation of software logic carried out through operation of a server used in the system represented in FIG. 23.

The logic executed by the server 416 in the course of the transaction just described is represented in FIG. 26. As shown therein, the server 416 receives the one or more messages from the automated banking machine which includes data corresponding to at least a portion of the card data and/or other user data which is sufficient for the server to identify data that is associated with the card and/or a user. This is represented schematically by the step 464.

In an exemplary embodiment, users are enabled to sign up for the service either by mail, through an online interface, by phone, or other suitable methodology that eventually results in data being stored in one or more data stores 418 associated with one or more servers. This data is usable to indicate whether a user card/account or other user data is associated with someone who has signed up for the additional authentication/security requirements.

It should further be understood that in some embodiments the card data which was sent to the system which identifies the user, may include not only account data which identifies the particular account, but may also include the user name on the user's particular card. It may also include other features such as biometric data, data corresponding to facial recognition data, or other data which may identify a particular user beyond the particular account data. This may include name data encoded on the magnetic card stripe. This is useful where spouses share a common (same) account but have different user cards (and phones), each of which includes the user's name. Thus for example, some embodiments may operate to send the user name data to the server so as to distinguish the predetermined notification network address associated with a cell phone for each particular spouse. This enables for example, the particular banking machine user (first spouse) to be notified of the transaction through their cell phone (or other portable device) based on the data received at the banking machine, even though their account data is identical to that of another user (second spouse). Of course it should be understood that this approach is exemplary and in other embodiments other approaches may be used.

In the exemplary operation of the server, the server operates in response to the data received in the messages from the automated banking machine to determine if the data received corresponds to a user who has signed up for the service. This is represented in a step 466. This is done by the server recovering and analyzing the data regarding registered users included in the one or more data stores 418. If the data received from the automated banking machine does not correspond to an individual who has signed up for this service, the server may operate in accordance with its programming to return one or more messages to the automated banking machine. These messages may include for example, a message to delete the requirement for the input of a code as associated with a step 436. This will allow the automated banking machine to proceed to verify the transaction based solely on the data associated with the card and PIN data sent to the host. Alternatively or in addition, the server may operate in accordance with its programming to cause one or more messages to be sent to the banking machine which cause the machine to present to a particular user, information about the fact that the secondary/additional authentication provided through a mobile device is available and to consider signing up for this service. Further as previously discussed, users in some embodiments may be prompted as to whether they wish to sign up for this service through the banking machine in the manner of special user messages and responses like those of the incorporated disclosure. This may be done after the user has been authorized by the host as an individual who is authorized to conduct transactions at the banking machine by having their card, PIN and/or other data verified. Of course these approaches are exemplary. The sending by the server of the one or more messages to the automated banking machine so as to indicate that a mobile provided code will not be required to conduct the transaction is represented in FIG. 26 by step 468.

If in step 466 the data received form the automated banking machine indicates that the particular card data associated with the transaction is registered to require the additional authentication required by the system, the server 416 operates to generate a code. This is represented in a step 470. As previously discussed, in some exemplary embodiments this code may correspond to a random code or a code that has at least one random portion. For example, in some embodiments the random code may be generated through operation of random number generation software operating in the server. This random code may be a code that is not predictable in advance of the time of the particular transaction. Of course these approaches are exemplary and in other embodiments other approaches may be used.

The server then operates as represented by a step 472 to cause the random code to be sent to the particular cell phone which corresponds in the one or more data stores with the user data received. This is done in the exemplary embodiment by the server operating to determine from the user data it receives from the banking machine, the predetermined notification network address (e.g., phone number) which corresponds to the particular cell phone associated with the user of the card that has been presented at the automated banking machine. The data store may also operate to include the particular type of notification to be given to the address. This may include for example a text message, e-mail message, voice notification message, or other suitable message sufficient to notify the user of the code that is required to be input to the banking machine in order to allow the transaction to proceed. One or more data stores associated with the server may include data corresponding to the particular method of notification to be given to a particular user. It may also include instructions which are operative to cause notification to be given through different alternative methodologies. For example, the user may be given a minute to acknowledge a text message which is sent to their specified cell phone. If acknowledgment of the message is not received within the programmed time period, a phone call to the cell phone and communicating the data through an AVR system may be utilized. Further, in some embodiments if the user fails to acknowledge receipt of the code to the system within a particular time period, the server may operate to prevent the transaction from being accomplished. Of course some embodiments may not require an acknowledgment of receipt of the code beyond input to the banking machine. It should be understood that these described approaches are exemplary and other approaches and steps may be used.

As represented in the step 472 the at least one server 416 operates to cause the code that is generated through operation of the server and an appropriate message to be sent to the user's cell phone through the wireless communication system 422. Of course as can be appreciated, the various steps and additional notifications may be given in some alternative embodiments in accordance with the programming of the particular system. The message that is dispatched from the server is received by the phone 424 that has the network address data that is associated in the at least one data store with the particular user data for the card that is being used in the transaction.

The user in response to receiving the particular code on their phone, will then provide the code through one or more input devices to the automated banking machine in a step 436. In exemplary embodiments the message to the user's phone may include a statement that a transaction is currently conducted at an ATM and they are required to input the particular code in order to allow the transaction to proceed. Such a message will also operate to alert a user who may not be at an automated banking machine that a fraud is being attempted. The message to the user's phone may also indicate to the user a need to provide a particular responsive message if, in fact, they are not conducting such a transaction and they believe that such a transaction to be fraudulent. This may include for example the user providing one or more text message inputs, inputting a specified character (e.g., #2), calling, or otherwise contacting one or more network addresses to provide an input or message that will cause the server and/or the host to block the transaction.

Alternatively or in addition, in some embodiments the message sent to the user's cell phone may give the user the option to allow the transaction to proceed even though the code is not presented. This may be done for example in circumstances where the user has given their card to a child or other person for use on a temporary basis and the user is not with the child or other person at the time. This may be done in some embodiments by the user being instructed to provide an input through the phone of one or more types of confidential information that would only be known to the particular user. This might include for example a secret code other than the PIN, the user's mother's maiden name, or other secret data that has been established and recorded in a data store previously. Providing such an option may enable a transaction to proceed in emergency circumstances. It will also prevent a transaction from proceeding in circumstances where the user does not wish for the transaction to proceed. Of course these approaches are exemplary.

Further, while the exemplary embodiment discusses the presentation of a code that a user is allowed to manually input to the banking machine such as through a keypad, other embodiments may cause the code to be input in other ways to the machine. This may include for example, having the mobile device output a two or three-dimensional bar code on the phone display. The bar code may include the data to authorize the transaction. The bar code may be input in some exemplary embodiments by the bar code reader of the particular automated banking machine reading the bar code from the display of the cell phone. Alternatively or in addition, the automated banking machine may include features like those discussed in U.S. Pat. No. 7,516,087 the disclosure of which has been herein incorporated by reference in its entirety. In such cases the automated banking machine may be associated with an image capture device such as a camera. The phone may be caused to output a visual image or several visual images which are captured through operation of the image capture device. The captured images correspond to the particular code that is usable to authorize the transaction. Of course these approaches are exemplary of approaches that may be used.

Assuming that the user properly receives a code through their mobile device, the user inputs the code through at least one input device of the machine. While the server is waiting for receipt of the code, it operates a timing program as represented in step 474. In this exemplary embodiment, the server determines if the machine sends one or more messages with data having a predetermined relationship to the particular code within the permitted time period (e.g., a time out period). If such messages are not timely received, then the server operates in accordance with its programming to send one or more messages to the automated banking machine which are operative to cause the machine not to allow the transaction to proceed. This is represented in a step 476.

If the server receives one or more messages from the automated banking machine within the time period permitted, the server operates to receive the user-inputted data (e.g., expected data corresponding to the code) as represented in step 478. The server then operates in accordance with its programming to evaluate this received data (corresponding to the code) as represented in step 480. In step 480 the server operates to compare and evaluate the data in the one or more received server messages to determine if the data received has a predetermined relationship to the authorization data (i.e, the security code) that was sent in the one or more messages to the mobile phone. The predetermined relationship may require that the user-inputted data received identically corresponds to the data that was sent to the mobile phone. Alternatively or in addition, the sent/received data may have a mathematical or other relationship, or be within an predetermined range of acceptability. This may include for example that the data corresponds to a hash or other corresponding data that can be evaluated for purposes of determining that the proper code data has been input. Other predetermined relationship arrangements may be based on user-provided data containing a predetermined percentage of sent characters or their order. Numerous approaches may be taken depending on the nature of the authorization data that is sent to the cell phone and the particular programming of the system.

In a step 482 the server operates to make a determination whether the data it has received has the required predetermined relationship to the authorization data (e.g., code) which the server caused to be sent to the cell phone. If the determination is negative, then the transaction is not authorized. In this case the server operates to send one or more messages to the automated banking machine with data included therein which indicates that the transaction is not to proceed. This is represented by step 476.

Alternatively, if the determination analysis indicates that the data input by the user to the banking machine corresponds to the data (e.g., code) sent in one or more messages to the cell phone, then the server operates to send one or more messages to the banking machine with data included therein that indicates that the transaction is allowed to proceed. This is represented by step 484. As can be appreciated, these messages which are sent from the server to the automated banking machine correspond to the messages received through operation of the banking machine computer in step 440 shown in FIG. 25. Of course these approaches are exemplary.

Other embodiments may include other or additional approaches. This may include for example a variation of the approaches already described. In this alternative approach, the transaction proceeds in the manner previously discussed. However, rather than the automated banking machine sending messages which include the user inputted data (corresponding to the code) to the server, and then have the server perform the data comparison, the server operates in accordance with its programming to send one or more messages including the code to the automated banking machine. This may include for example, the server sending data corresponding to the generated code in one or more messages to the automated banking machine. This enables the automated banking machine to compare/determine if the user inputted data corresponds to the particular code that the server generated. The automated banking machine may operate in accordance with its programming to determine if the code data input by the user corresponds to the code data that it has received from the server. The automated banking machine may also be in operative connection with comparison computers that can perform the data comparison/determination on behalf of the machine.

Alternatively or in addition, the server may send a hash or other value based on a mathematical manipulation of the particular code data in a way which enables the automated banking machine to operate to compare a mathematical manipulation of what is input at the machine to the particular data that the automated banking machine has received from the server. In this manner the automated banking machine then makes the determination as to whether the user inputted data corresponds to the authorization code sent to the mobile device so as to allow the requested transaction to proceed.

In still other embodiments, the system may operate to make the decision at other points in the banking machine transaction flow. For example, an exemplary embodiment has been described as making a determination concerning whether the user inputted data corresponds to the authorization data sent to the user's cell phone, prior to the machine sending messages to the host requesting the transaction. In alternative embodiments, such host authorization allowing the transaction to occur may be made at any point up through the time that the cash is dispensed (or other transaction steps which give monetary value the banking machine user have been carried out). For example, the automated banking machine, at any point in its logic flow before completing the transaction, may operate in a modified form of its programming to make the determination that the user inputted data corresponds to the security data sent to the cell phone through operation of the server. This may have a transaction time advantage in the event that there is a delay in banking machine communication with the server, whereas the banking machine communication with the host (to otherwise authorize the transaction) is not delayed. Thus, the additional security authorization can occur simultaneously (and independently) with the transaction authorization. However, completion (e.g., dispensing the cash) of the host-authorized transaction will not be carried out until the additional security authorization is completed.

Further, it should be understood that the server 416 may be operated like the server of the incorporated disclosure so as to perform marketing or other messaging functions for the banking machine users in addition to the authorization function. This may include for example giving a user the option to sign up for the service through the banking machine as previously discussed. It may also include the ability for the user to change the cell phone notification information or other data as may be appropriate. Alternatively, the authorization system and the marketing system may be operated as independent systems. The approach taken depends on the particular systems used and the programming of the computers involved.

Alternatively, in other embodiments the host system may operate through a connection with a wireless communication system to perform the (server) functions described. These may include for example, the host system being in communication with one or more databases or other computers which determine whether a particular user has required additional authentication in order to conduct a transaction. Thus, the host may operate in accordance with its programming to generate the code, cause it to be sent to the user's cell phone, evaluate the data input by the user to the banking machine, and carry out the other steps that are indicated in the previously described embodiment as carried out through operation of the server. Modifications may be made to the host messages to provide for the additional messages or for additional message content so as to enable the host to have this added functionality. Of course these approaches are exemplary and in other embodiments other approaches may be used.

In still other embodiments, the banking machine can wirelessly send the security code to the phone. For example, the machine may call the phone. Alternatively, the machine may use a RFID device to transmit the code to the phone, requiring both the phone to be near the machine. Of course other techniques for sending a security code from the machine to a phone may be used. The automated banking machine may also be operated to generate the security code.

Thus, the features and characteristics of the embodiments previously described achieve desirable results, eliminate difficulties encountered in the use of prior devices and systems, solve problems and attain one or more of the objectives stated above.

In the foregoing description certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the exact details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principals of the invention, the manner in which it is constructed, operated, and utilized, and the advantages and useful results attained; the new and useful structures, devices, elements, arrangements, parts, combinations, systems, equipment, operations, methods, processes, and relationships are set forth in the appended claims.

We claim:

1. Apparatus comprising:
    at least one server of a banking system,
        wherein the at least one server is associated with a plurality of automated banking machines,
            wherein each machine includes a cash dispenser,
            wherein each machine includes at least one data reader,
                wherein the at least one data reader is operable to read user data usable to identify a financial account on which financial transactions can be carried out,
            wherein each machine is associated with at least one processor,
                wherein the at least one processor is operable to cause a financial account to be assessed a value associated with cash dispensed by the cash dispenser, responsive at least in part to user data read by the at least one data reader corresponding to the financial account,
            wherein each machine is operable to receive from a machine user, at least one user input including
                a secret code,
                contact data corresponding to a customer phone number, and
                a request associated with a cash dispense transaction involving a particular amount of cash,
        wherein the at least one server is operable to receive from a respective machine responsive to the respective machine receiving the at least one user input, at least one message associated with the request,
            wherein the at least one message includes the contact data and the particular amount,
        wherein the at least one server is operable to generate a transaction security code,
            wherein the transaction security code differs from the secret code,
            wherein the transaction security code is associated with the particular amount,
        wherein the at least one server is operable to correspond the security code with the cash dispense transaction,
        wherein the at least one server is operable to send a message to a customer via a mobile phone associated with the customer phone number, wherein the message includes:
            customer notification of the transaction, and
            the transaction security code,
                wherein the transaction security code is usable by the customer to cause a cash value corresponding to the particular amount to be dispensed by any particular machine of the plurality of automated banking machines, based at least in part on customer input of the transaction security code to the particular machine.

2. The apparatus of claim 1 wherein the particular machine is associated with a shared transaction host computer,
    wherein the at least one data reader of the particular machine includes both a card reader and a biometric reader,
    wherein the particular machine includes at least one machine processor,
        wherein the at least one machine processor is operative during a user transaction session with the machine to:
            cause card data to be read from a card through operation of the card reader, and then cause the read card data to be compared with card information stored in at least one data store, and
            cause biometric data to be read through operation of the biometric reader, and then cause the read biometric data to be compared with biometric information in the at least one data store;
        wherein the at least one machine processor is operative to authorize a machine user to request a financial transaction involving the cash dispenser responsive at least in part to both:
            computer-determined correspondence between the read card data and stored card information,
            computer-determined correspondence between the read biometric data and stored biometric information, and
            computer-determined correspondence between the read card data and the read biometric data;
        wherein the at least one machine processor is operative to cause data corresponding to at least a portion of read card data to be sent in at least one first message to the transaction host computer,
        wherein the at least one machine processor is operative to allow cash to be dispensed by the cash dispenser responsive at least in part to receipt by the at least one machine processor of at least one second message from the transaction host computer.

3. The apparatus according to claim 1 wherein the transaction security code is associated with a predetermined time period,
    wherein the transaction security code is usable to cause the cash value to be dispensed by the particular machine, if received by the particular machine within the predetermined time period.

4. Apparatus comprising:
    at least one server,
        wherein the at least one server is associated with at least one automated banking machine of a banking system,
        wherein the at least one server is operable to receive a customer request for a particular transaction that involves automated banking machine-dispensing of a particular amount of cash, wherein the request includes contact data corresponding to contact information for a portable communication device,
        wherein the at least one server is operable to then correspond a security code with the particular transaction,
        wherein the at least one server is operable to then use the contact data to cause to be sent to the portable communication device, a message that includes
            notification of the request, and
            the security code,
        wherein the at least one server is operable to then receive data corresponding to the security code, responsive at least in part to user input of the security code to a respective machine of the at least one automated banking machine, wherein the respective machine includes at least one cash dispenser,
wherein the at least one server is operable responsive at least in part to receiving the data corresponding to the security code, to then allow the respective machine to dispense the particular amount of cash involved in the particular transaction.

5. The apparatus according to claim 4 wherein the at least one server is operable to receive the customer request from an automated banking machine which is in operative connection with a transaction host operative to authorized cash dispense transactions,
wherein the at least one server differs from the transaction host.

6. The apparatus according to claim 5
wherein the respective machine includes at least one data reader operative to read user data,
wherein the at least one data reader includes both
a card reader operable to read card user data, and
a biometric reader operable to read biometric user data,
wherein the at least one server is operable to receive in the request, contact information which corresponds to user data read by the at least one data reader.

7. The apparatus according to claim 5 wherein the at least one server is operable to receive both the customer request and the security code from a same automated banking machine.

8. The apparatus according to claim 4 wherein the transaction security code is associated with a predetermined period of usability,
wherein the at least one server is operable to allow the respective machine to dispense the particular amount of cash responsive at least in part to receiving within the predetermined period of usability, the data corresponding to the security code.

9. The apparatus according to claim 4 wherein the portable communication device comprises a customer mobile phone,
wherein the at least one server is operable to receive in the customer request, contact information for the customer mobile phone,
wherein the at least one server is operable to cause the message to be sent to the customer mobile phone.

10. The apparatus according to claim 4
wherein the at least one server is operable to receive in the customer request, data corresponding to a network address of the portable communication device,
wherein the at least one server is operable to use the data corresponding to the network address to contact the portable communication device.

11. The apparatus according to claim 4 wherein the at least one server is operative to generate the security code.

12. A method comprising:
(a) operating at least one server to receive a customer request for a particular transaction that involves automated banking machine-dispensing of a particular amount of cash,
wherein the at least one server is associated with at least one automated banking machine of a banking system,
wherein the request includes contact data corresponding to contact information for a portable communication device;
(b) subsequent to (a), operating the at least one server to correspond a security code with the particular transaction;
(c) subsequent to (b), operating the at least one server to use the contact data to cause to be sent to the portable communication device, a message that includes:
notification of the request, and
the security code;
(d) subsequent to (c), operating the at least one server to receive data corresponding to the security code, responsive at least in part to user input of the security code to a respective machine of the at least one automated banking machine, wherein the respective machine includes at least one cash dispenser; and
(e) operating the at least one server responsive at least in part to the data received in (d), to allow the respective machine to dispense the particular amount of cash involved in the particular transaction.

13. The method according to claim 12 wherein (a) includes receiving the request from an automated banking machine,
wherein the automated banking machine is in operative connection with a transaction host operable to authorize cash dispense transactions,
wherein the at least one server differs from the transaction host.

14. The method according to claim 13
wherein the automated banking machine includes at least one data reader operative to read user data,
wherein the at least one data reader includes both
a card reader operable to read card user data, and
a biometric reader operable to read biometric user data,
wherein in (a) the contact information corresponds to user data read by the at least one data reader.

15. The method according to claim 13 wherein (a) includes receiving both the customer request and the security code from a same automated banking machine.

16. The method according to claim 12 wherein (a), (d), and (e) involve communication of the at least one server with a same automated banking machine.

17. The method according to claim 12 wherein in (b) the security code is associated with a predetermined period of usability,
wherein the operation of the at least one server in (e) is based at least in part on the data being received in (d) within the predetermined period of usability.

18. The method according to claim 12 wherein the portable communication device comprises a customer mobile phone,
wherein (a) includes operating the at least one server to receive in the customer request, contact information for the customer mobile phone,
wherein (c) includes operating the at least one server to cause the message to be sent to the customer mobile phone.

19. The method according to claim 12
wherein (a) includes operating the at least one server to receive in the customer request, data corresponding to a network address of the portable communication device,
wherein (c) includes using the data corresponding to the network address to contact the portable communication device.

20. The method according to claim 12 and further comprising
(f) prior to (b), operating the at least one server to generate the security code.

* * * * *